United States Patent
Robb et al.

(10) Patent No.: US 12,479,880 B2
(45) Date of Patent: *Nov. 25, 2025

(54) ENZYMATIC RNA CAPPING METHOD

(71) Applicant: New England Biolabs, Inc., Ipswich, MA (US)

(72) Inventors: G. B. Robb, Somerville, MA (US); Siu-hong Chan, Ipswich, MA (US); Bijoyita Roy, Medford, MA (US)

(73) Assignee: New England Biolabs, Inc., Ipswich, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/794,874

(22) Filed: Aug. 5, 2024

(65) Prior Publication Data

US 2024/0383939 A1 Nov. 21, 2024

Related U.S. Application Data

(60) Division of application No. 17/001,236, filed on Aug. 24, 2020, now Pat. No. 12,398,173, which is a continuation of application No. PCT/US2020/047521, filed on Aug. 21, 2020, and a continuation of application No. PCT/US2020/047533, filed on Aug. 21, 2020.

(60) Provisional application No. 62/890,821, filed on Aug. 23, 2019.

(51) Int. Cl.
C07H 19/20 (2006.01)
C07H 21/04 (2006.01)
C12P 19/34 (2006.01)
C12Q 1/6816 (2018.01)

(52) U.S. Cl.
CPC ............. *C07H 19/20* (2013.01); *C07H 21/04* (2013.01); *C12P 19/34* (2013.01); *C12Q 1/6816* (2013.01)

(58) Field of Classification Search
CPC . C07H 21/02; C12P 19/34; C12Y 201/01056; C12N 15/111; C12N 9/1007
See application file for complete search history.

(56) References Cited

U.S. PATENT DOCUMENTS

| | | |
|---|---|---|
| 8,846,348 B2 | 9/2014 | Jendrisak et al. |
| 8,962,292 B2 | 2/2015 | Jais |
| 9,005,930 B2 | 4/2015 | Jendrisak et al. |

(Continued)

FOREIGN PATENT DOCUMENTS

| | | |
|---|---|---|
| AU | 2007238624 B2 | 5/2012 |
| EP | 2010659 B1 | 1/2009 |

(Continued)

OTHER PUBLICATIONS

Warren et al. (2010) Cell Stem Cell, vol. 7:618-630.*

(Continued)

*Primary Examiner* — Terra C Gibbs
(74) *Attorney, Agent, or Firm* — New England Biolabs, Inc

(57) ABSTRACT

Provided herein is a method for efficiently capping RNA in vitro. In some embodiments the capping reaction may be done at high temperature using Vaccinia capping enzyme or a variant thereof. In other embodiments, the capping reactions may comprise a capping enzyme from a large virus of amoeba, e.g., Faustovirus, mimivirus or moumouvirus, or a variant thereof. Compositions and kits for practicing the method are also provided.

23 Claims, 22 Drawing Sheets

Specification includes a Sequence Listing.

| substrate | RNA1 | RNA2 | RNA3 | RNA4 |
|---|---|---|---|---|
| number of nucleotide | 25 | 23 | 24 | 25 |
| MFE (kcal/mol) at 37°C | -1.5 | -7.2 | -7.2 | -7.2 |
| MFE (kcal/mol) at 45°C | -0.73 | -5.4 | -5.4 | -5.4 |

(56) References Cited

U.S. PATENT DOCUMENTS

| | | | |
|---|---|---|---|
| 9,115,380 B2 | 8/2015 | Jendrisak et al. | |
| 9,512,456 B2 | 12/2016 | Wang et al. | |
| 9,540,671 B2 | 1/2017 | Jais | |
| 9,629,804 B2 | 4/2017 | Heartlein et al. | |
| 9,790,531 B2 | 10/2017 | Wang et al. | |
| 10,428,368 B2 | 10/2019 | Schildkraut et al. | |
| 10,519,431 B2 | 12/2019 | Ong et al. | |
| 11,788,074 B2 | 10/2023 | Vainauskas et al. | |
| 12,398,173 B2 * | 8/2025 | Robb | C12Q 1/6816 |
| 2012/0251618 A1 | 10/2012 | Schrum et al. | |
| 2014/0152211 A1 | 6/2014 | Ko | |
| 2016/0038432 A1 | 2/2016 | DeRosa et al. | |
| 2017/0253911 A1 | 9/2017 | Schildkraut et al. | |
| 2018/0195061 A1 | 7/2018 | Schildkraut et al. | |
| 2018/0237817 A1 | 8/2018 | Roos et al. | |

FOREIGN PATENT DOCUMENTS

| | | | |
|---|---|---|---|
| EP | 2558579 B1 | 8/2013 | |
| EP | 3077406 B1 | 7/2019 | |
| WO | 2017123748 A1 | 7/2017 | |
| WO | 2018236617 A1 | 12/2018 | |
| WO | 2019020811 A1 | 1/2019 | |

OTHER PUBLICATIONS

UniProt Accession No. A0A0H3TMA9 version 1, listing a release date of Sep. 16, 2015.*
UniProt Accession No. A0A0H3TMA9 version 10, listing a release date of Dec. 5, 2018.*
UniProt Accession No. A0A0H3TMA9 version 26, listing a release date of May 29, 2024.*
Anderson et al. (Nucleic Acids Research, 2010, vol. 38, No. 17, pp. 5884-5892).*
Whisstock et al. (Biophysics, 2003 Vol. 36:307-340).*
Seffernick et al. (Journal of Bacteriology, 2001 vol. 183:2405-2410).*
UniProt Accession No. A0A142BZT8 version 22, listing a release date of Dec. 14, 2022 (archived text file accessed at <https://www.uniprot.org> on Aug. 27, 2024).
UniProt Accession No. A0A142BZT8 version 23, listing a release date of Feb. 22, 2023 (archived text file accessed at <https://www.uniprot.org> on Aug. 27, 2024).
UniProt Accession No. A0A142BZT8 version 24, listing a release date of Jun. 28, 2023 (html accessed at <https://www.uniprot.org> on or around Sep. 15, 2023).
UniProt Accession No. A0A142BZT8 version 25, listing a release date of Jan. 24, 2024 (archived text file accessed at <https://www.uniprot.org> on Aug. 27, 2024).
UniProt Accession No. A0A142BZT8 version 26, listing a release date of May 29, 2024 (archived text file accessed at <https://www.uniprot.org> on Aug. 27, 2024).
UniProt Accession No. A0A142BZT8 version 26, listing a release date of May 29, 2024 (html accessed at <https://www.uniprot.org> on Aug. 27, 2024).
UniProt Accession No. A0A142BZT8, Compare version 1 vs version 11 (accessed at <https://www.uniprot.org> on Aug. 27, 2024).
UniProt Accession No. A0A142BZT8, Compare version 1 vs version 24 (accessed at <https://www.uniprot.org> on Aug. 27, 2024).
UniProt Accession No. A0A142BZT8, Compare version 11 vs version 24 (accessed at <https://www.uniprot.org> on Aug. 27, 2024).
UniProt Accession No. A0A142BZT8, History tab (accessed at <https://www.uniprot.org> on Aug. 27, 2024).
European Nucleotide Archive Accession No. AMN83561 version1, listing a creation date of Mar. 18, 2016 (archived EMBL text file accessed at https://www.ebi.ac.uk/ena/browser/home on Aug. 27, 2024).
UniProt Online Training Materials, Sections 1, 1.1, 2, 2.1, 2.2, 2.3, 2.3.1, 10.1, 10.1.1, 10.1.9, and 10.5 (Accessed at https://www.ebi.ac.uk/training/online/courses/uniprot-exploring-protein-sequence-and-functional-info/ on Jun. 26, 2024).
Diamond, et al., Cytokine & Growth Factor Reviews, 2014 25: 543-550.
Fuchs, RNA, 2016 22: 1454-66.
Li, et al J. Org. Chem. 2012, 77, 9889-9892.
Cong, et al, Molecular and Cellular Biology, 6222-6231, 15, 11, 1995.
New England Biolabs, M2080 Capping System product information Feb. 26, 2020.
Benarroch, et al., Structure, 16, 501-512, 2008.
Shuman, JBC, 265, 20, 11960-11966, 1990.
Guo, et al., Proc Natl Acad Sci USA. 87, 11:4023-7, 1990.
Paoletti, et al., Journal of Virology, 33, 1, 208-19, 1980.
Furuichi, et al., Nature, 266, 235-237, 1977.
Lewis, et al., Eur. J. Biochem. 247, 461-469, 1977.
Iizuka, et al., Mol. Cell. Biol. 14, 7322-7330, 1994.
Rubenstein, et al., JCB, 96, 1464-1469, 1983.
Shuman, Methods in Enzymology, 181, 170-180, 1990.
Beverly, et al., Analytical and Bioanalytical Chemistry, 408, 5021-2030, 2016.
Wulf, et al., Scientific Reports, 9, 8594, 2019.
Johnson, et al., bioRxiv 2023.03.04.531015; doi: https://doi.org/10.1101/2023.03.04.531015.
Fisher, et al., ACS Cent. Sci. 2019, 5, 1844-1856.
Higman, et al., The Journal of Biological Checmistry, 267, 23, 16430-16437, 1992.
Mao, et al., The Journal of Biological Chemistry, 269, 39, 24472-24479, 1994.
Benamar, et al., Frontiers in Microbiology, 7, 3, 2016.
Du, et al., Journal of Virology, 95, 5, e02029-20, 2021.
Dunyak, et al., Eukaryotic Cell, 1, 6, 1010-1020, 2002.
Hausmann, et al., The Journal of Biological Chemistry, 277, 1, 96-103, 2022.
Jais, et al., Nucleic Acids Research, 47, 5, 2681-2698, 2019.
Pena, et al., Virology, 193, 319-328, 1993.
Reteno, et al., Journal of Virology, 89, 13, 6585-6594, 2015.
Schneider, et al., Molecular and Cellular Biology, 30, 2353-2364, 2010.
Takizawa, et al., PLoS One, 8, 10, e78000, 2013.
UniProt Accession No. A0A142BZT8 version 1, listing a release date of Jun. 8, 2016 (archived text file accessed at <https://www.uniprot.org> on Aug. 27, 2024).
UniProt Accession No. A0A142BZT8 version 2, listing a release date of Jul. 6, 2016 (archived text file accessed at <https://www.uniprot.org> on Aug. 27, 2024).
UniProt Accession No. A0A142BZT8 version 3, listing a release date of Sep. 7, 2016 (archived text file accessed at <https://www.uniprot.org> on Aug. 27, 2024).
UniProt Accession No. A0A142BZT8 version 4, listing a release date of May 10, 2017 (archived text file accessed at <https://www.uniprot.org> on Aug. 27, 2024).
UniProt Accession No. A0A142BZT8 version 5, listing a release date of Oct. 25, 2017 (archived text file accessed at <https://www.uniprot.org> on Aug. 27, 2024).
UniProt Accession No. A0A142BZT8 version 6, listing a release date of Feb. 28, 2018 (archived text file accessed at <https://www.uniprot.org> on Aug. 27, 2024).
UniProt Accession No. A0A142BZT8 version 7, listing a release date of Mar. 28, 2018 (archived text file accessed at <https://www.uniprot.org> on Aug. 27, 2024).
UniProt Accession No. A0A142BZT8 version 8, listing a release date of Jul. 18, 2018 (archived text file accessed at <https://www.uniprot.org> on Aug. 27, 2024).
UniProt Accession No. A0A142BZT8 version 9, listing a release date of Nov. 7, 2018 (archived text file accessed at <https://www.uniprot.org> on Aug. 27, 2024).
UniProt Accession No. A0A142BZT8 version 10, listing a release date of Dec. 5, 2018 (archived text file accessed at <https://www.uniprot.org> on Aug. 27, 2024).
UniProt Accession No. A0A142BZT8 version 11, listing a release date of Jul. 31, 2019 (archived text file accessed at <https://www.uniprot.org> on Aug. 27, 2024).

(56) References Cited

OTHER PUBLICATIONS

UniProt Accession No. A0A142BZT8 version 12, listing a release date of Dec. 11, 2019 (archived text file accessed at <https://www.uniprot.org> on Aug. 27, 2024).

UniProt Accession No. A0A142BZT8 version 13, listing a release date of Aug. 12, 2020 (archived text file accessed at <https://www.uniprot.org> on Aug. 27, 2024).

UniProt Accession No. A0A142BZT8 version 14, listing a release date of Oct. 7, 2020 (archived text file accessed at <https://www.uniprot.org> on Aug. 27, 2024).

UniProt Accession No. A0A142BZT8 version 15, listing a release date of Dec. 2, 2020 (archived text file accessed at <https://www.uniprot.org> on Aug. 27, 2024).

UniProt Accession No. A0A142BZT8 version 16, listing a release date of Feb. 10, 2021 (archived text file accessed at <https://www.uniprot.org> on Aug. 27, 2024).

UniProt Accession No. A0A142BZT8 version 17, listing a release date of Jun. 2, 2021 (archived text file accessed at <https://www.uniprot.org> on Aug. 27, 2024).

UniProt Accession No. A0A142BZT8 version 18, listing a release date of Sep. 29, 2021 (archived text file accessed at <https://www.uniprot.org> on Aug. 27, 2024).

UniProt Accession No. A0A142BZT8 version 19, listing a release date of Feb. 23, 2022 (archived text file accessed at <https://www.uniprot.org> on Aug. 27, 2024).

UniProt Accession No. A0A142BZT8 version 20, listing a release date of May 25, 2022 (archived text file accessed at <https://www.uniprot.org> on Aug. 27, 2024).

UniProt Accession No. A0A142BZT8 version 21, listing a release date of Aug. 3, 2022 (archived text file accessed at <https://www.uniprot.org> on Aug. 27, 2024).

* cited by examiner

```
                          10        20        30        40        50        60        70
                   ....|....|....|....|....|....|....|....|....|....|....|....|....|....|
AMN83561       1   --------------MAKRLQRCQDVNQVCEIYNSKGGIGELELRFDKLPQNLFAGV FDKLKPDGEI QTTMR
AIB52055       1   -------MRRVFNSAKKQQRCDSVEQVCEFYNADNKTNELELRFDKLNRELFVVL FDKLKPDGEI TTTMR
SME65026       1   -------MRRVSNSAKKQQRCDSVEQVCEFYNADNKTNELELRFDKLNRELFVAL FDKLKPDGEI TTTMR
SMH63629       1   LEYQYYKYILVNIMSRRLQRCRDVDQVCEYYNAKGAIGELELRFDKLTPDLFAHV FDKLKPDGEI STTMR
Fausto_CR_01   1   ------------------------------------------------------- FDKLKPDGEI TTTMR

|-------------------- TPase --------------
                        80        90       100       110       120       130       140
                   ....|....|....|....|....|....|....|....|....|....|....|....|....|....|
AMN83561      58   VSNRDGVAREITFGGGVKTNELFVKKQNICVFDVVLIFSYKVAVSTEETVVEKPTMETTAGVRFKIRLSV
AIB52055      64   VSNADGVAREITFGGGVKTGEMFVKKQNICVFDVVLFFSYKVAVSSEDEIKDKPKMDTNASVRFKIRLSC
SME65026      64   VSNADGVAREITFGGGVKTGEMFVKKQNICVFDVVLFFSYKVAVSSEDEVKDKPKMDTNASVRFKIRLSC
SMH63629      71   VSNSDGTAREITFGGGVKTGETFVRKQNICVFDVVLDFSYKVAVSTEETLVDKPAMEKDASVRFKIRMSV
Fausto_CR_01  16   VSNADGVAREITFGGGVKTGEMFVKKQNICVFDVVLIFSYKVAVS---------------------------

--- TPase -----|
                       150       160       170       180       190       200       210
                   ....|....|....|....|....|....|....|....|....|....|....|....|....|....|
AMN83561     128   EDVVKDWRIDLTAVKTAELGKIAQHTASIVQRTFPDNLLKLTGAEVAKLAADSYELELEYTGKSPATNEK
AIB52055     134   DTLIPDWRIDLTAVKVADLGKIAQHTSTVVLQTFPENLLRMKGAEVAALATNSYELELEYIGKSAASKEK
SME65026     134   DTLIPDWRIDLTAVKVADLGKIAQHTSTVVLQTFPENLLRMKGAEVAALATNSYELELEYIGKSTAGKEK
SMH63629     141   EGAVPNWRIDLTAVKTAELGKIAQHTASLVLQTFPPNLLKMSGAEVAKLANNSYELELEYIGKTPATKER 220       230       240       250       260       270       280
                   ....|....|....|....|....|....|....|....|....|....|....|....|....|....|
AMN83561     198   VNVAAKYAVELLSSVRNANSTAAASFGESVSDLCRVAKIIHTHEYANVVCRTPSFKMLLPQVVSLTKSSY
AIB52055     204   VLAAAEYAMELLTNSRNAISPAAATLGESVSDICRIAKLIHPAEYANVICRTPSFKNLPQVISLTKSSY
SME65026     204   VLKAAEYAIELLTNLRNAVSPVAATLGESVSDICRIAKLIHPAEYANVICRTPSFKNLLPQVISLTKSSY
SMH63629     211   VDAAAKYAVDLLAGIKNANSAVGAVLGESISDICRVAKVIHTPDYATVVCRNPSFKMLLPQVISLTKSSY

|-------------------- GTase --------------------
                        290       300       310       320       330       340       350
                   ....|....|....|....|....|....|....|....|....|....|....|....|....|....|
AMN83561     268   YGGLYPPENLWLAGKTDGVRALVVCEDGVAKVITAESVDITHGVCSATTILDCELNVD-------AKILY
AIB52055     274   YGGIYPPVDMYIAGKTDGVRALVLCENGVAKIITATTVDTTTVGNTPITILDCELSTSGHNGATDNKHLY
SME65026     274   YGGIYPPVDMYITGKTDGVRALVLCENGVAKIITATTVDTTTVGDTPITILDCELSTSGHNGATDNKHLY
SMH63629     281   YGGIYPPEGMYVAGKTDGVRALVLCEDGVAKVITAESVDITTGTCTGTTILDCELSTGKS----GATLH
```

FIG. 5

```
                      ---------------------------- GTase ---------------------------------|
                    360        370        380        390        400        410        420
                    ....|....|....|....|....|....|....|....|....|....|....|....|....|....|
AMN83561        331 VFDVIISNNTQVYTQPFSTRITTDISDIKIDGYKIEMKPFVKVVK---ADEATFKSAYKAPHNEGLIMIE
AIB52055        344 IFDVIMNRGVHSHREGFNKRIDIDLSDLTPAGYTLELKPFTKLVDAASVNETTFKSVKPPHNEGLVLVE
SME65026        344 VFDVIMNRGAHSHRDGFNKRIDIDLSDLTPAGYTLELKPFTKVADAASVNETTFKSVFKPPHNEGLVLVE
SMH63629        346 VFDIIMHNSKPIHSQPFSTRIATDISDVKIPEYKIAIKPFVKIQAT--ALEAAFKEVYKAPHNEGLILIM 430        440        450        460        470        480        490
                    ....|....|....|....|....|....|....|....|....|....|....|....|....|....|
AMN83561        398 DGAAYAATKTYKWKPLSHNTIDFLIKACPKQLINVDPYKPRAGYKLWLLFTTISLDQQRELGIEFIPAWK
AIB52055        414 SGPPYALTKTYKWKPITHNTIDFLIKACPKQLINVDPFKPRNGHDLWLLFTTISLDQQRELGIDLIPAWK
SME65026        414 SGPPYALTKTYKWKPITHNTIDFLIKACPKQLINVDPFKPRNGHDLWLLFTTISLDQQRELGIDLIPAWK
SMH63629        414 DGNDYAMTKTYKWKPLSHNTIDFLIKACPKQLLNIDPYKPRPGHKLWLLFTTISLDQQRELGIEFIPAWK 500        510        520        530        540        550        560
                    ....|....|....|....|....|....|....|....|....|....|....|....|....|....|
AMN83561        468 ILFTDINMFGSRVPIQFQPAINPLAYVCYLPEDVN------VNDGDIVEMRAVDGYDTIPKWELVRSRND
AIB52055        484 LLFTDVNLFGNKIPIQFMPAINPLAYICYLPSSTG------VNDGDIVEMRAVDGFDGIPTWELVRTRPD
SME65026        484 LLFTDVNLFGNKIPIQFMPAINPLAYICYLPSSTG------VNDGDIVEMRAVDGFDGIPTWELVRTRPD
SMH63629        484 MLFTDINLFGSRVPIQFMPAINPLAYICYLPEAATCANGDAINDGDIVEMRAVDGFDTVPKWEPIRVRSD

|---------- MTase -
                    570        580        590        600        610        620        630
                    ....|....|....|....|....|....|....|....|....|....|....|....|....|....|
AMN83561        532 RKNEPGFYGNNYKIASDIYLNYIDMFHFDLKYNPGYFEKNKSDIYVAPNKYRRMLIKSLFGRYLRDAK
AIB52055        548 RKDERGFYGNNYKIASDIYLNYIDMFNFDDLWKYNPGYFEKNKSDIYIAPNKYRRMLIKSLFNYEKNAK
SME65026        548 RKDERGFYGNNYKIASDIYLNYIDMFNFDDLWKYNPGYFEKNKSDIYIAPNKYRRMLIKSLFNYEKNAK
SMH63629        554 RKDEPGFYGNNYKIASDIYLNYIDIFQFEDLWKYNPGYFEKNKSDIYVAPNKYRRELIKNIFSKYLKNAK
Fausto_CR_03      1 -----GFYGNNYKIASDIYLNYIDMFNFDDLWKYNPGYFEKNKSDIYIAPNKYRRMLIKSLFNYEKNAK
```

FIG. 5 (Cont. 1)

```
                    ------------------------------ MTase ------------------------------
                       640        650        660        670        680        690        700
                    ....|....|....|....|....|....|....|....|....|....|....|....|....|....|
AMN83561       602  WVIDAAAGRGADLHLYKAECVELLAIDIDPTAISELVRRRNEITGYNKSHRGGR---NMHSHRGQSH----
AIB52055       618  WVIDAAAGRGADLHLYKQECVELLAIDIDPTAISELIRRRNEITGWQQRGRGG----NTRHNARHN----
SME65026       618  WVIDAAAGRGADLHLYKQECVELLAIDIDPTAISELIRRRNEITGWQQRGRGGNMHHNSRHNTRHN---
SMH63629       624  WVIDAAAGRGADLHLYKAECVELLAIDIDPTAISELVRRRNEITGYNRGHRGHRGGSMRAHMGASHHGA
Fausto_CR_03    66  WVIDAAAGRGADLHLYKAECVELLAIDIDPTAISELIRRRNEITG------------------------

------------------------------ MTase ------------------------------
                       710        720        730        740        750        760        770
                    ....|....|....|....|....|....|....|....|....|....|....|....|....|....|
AMN83561       666  --CAKSTSLHALVADLRENPDVLIPKIIQSRPHERCYDAIVINFAIHYLCDTDEHIRDFLITVSRLLAPN
AIB52055       681  THCASSTSLHALVADLRTEPNMLIPKIIQSRPPERGYDAIVINFAIHYLCETDDYIRNFLITVSRLLAPD
SME65026       685  THCASSTSLHALVADLRTEPNMLIPKIIQSRPPERGYDALVINFAIHYLCETDDYIRNFLITVSRLLAHD
SMH63629       694  QNCAKSTTLHALVADLRTDPDVLIPKIIQSRPPERGYDAIVINFAIHYLCDTDEHIRDFLITVSRLLAPN ------------------------------ MTase ------------------------------
                       780        790        800        810        820        830        840
                    ....|....|....|....|....|....|....|....|....|....|....|....|....|....|
AMN83561       735  GVFIFTTMDGESIVKLLADHKVRPGEAWTIHTGD-VNSPDSTVPKYSIRRLYDSDKLTKTGQILVLLPM
AIB52055       751  GVFIFTTMDGEAIVNLLAEHKVAPGASWVVHTDGNANATDANVVKYSIRRLYDSDKLTKTGQKIAVLLPM
SME65026       755  GVFIFTTMDGEAIVNLLTEHKVAPGASWVVHTDGNTNATDANVVKYSIKRLYDSDKLTKTGQKIAVLLPM
SMH63629       764  GIFMFTTMDGESIVKLLETHKVKSGESWTVHTG--ADDPEAGVIKYSIRRLYDSDKLTKTGQQIAVLLPM
Fausto_CR_05     1  ------------------------------------------KYSIKRLYDSDKLTKTGQKIAVLLPM ------------------------------ MTase -----|
                       850        860        870        880        890        900        910
                    ....|....|....|....|....|....|....|....|....|....|....|....|....|....|
AMN83561       804  SGEMKAEPLCNIKNIISMARKMGLDLVESANFSVLYEAYARDYPDIYARMTPDDKLYNDLHTYAVFKRKK
AIB52055       821  SGEMEEPLCNIKNIVSMARKMGLDLVESANFSVLYGAYAKDYPEIYAKLTPDDKLYNDLHAFAVFKRKK
SME65026       825  SGEMEEPLCNIKNIVSMARKMGLDLVESANFSVLYGAYAKDYPEIYAKLTPDDKLYNDLHAFAVFKRKK
SMH63629       832  SGEMKTEPLCNIKNIISTARKMGLDLVESADFSVMYDAFARAYPEISARLTPDDKLYNDLHSYAVFKRKK
Fausto_CR_05    27  SGEMEEPLCNIKNIISMARKMGLDLVESANFSV------------------------------------
```

FIG. 5 (Cont. 2)

```
                                                |-------------- TPase ---------
                       10        20        30        40        50        60        70
                 ....|....|....|....|....|....|....|....|....|....|....|....|....|....|
AAV50651       1 MGTKLKKSNNDITIFSENEYNEIVEMLRDYSNGDNLEFEVSFKNINYPNFMRITEHYINITPENKIESNN
YP_007354410   1 MVTKNK-SENIRDILGSDNVSRVEEMINNFRKNRNTEFEISVRKINYSNYIRISEYYVNTS--SDIQQVT ------------------------- TPase ----------------------------------
                       80        90       100       110       120       130       140
                 ....|....|....|....|....|....|....|....|....|....|....|....|....|....|
AAV50651      71 YLDISLIFPDKNVYRVSLFNQEQIGEFITKFSKASSNDISRYIVSLDPSDDIEIVYKNRGSGKLIGIDNW
YP_007354410  68 SLDISIILEDGNTYRVSFLNENLINDFLSKYSNMKYGDIVKYILALNPNDDIEIIYKNRGSADRLSIEDL ---------------------------- TPase --------------------------------
                      150       160       170       180       190       200       210
                 ....|....|....|....|....|....|....|....|....|....|....|....|....|....|
AAV50651     141 AITIKSTEEIPLVAGKSKISKPKITGSERIMYRYKTRYSFTINKNSRIDITDVKSSPIIWKLMTVPSNYE
YP_007354410 138 NLVVKLTEEVPVLN---NTTKPKLSGREKILYRYKNRYSFIIDDITRIDITDVKETPNIWELSRKISNYE --- TPase ---|                                                |--------
                      220       230       240       250       260       270       280
                 ....|....|....|....|....|....|....|....|....|....|....|....|....|....|
AAV50651     211 LELELIN-KIDINTLESELLNVFMIIQDTKIPISKAESDTVVEEYRNLLNVRQTNNLDSRNVISVNSNHI
YP_007354410 205 IELEFTNNKIKSNQVFEKIFDLLRIVQNTEIPIGIRESKQVITDYQNLLNLRSSNHLDSRNVVSIETQHI --------------------------- GTase ---------------------------------
                      290       300       310       320       330       340       350
                 ....|....|....|....|....|....|....|....|....|....|....|....|....|....|
AAV50651     280 INFIPNRYAVTDKADGERYFLFSLNSGIYLLSINLTVKKLNIPVLEKRYQNMLIDGEYIKTTGHDLFMVF
YP_007354410 275 VKFVPNRYAITDKADGERYFLFSTPNGVYLLSTNLTVKKVNIPVLQKDFQNMLLDGELIDIDGKELFMVF --------------------------- GTase ---------------------------------
                      360       370       380       390       400       410       420
                 ....|....|....|....|....|....|....|....|....|....|....|....|....|....|
AAV50651     350 DVIFAEGTDYRYDNTYSLPKRIIINNIIDKCFGNLIPFNDYTDKHNNLELDSIKTYYKSELSNYWKNFK
YP_007354410 345 DVVYHNGIDYRYDTNYTLTHRIIIINDIIDKAFNNLIPFTDYTDKYNNLELDKIKEFYSNEIKTYWKNFS --------------------------- GTase ---------------------------------
                      430       440       450       460       470       480       490
                 ....|....|....|....|....|....|....|....|....|....|....|....|....|....|
AAV50651     420 NRLNKSTDLFITRKLYLVPYGIDSSEIFMYADMIWKLYVYNELTPYQLDGIIYTPINSPYLIRGGIDAYD
YP_007354410 415 KKLKNYSGLFISRKLYFVPYGIDSSEVFMYADLVWKLCVYDQLTPYKLDGIIYTPIASPYMIKTSANELD ---------|
                      500       510       520       530       540       550       560
                 ....|....|....|....|....|....|....|....|....|....|....|....|....|....|
AAV50651     490 TIPMEYKWKPPSQNSIDFYIRFKKDVSGADAVYYDNSVERAEGKPYKICLLYVGLNKQGQEIPIQFKVNG
YP_007354410 485 SVPMEYKWKPPSQNSIDFYVKFDKDARGNEAIYYDNAVVRGEGRPYKVCGLFVGLNKGGEEKPIAFKVAG 570       580       590       600       610       620       630
                 ....|....|....|....|....|....|....|....|....|....|....|....|....|....|
AAV50651     560 VEQTANIYTKDGEATDINGNAINDNTVVEFVFDTLKIDMDDSYKWIPIRTRYDKTESVQKYHKIYGNNLQ
YP_007354410 555 VEQKAFIYLTNDEALDLSGNVINDNTVVEFIFDNFKIDMDDYKWIPMRTRYDKTESVQKYPKKYGNNLH
moumou_CR_03   1 --------------------INDNTVVEFIFDNFKIDMDDYKWIPIRTRYDKTESVQKYHKKYGNNLH
```

FIG. 6

```
                                     |----------- MTase -----------
                        640       650       660       670       680       690       700
                        |....|....|....|....|....|....|....|....|....|....|....|....|....|
AAV50651      630  IANRIMKTITNPIIEDIISSLGDPTTFNKEITLLSDFRDTKYNKQALTYYQKNTSNAAGMRAFNNEIKSN
YP_007354410  625  IAIRIWRTITNPVIERIIAALGNASTFEKEMSKLVKMNES-YNKQSFSYYQKNTSNAIGMRAFNNEIKSN
moumou_CR_03   50  IANRIMKTITNPIIEDII----------------------------------------------------
moumou_CR_04    1  ------------------------------------------------YYQKNTSNAAGMRAFNNEIKSN ----------------------- MTase -----------------------
                        710       720       730       740       750       760       770
                        |....|....|....|....|....|....|....|....|....|....|....|....|....|
AAV50651      700  MITTYQRDGSKVLDIGCGRGGDLIKFINAQMEIYVGIDIDNNGLYVINDSANNRYKNLKKTIQNIPPMIF
YP_007354410  694  MITTYQKIKDSVLDIGCGRGGDLIKFIHANIREYVGIDIDNNGLYVINDSAFNRYKNLKKTIKNIPPMIF
moumou_CR_04   23  MITTYQKDGDKVLDIGCGRGGDLIKFIHAGIEEYVGIDIDNNGLYVINDSAFNRYKNLKKTIKNIPPMIF ----------------------- MTase -----------------------
                        780       790       800       810       820       830       840
                        |....|....|....|....|....|....|....|....|....|....|....|....|....|
AAV50651      770  INADARGLEIIEAQEKILPGMPDFNKSLINKYLVGN-KYDTINCQFTIHYYLSDELSWNNFCKNINNQLK
YP_007354410  764  INADARGLENIEAQEKILPNMSESNKKLINNYLSSNKKYDAINCQFTIHYYLSDDISWNNFCQNINNHLK
moumou_CR_04   93  INADARGLENIEAQEKILP--------------------------------------------------

----------------------- MTase -----------------------
                        850       860       870       880       890       900       910
                        |....|....|....|....|....|....|....|....|....|....|....|....|....|
AAV50651      839  DNGYLLITSPDGNLIHNKLKGKQKLSSSYTDNRGNKNIFFEINKIYSDTDKVGLGMAIDLYNSLISNPGT
YP_007354410  834  DNGYLLITCFDGQLIYDKLKGKQKYSSSYTDNFGKKNIFFEINKIYSDEEIKPVGMAIDIYNSLISNPGT -------------- MTase --------------|
                        920       930       940       950       960       970       980
                        |....|....|....|....|....|....|....|....|....|....|....|....|....|
AAV50651      909  YIREYLVFPEFLEKSLKEKCGLELVESDLFYNIFNTYKNYFKKTYNEYGMTDVSSKKHSEIREFYLSLEG
YP_007354410  904  YQREYLVFPDFLQKSLKDQCGLELVETDMFYNIFNLYRNYFTINNGIFSTGEISSKRYNEIKDFYLALEG 990      1000      1010      1020      1030      1040      1050
                        |....|....|....|....|....|....|....|....|....|....|....|....|....|
AAV50651      979  NANNDIEIDIARASFKLAMLNRYYVERKTSTINITEPSRIVNELNNRIDLGKFIMPYFRTNNMFIDLDNV
YP_007354410  974  KSSSVIESDIARASFKLAMLNRYYIFKKKTVINITEPSHIVSGVNKKIDLGKVLMPYFITNNMIIDYSLG 1060      1070      1080      1090      1100      1110      1120
                        |....|....|....|....|....|....|....|....|....|....|....|....|....|
AAV50651     1049  DTDINRVYRNIRNKYRTTRPHVYLIKHNINENRLEDIYLSNNKLDFSKIKNGSDPKVLLIYKSPDKQFYP
YP_007354410 1044  NNDVNKIYHFIRKKYSPIKPSVYIVRHNIIDNPMDGITFSRNKLEFIKIKNGTDPKVLLIYKSPEKIFYP 1130      1140      1150      1160      1170
                        |....|....|....|....|....|....|....|....|
AAV50651     1119  LYYQNYQSMPFDLD----QIYIPDKKKYLLDSDRIINDLNILINLTEKIKNIPQLS
YP_007354410 1114  FYYQRLENHDYSEDYLKNNIYIKDNGTYLLDSNKILNDLNMLVNISGKV-------
```

FIG. 6 (Cont.)

```
                              SEQUENCE LISTING

Sequence total quantity: 21
SEQ ID NO: 1              moltype = AA  length = 844
FEATURE                   Location/Qualifiers
REGION                    1..844
                          note = misc_feature - FL VCE capping enzyme; YP_232988.1
                           large subunit of mRNA capping enzyme
source                    1..844
                          mol_type = protein
                          organism = Vaccinia virus
SEQUENCE: 1
MDANVVSSST IATYIDALAK NASELEQRST AYEINNELEL VFIKPPLITL TNVVNISTIQ   60
ESFIRFTVTN KEGVKIRTKI PLSKVHGLDV KNVQLVDAID NIVWEKKSLV TENRLHKECL  120
LRLSTEERHI FLDYKKYGSS IRLELVNLIQ AKTKNFTIDF KLKYFLGSGA QSKSSLLHAI  180
NHPKSRPNTS LEIEFTPRDN ETVPYDELIK ELTTLSRHIF MASPENVILS PPINAPIKTF  240
MLPKQDIVGL DLENLYAVTK TDGIPITIRV TSNGLYCYFT HLGYIIRYPV KRIIDSEVVV  300
FGEAVKDKNW TVYLIKLIEP VNAINDRLEE SKYVESKLVD ICDRIVFKSK KYEGPFTTTS  360
EVVDMLSTYL PKQPEGVILF YSKGPKSNID FKIKKENTID QTANVVFRYM SSEPIIFGES  420
SIFVEYKKFS NDKGFPKEYG SGKIVLYNGV NYLNNIYCLE YINTHNEVGI KSVVVPIKFI  480
AEFLVNGEIL KPRIDKTMKY INSEDYYGNQ HNIIVEHLRD QSIKIGDIFN EDKLSDVGHQ  540
YANNDKFRLN PEVSYFTNKR TRGPLGILSN YVKTLLISMY CSKTFLDDSN KRKVLAIDFG  600
NGADLEKYFY GEIALLVATD PDADAIARGN ERYNKLNSGI KTKYYKFDYI QETIRSDTFV  660
SSVREVFYFG KFNIIDWQFA IHYSFHPRHY ATVMNNLSEL TASGGKVLIT TMDGDKLSKL  720
TDKKTFIIHK NLPSSENYMS VEKIADDRIV VYNPSTMSTP MTEYIIKKND IVRVFNEYGF  780
VLVDNVDFAT IIERSKKFIN GASTMEDRPS TRNFFELNRG AIKCEGLDVE DLLSYYVVYV  840
FSKR                                                              844

SEQ ID NO: 2              moltype = AA  length = 60
FEATURE                   Location/Qualifiers
REGION                    1..60
                          note = MISC_FEATURE - Fausto_CR_01
source                    1..60
                          mol_type = protein
                          organism = Faustovirus
SEQUENCE: 2
FDKLKPDGEI TTTMRVSNAD GMAREITFGG GVKTGEMFVK KQNICVFDVV DIFSYKVAVS   60

SEQ ID NO: 3              moltype = AA  length = 111
FEATURE                   Location/Qualifiers
REGION                    1..111
                          note = misc_feature - Fausto_CR_03
source                    1..111
                          mol_type = protein
                          organism = Faustovirus
SEQUENCE: 3
GFYGNNYKIA SDIYLNYIDV FNFDDLWKYN PGYFEKNKSD IYIAPNKYRR YLIKSLFNKY   60
IKNAKWVIDA AAGRGADLHL YKAECVENLL AIDIDPTAIS ELIRRRNEIT G          111

SEQ ID NO: 4              moltype = AA  length = 60
FEATURE                   Location/Qualifiers
REGION                    1..60
```

```
                            note = MISC_FEATURE - Fausto_CR_05
source                      1..60
                            mol_type = protein
                            organism = Faustovirus
SEQUENCE: 4
KYSIKRLYDS DKLTKTGQKI AVLLPMSGEM KEEPLCNIKN IISMARKMGL DLVESANFSV    60

SEQ ID NO: 5                moltype = AA  length = 67
FEATURE                     Location/Qualifiers
REGION                      1..67
                            note = MISC_FEATURE - 5: mimi_CR_03
source                      1..67
                            mol_type = protein
                            organism = Mimivirus
SEQUENCE: 5
INDNTVVEFI FDNFKIDMDD PYKWIPIRTR YDKTESVQKY HKKYGNNLHI ANRIWKTITN    60
PITEDII                                                              67

SEQ ID NO: 6                moltype = AA  length = 111
FEATURE                     Location/Qualifiers
REGION                      1..111
                            note = MISC_FEATURE - mimi_CR_04
source                      1..111
                            mol_type = protein
                            organism = Mimivirus
SEQUENCE: 6
YYQKNTSNAA GMRAFNNFIK SNMITTYCKD GDKVLDIGCG RGGDLIKFIH AGIEEYVGID    60
IDNNGLYVIN DSAFNRYKNL KKTIKNIPPM TFINADARGL FNLEAQEKIL P            111

SEQ ID NO: 7                moltype = AA  length = 873
FEATURE                     Location/Qualifiers
REGION                      1..873
                            note = MISC_FEATURE - Faustovirus D5b RNA capping enzyme
                             Genbank accession no. AMN83561
source                      1..873
                            mol_type = protein
                            organism = Faustovirus
SEQUENCE: 7
MAKRLQRCQD VNQVCEIYNS KGGIGELELR FDKLPQNLFA GVFDKLKPDG EIQTTMRVSN    60
RDGVAREITF GGGVKTNEIF VKKQNICVFD VVDIFSYKVA VSTEETVVEK PTMETTAGVR   120
FKIRLSVEDV VKDWRIDLTA VKTAELGKIA QHTASIVQRT FPDNLLKLTG AEVAKLAADS   180
YELELEYTGK SPATNEKVNV AAKYAVELLS SVRNANSTAA ASFGESVSDL CRVAKIIHTH   240
EYANVVCRTP SFKMLLPQVV SLTKSSYYGG LYPPENLWLA GKTDGVRALV VCEDGVAKVI   300
TAESVDITHG VCSATTILDC ELNVDAKILY VFDVIISNNT QVYTQPFSTR ITTDISDIKI   360
DGYKIEMKPF VKVVKADEAT FKSAYKAPHN EGLIMIEDGA AYAATKTYKW KPLSHNTIDF   420
LIKACPKQLI NVDPYKPRAG YKLWLLFTTI SLDQQRELGI EFIPAWKILF TDINMFGSRV   480
PIQFQPAINP LAYVCYLPED VNVNDGDIVE MRAVDGPDTI PKWELVRSRN DRKNEPGFYG   540
NNYKIASDIY LNYIDVFHFE DLYKYNPGYF EKNKSDIYVA PNKYRRYLIK SLFGRYLRDA   600
KWVIDAAAGR GADLHLYKAE CVEHLLAIDI DPTAISELVR RRNEITGYNK SHRGGRNMHS   660
HRGQSHCAKS TSLHALVADL RENPDVLIPK IIQSRPHERC YDAIVINFAI HYLCDTDEHI   720
RDFLITVSRL LAPNGVFIFT TMDGESIVKL LADHKVRPGE AWTIHTGDVN SPDSTVPKYS   780
IRRLYDSDKL TKTGQQIEVL LPMSGEMKAE PLCNIKNIIS MARKMGLDLV ESANFSVLYE   840
AYARDYPDIY ARMTPDDKLY NDLHTYAVFK RKK                                873

SEQ ID NO: 8                moltype = AA  length = 890
FEATURE                     Location/Qualifiers
REGION                      1..890
                            note = MISC_FEATURE - Faustovirus E12 RNA capping enzyme;
                             Genbank accession no. AIB52055
source                      1..890
                            mol_type = protein
                            organism = Faustovirus
SEQUENCE: 8
MRRVFNSAKK QQRCDSVEQV CEFYNADNKT NELELRFDKL NRELFVVLFD KLKPDGEITT    60
TMRVSNADGM AREITFGGGV KTGEMFVKKQ NICVFDVVDV FSYKVAVSSE DEIKDKPKMD   120
TNASVRFKIR LSCDTLIPDW RIDLTAVKVA DLGKIAQHTS TVVLQTFPEN LLRMKGAEVA   180
ALATNSYELE LEYIGKSAAS KEKVLAAAEY AMELLTNSRN AISPAAATLG ESVSDICRIA   240
KLIHPAEYAN VICRTPSFKN LLPQVISLTK SSYYGGIYPP VDMYIAGKTD GVRALVLCEN   300
GVAKIITATT VDTTTVGNTP ITILDCELST SGHNGATDNK HLYIFDVIMN RGVHSHREGF   360
NKRIDIDLSD LTPAGYTLEL KPFTKLVDAA SVNETTFKSV FKPPHNEGLV LVESGPPYAL   420
TKTYKWKPIT HNTIDFLIKA CPKQLINVDP FKPRNGHDLW LLFTTISLDQ QRELGIDLIP   480
AWKLLFTDVN LFGNKIPIQF MPAINPLAYI CYLPSSTGVN DGDIVEMRAV DGFDGIPTWE   540
LVRTRPDRKD ERGFYGNNYK IASDIYLNYI DVFNFDDLWK YNPGYFEKNK SDIYIAPNKY   600
RRYLIKSLFN KYIKNAKWVI DAAAGRGADL HLYKQECVEN LLAIDIDPTA ISELIRRRNE   660
ITGWQQRGRG GNTRHNARHN THCASSTSLH ALVADLRTEP NMLIPKIIQS RPPERGYDAI   720
VINFAIHYLC ETDDYIRNFL ITVSRLLAPD GVFIFTTMDG EAIVNLLAEH KVAPGASWVV   780
HTDGNANATD ANVVKYSIKR LYDSDKLTKT GQKIAVLLPM SGEMREEPLC NIKNIVSMAR   840
KMGLDLVESA NFSVLYGAYA KDYPEIYAKL TPDDKLYNDL HAFAVFKRKK              890
```

| | | |
|---|---|---|
| SEQ ID NO: 9 | moltype = AA  length = 894 | |
| FEATURE | Location/Qualifiers | |
| REGION | 1..894 | |
| | note = MISC_FEATURE - Faustovirus ST1 RNA capping enzyme; Genbank accession no. SME65026 | |
| source | 1..894 | |
| | mol_type = protein | |
| | organism = Faustovirus | |

```
SEQUENCE: 9
MRRVSNSAKK QQRCDSVEQV CEFYNADNKT NELELRFDKL NRELFVALFD KLKPDGEITT     60
TMRVSNADGM AREITFGGGV KTGEMFVKKQ NICVFDVVDV FSYKVAVSSE DEVKDKPKMD    120
TNASVRFKIR LSCDTLIPDW RIDLTAVKVA DLGKIAQHTS TVVLQTFPEN LLRMKGAEVA    180
ALATNSYELE LEYIGKSTAG KEKVLKAAEY AIELLTNLRN AVSPVAATLG ESVSDICRIA    240
KLIHPAEYAN VICRTPSFKN LLPQVISLTK SSYYGGIYPP VDMYITGKTD GVRALVLCEN    300
GVAKIITATT VDTTTVGDTP ITILDCELST SGHNGATDNK HLYVFDVIMN RGAHSHRDGF    360
NKRIDIDLSD LTPAGYTLEL KPFTKVADAA SVNETTFKSV FKPPHNEGLV LVESGPPYAL    420
TKTYKWKPIT HNTIDFLIKA CPKQLINVDP FKPRNGHDLW LLFTTISLDQ QRELGIDLIP    480
AWKLLFTDVN LFGNKIPIQF MPAINPLAYI CYLPSSTGVN DGDIVEMRAV DGFDGIPTWE    540
LVRTRPDRKD ERGFYGNNYK IASDIYLNYI DVFNFDDLWK YNPGYFEKNK SDIYIAPNKY    600
RRYLIKSLFN KYIKNAKWVI DAAAGRGADL HLYKQECVEN LLAIDIDPTA ISELIRRRNE    660
ITGWQQRGRG GNMHHNSRHN TRHNTHCASS TSLHALVADL RTEPNMLIPK IIQSRPPERG    720
YDALVINFAI HYLCETDDYI RNFLITVSRL LAHDGVFIFT TMDGEAIVNL LTEHKVAPGA    780
SWVVHTDGNT NATADNVVKY SIKRLYDSDK LTKTGQKIAV LLPMSGEMRE EPLCNIKNIV    840
SMARKMGLDL VESANFSVLY GAYAKDYPEI YAKLTPDDKL YNDLHAFAVF KRKK          894
```

| | | |
|---|---|---|
| SEQ ID NO: 10 | moltype = AA  length = 901 | |
| FEATURE | Location/Qualifiers | |
| REGION | 1..901 | |
| | note = MISC_FEATURE - Faustovirus ST1 RNA capping enzyme; Genbank accession no. SMH63629 | |
| source | 1..901 | |
| | mol_type = protein | |
| | organism = Faustovirus | |

```
SEQUENCE: 10
LEYQYYKYIL VNIMSRRLQR CRDVDQVCEY YNAKGAIGEL ELRFDKLTPD LFAHVFDKLK     60
PDGEISTTMR VSNSDGTARE ITFGGGVKTG ETFVRKQNIC VFDVVDIFSY KVAVSTEETL    120
VDKPAMEKDA SVRFKIRMSV EGAVPNWRID LTAVKTAELG KIAQHTASLV LQTFPPNLLK    180
MSGAEVAKLA NNSYELELEY IGKTPATKER VDAAAKYAVD LLAGIKNANS AVGAVLGESI    240
SDICRVAKVI HTPDYATVVC RNPSFKMLLP QVISLTKSSY YGGIYPPEGM YVAGKTDGVR    300
ALVLCEDGVA KVITAESVDI TTGTCTGTTI LDCELSTGKS GATLHVFDII MHNSKPIHSQ    360
PFSTRIATDI SDVKIPEYKI AIKPFVKIQA TALEAAFKEV YKAPHNEGLI LIMDGNDYAM    420
TKTYKWKPLS HNTIDFLIKA CPKQLLNIDP YKPRPGHKLW LLFTTISLDQ QRELGIEFIP    480
AWKMLFTDIN LFGSRVPIQF MPAINPLAYI CYLPEAATCA NGDAINDGDI VEMRAVDGFD    540
TVPKWEPIRV RSDRKDEPGF YGNNYKIASD IYLNYIDIFQ FEDLYKYNPG YFEKNKSDIY    600
VAPNKYRRFL IKNIFSKYLK NAKWVIDAAA GRGADLHLYK AECVENLLAI DIDPTAISEL    660
VRRRNEITGY NRGHRGHRGG SMRAHMGASH HGAQNCAKST TLHALVADLR TDPDVLIPKI    720
IQSRPPERGY DAIVINFAIH YLCEDTEHIR DFLITVSRLL APNGIPMFTT MDGESIVKLL    780
ETHKVKSGES WTVHTGADDP EAGVIKYSIR RLYDSDKLTK TGQQIAVLLP MSGEMKTEPL    840
CNIKNIISIA RKMGLDLVES ADFSVMYDAF ARAYPEISAR LTPDDKLYND LHSYAVFKRK    900
K                                                                 901
```

| | | |
|---|---|---|
| SEQ ID NO: 11 | moltype = AA  length = 1170 | |
| FEATURE | Location/Qualifiers | |
| REGION | 1..1170 | |
| | note = MISC_FEATURE - mimivirus RNA capping enzyme; Genbank accession no. AAV50651 | |
| source | 1..1170 | |
| | mol_type = protein | |
| | organism = Acanthamoeba polyphaga | |

```
SEQUENCE: 11
MGTKLKKSNN DITIFSENEY NEIVEMLRDY SNGDNLEFEV SFKNINYPNF MRITEHYINI     60
TPENKIESNN YLDISLIFPD KNVYRVSLFN QEQIGEFITK FSKASSNDIS RYIVSLDPSD    120
DIEIVYKNRG SGKLIGIDNW AITIKSTEEI PLVAGKSKIS KPKITGSERI MYRYKTRYSF    180
TINKNSRIDI TDVKSSPIIW KLMTVPSNYE LELELINKID INTLESELLN VFMIIQDTKI    240
PISKAESDTV VEEYRNLLNV RQTNNLDSRN VISVNSNHII NFIPNRYAVT DKADGERYFL    300
FSLNSGIYLL SINLTVKKLN IPVLEKRYQN MLIDGEYIKT TGHDLFMVFD VIFAEGTDYR    360
YDNTYSLPKR IIIINNIIDK CFGNLIPFND YTDKHNNLEL DSIKTYYKSE LSNYWKNFKN    420
RLNKSTDLFI TRKLYLVPYG IDSSEIFMYA DMIWKLYVTP IFPYQLDGI  IYTPINSPYL    480
IRGGIDAYDT IPMEYKWKPP SQNSIDFYIR FKKDVSGADA VYYDNSVERA EGKPYKICLL    540
YVGLNKQGQE IPIQFKVNGV EQTANIYTKD GEATDINGNA INDNTVVEFV FDTLKIDMDD    600
SYKWIPIRTR YDKTESVQKY HKRYGNNLQI ANRIWKTITN PITEDIISSL GDPTTFNKEI    660
TLLSDFRDTK YNKQALTYYQ KNTSNAAGMR AFNNWIKSNM ITTYCRDGSK VLDIGCGRGG    720
DLIKFINAGV EFYVGIDIDN NGLYVINDSA NNRYKNLKLT IQNIPPMYFI NADARGLFTL    780
EAQEKILPGM PDFNKSLINK YLVGNKYDTI NCQFTIHYYL SDELSWNNFC KNINNQLKDN    840
GYLLITSFDG NLIHNKLKGK QKLSSSYTDN RGNKNIFFEI NKIYSDTDKV GLGMAIDLYN    900
SLISNPGTYI REYLVPPEFL EKSLKEKCGL ELVESDLFYN IFNTYKNYFK KTYNEYGMTD    960
VSSKKHSEIR EFYLSLEGNA NNDIEIDIAR ASFKLAMLNR YVFRKTSTI  NITEPSRIVN   1020
ELNNRIDLGK FIMPYFRTNN MFIDLDNVDT DINRVYRNIR NKYRTTRPHV YLIKHNINEN   1080
RLEDIYLSNN KLDFSKIKNG SDPKVLLIYK SPDKQFYPLY YQNYQSMPFD LDQIYLPDKK   1140
```

```
KYLLDSDRII NDLNILINLT EKIKNIPQLS                                           1170

SEQ ID NO: 12               moltype = AA  length = 1162
FEATURE                     Location/Qualifiers
REGION                      1..1162
                            note = misc_feature - moumouvirus RNA capping enzyme;
                            Genbank accession no. YP_007354410
source                      1..1162
                            mol_type = protein
                            organism = Acanthamoeba polyphaga
SEQUENCE: 12
MVTKNKSENI RDILGSDNVS RVEEMINNFR KNRNTEFEIS VRKINYSNYI RISEYYVNTS   60
SDIQQVTSLD ISIILEDGNT YRVSFLNENL INDFLSKYSN MKYGDIVKYI LALNPNDDIE  120
IIYKNRGSAD RLSIEDLNLV VKLTEEVPVL NNTTKPKLSG REKILYRYKN RYSFIIDDIT  180
RIDITDVKET PNIWELSRKI SNYEIELEFT NNKIKSNQVF EKIFDLLRIV QNTEIPIGIR  240
ESKQVITDYQ NLLNLRSSNH LDSRNVVSIE TQHIVKFVPN RYAITDKADG ERYFLFSTPN  300
GVYLLSTNLT VKKVNIPVLQ KDFQNMLLDG ELIDIDGKEL FMVFDVVYHN GIDYRYDTNY  360
TLTHRIIIIN DIIDKAFNNL IPFTDYTDKY NNLELDKIKE FYSNEIKTYW KNFSKKLKNY  420
SGLFISRKLY FVPYGIDSSE VFMYADLVWK LCVYDQLTPY KLDGIIYTPI ASPYMIKTSA  480
NELDSVPMEY KWKPPSQNSI DFYVKFDKDA RGNEAIYYDN AVVRGEGRPY KVCGLFVGLN  540
KGGEEKPIAF KVAGVEQKAF IYLTNDEALD LSGNVINDNT VVEFIFDNFK TDMDDPYKWI  600
PVRTRYDKTE SVQKYRKKYG NNLHIATRIW RTITNPVTEE IIAALGNAST FEKEMSKLVK  660
MNESYNKQSF SYYQKNTSNA IGMRAFNNFI KSNMITTYCK DKDSVLDIGC GRGGDLIKFI  720
HANIREYVGL DIDNNGLYVI NDSAFNRYKN LKKTNKNVPP MTFINADARG LFNVEAQEKI  780
LPNMSESNKK LINNYLSSNK KYDAINCQFT IHYYLSDDIS WNNFCQNINN HIKDNGYLLI  840
TCFDGQLIYD KLKGKQKYSS SYTDNFGKKN IFFEINKIYS DEEIKPVGMA IDIYNSLISN  900
PGTYQREYLV FPDFLQKSLK DQCGLELVET DMFYNIFNLY RNYFTINNGT FSTGEISSKR  960
YNEIKDFYLA LEGKSSSVTE SDIAFASFKL AMLNRYYIFK KKTVINITEP SHIVSGVNKK 1020
TDLGKVLMPY FITNNMIIDY SLGNNDVNKI YHFIRKKYSP IKPSVYLVRH NIIDNPMDGI 1080
TFSRNKLEFI KIKNGTDPKV LLIYKSPEKI FYPFYYQRLE NHDYSEDYLK NNIYLKDNGT 1140
YLLDSNKIIN DLNMLVNISG KV                                         1162

SEQ ID NO: 13               moltype = RNA  length = 25
FEATURE                     Location/Qualifiers
misc_feature                1..25
                            note = Synthetic construct
misc_feature                1..25
                            note = RNA1
source                      1..25
                            mol_type = other RNA
                            organism = synthetic construct
SEQUENCE: 13
gtagaacttc gtcgagtacg ctcaa                                                 25

SEQ ID NO: 14               moltype = RNA  length = 23
FEATURE                     Location/Qualifiers
misc_feature                1..23
                            note = Synthetic construct
misc_feature                1..23
                            note = RNA2
source                      1..23
                            mol_type = other RNA
                            organism = synthetic construct
SEQUENCE: 14
gcaagtcttc gtcgagtact tgc                                                   23

SEQ ID NO: 15               moltype = RNA  length = 24
FEATURE                     Location/Qualifiers
misc_feature                1..24
                            note = Synthetic construct
misc_feature                1..24
                            note = RNA3
source                      1..24
                            mol_type = other RNA
                            organism = synthetic construct
SEQUENCE: 15
ggcaagtctt cgtcgagtac ttgc                                                  24

SEQ ID NO: 16               moltype = RNA  length = 25
FEATURE                     Location/Qualifiers
misc_feature                1..25
                            note = Synthetic construct
misc_feature                1..25
                            note = RNA4
source                      1..25
                            mol_type = other RNA
                            organism = synthetic construct
SEQUENCE: 16
gggcaagtct tcgtcgagta cttgc                                                 25
```

```
SEQ ID NO: 17            moltype = RNA  length = 150
FEATURE                  Location/Qualifiers
misc_feature             1..150
                         note = Synthetic construct
source                   1..150
                         mol_type = other RNA
                         organism = synthetic construct
SEQUENCE: 17
gggagtcttc gccgagaggg ccatcgccag ttgccgcaac ctgtgggaat ttctcttcca   60
gtttatccgg atgctcaacg gtgactttaa ttccggtatc tttctcgaat ttcttaccga  120
cttcagcgag ctcgacaatg ctcttcccta                                   150

SEQ ID NO: 18            moltype = RNA  length = 1753
FEATURE                  Location/Qualifiers
misc_feature             1..1753
                         note = Synthetic construct
misc_feature             1..1753
                         note = Sequence of the fluc transcript
source                   1..1753
                         mol_type = other RNA
                         organism = synthetic construct
SEQUENCE: 18
gggtctagaa ataattttgt ttaactttaa gaaggagata taaccatgaa aatcgaagaa    60
ggtaaaggtc accatcacca tcaccacgga tccatggaag acgccaaaaa cataaagaaa   120
ggcccggcgc cattctatcc tctagaggat ggaaccgctg gagagcaact gcataaggct   180
atgaagagat acgccctggt tcctggaaca attgctttta cagatgcaca tatcgaggtg   240
aacatcacgt acgcggaata cttcgaaatg tccgttcggt tggcagaagc tatgaaacga   300
tatgggctga atacaaatca cagaatcgtc gtatgcagtg aaaactctct tcaattcttt   360
atgccggtgt tgggcgcgtt atttatcgga gttgcagttg cgcccgcgaa cgacatttat   420
aatgaacgtg aattgctcaa cagtatgaac atttcgcagc ctaccgtagt gtttgtttcc   480
aaaaagggt tgcaaaaaat tttgaacgtg caaaaaaat taccaataat ccagaaaatt     540
attatcatgg attctaaaac ggattaccag ggatttcagt cgatgtacac gttcgtcaca   600
tctcatctac ctcccggttt taatgaatac gattttgtac cagagtcctt tgatcgtgac   660
aaaacaattg cactgataat gaattcctct ggatctactg ggttacctaa gggtgtggcc   720
cttccgcata gaactgcctg cgtcagattc tcgcatgcca gagatcctat ttttggcaat   780
caaatcattc cggatactgc gattttaagt gttgttccat tccatcacgg ttttggaatg   840
tttactacac tcggatattt gatatgtgga tttcgagtcg tcttaatgta tagatttgaa   900
gaagagctgt ttttacgatc ccttcaggat tacaaaattc aaagtgcgtt gctagtacca   960
accctatttt cattcttcgc caaaagcact ctgattgaca aatacgattt atctaattta  1020
cacgaaattg cttctggggg cgcacctctt tcgaaagaag tcggggaagc ggttgcaaaa  1080
cgcttccatc ttccagggat acgacaagga tatgggctca ctgagactac atcagctatt  1140
ctgattacac ccgaggggga tgataaaccg ggcgcggtcg gtaaagttgt tccatttttt  1200
gaagcgaagg ttgtggatct ggataccggg aaaacgctgg gcgttaatca gagaggcgaa  1260
ttatgtgtca gaggacctat gattatgtcc ggttatgtaa acaatccgga agcgaccaac  1320
gccttgattg acaaggatgg atggctacat tctggagaca tagcttactg ggacgaagac  1380
gaacacttct tcatagttga ccgcttgaag tctttaatta aatacaaagg atatcaggtg  1440
gcccccgctg aattggaatc gatattgtta caacaccca acatcttcga cgcgggcgtg  1500
gcaggtcttc ccgacgatga cgccggtgaa cttcccgccg ccgttgttgt tttggagcac  1560
ggaaagacga tgacggaaaa agagatcgtg gattacgtcg ccagtcaagt aacaaccgcg  1620
aaaaagttgc gcggaggagt tgtgtttgtg gacgaagtac cgaaaggtct taccggaaaa  1680
ctcgacgcaa gaaaaatcag agagatcctc ataaaggcca agaagggcgg aaagtccaaa  1740
ctcgagtaag gtt                                                    1753

SEQ ID NO: 19            moltype = DNA  length = 44
FEATURE                  Location/Qualifiers
misc_feature             1..44
                         note = Synthetic construct
misc_feature             1..44
                         note = Targeting oligo for fluc transcript
misc_feature             44
                         note = C is TEG-desthiobiotin
source                   1..44
                         mol_type = other DNA
                         organism = synthetic construct
variation                18
                         note = n=u
variation                20
                         note = n=u
variation                24
                         note = n=u
variation                26
                         note = n=u
variation                28
                         note = n=u
variation                32
                         note = n=u
SEQUENCE: 19
gttaaarcra rararnrn rarnrnrnrc rnrargrarc rcrc                      44
```

```
SEQ ID NO: 20              moltype = AA   length = 1778
FEATURE                    Location/Qualifiers
REGION                     1..1778
                           note = Synthetic construct
REGION                     1..1778
                           note = MISC_FEATURE - The amino acid sequence of H3C2:T7
                           RNA polymerase fusion protein
source                     1..1778
                           mol_type = protein
                           organism = synthetic construct
SEQUENCE: 20
MKIEEHHHHH HHHGASTAKR LQRCQDVNQV CEIYNSKGGI GELELRFDKL PQNLFAGVFD    60
KLKPDGEIQT TMRVSNRDGV AREITFGGGV KTNEIFVKKQ NICVFDVVDI FSYKVAVSTE   120
ETVVEKPTME TTAGVRFKIR LSVEDVVKDW RIDLTAVKTA ELGKIAQHTA SIVQRTFPDN   180
LLKLTGAEVA KLAADSYELE LEYTGKSPAT NEKVNVAAKY AVELLSSVRN ANSTAAASFG   240
ESVSDLCRVA KIIHTHEYAN VVCRTPSFKM LLPQVVSLTK SSYYGGLYPP ENLWLAGKTD   300
GVRALVVCED GVAKVITAES VDITHGVCSA TTILDCELNV DAKILYVFDV IISNNTQVYT   360
QPFSTRITTD ISDIKIDGYK IEMKPFVKVV KADEATFKSA YKAPHNEGLI MIEDGAAYAA   420
TKTYKWKPLS HNTIDFLIKA CPKQLINVDP YKPRAGYKLW LLFTTISLDQ QRELGIEFIP   480
AWKILFTDIN MFGSRVPIQF QPAINPLAYV CYLPEDVNVN DGDIVEMRAV DGYDTIPKWE   540
LVRSRNDRKN EPGFYGNNYK IASDIYLNYI DVFHFEDLYK YNPGYFEKNK SDIYVAPNKY   600
RRYLIKSLFG RYLRDAKWVI DAAAGRGADL HLYKAECVEH LLAIDIDPTA ISELVRRRNE   660
ITGYNKSHRG GRNMHSHRGQ SHCAKSTSLH ALVADLRENP DVLIPKIIQS RPHERCYDAI   720
VINFAIHYLC DTDEHIRDFL ITVSRLLAPN GVFIFTTMDG ESIVKLLADH KVRPGEAWTI   780
HTGDVNSPDS TVPKYSIRRL YDSDKLTKTG QQIEVLLPMS GEMKAEPLCN IKNIISMARK   840
MGLDLVESAN FSVLYEAYAR DYPDIYARMT PDDKLYNDLH TYAVFKRKKG ASTASTNTIN   900
IAKNDFSDIE LAAIPFNTLA DHYGERLARE QLALEHESYE MGEARFRKMF ERQLKAGEVA   960
DNAAAKPLIT TLLPKMIARI NDWFEEVKAK RGKRPTAFQF LQEIKPEAVA YITIKTTLAC  1020
LTSADNTTVQ AVASAIGRAI EDEARFGRIR DLEAKHFKKN VEEQLNKRVG HVYKKAFMQV  1080
VEADMLSKGL LGGEAWSSWH KEDSIHVGVR CIEMLIESTG MVSLHRQNAG VVGQDSETIE  1140
LAPEYAEAIA TRAGALAGIS PMFQPCVVPP KPWTGITGGG YWANGRRPLA LVRTHSKKAL  1200
MRYEDVYMPE VYKAINIAQN TAWKINKKVL AVANVITKWK HCPVEDIPAI EREELPMKPE  1260
DIDMNPEALT AWKRAAAAVY RKDKARKSRR ISLEFMLEQA NFKANHKAIW FPYNMDWRGR  1320
VYAVSMFNPQ GNDMTKGLLT LAKGKPIGKE GYYWLKIHGA NCAGVDKPF  PERIKFIEEN  1380
HENIMACAKS PLENTWWAEQ DSPFCFLAFC FEYAGVQHHG LSYNCSLPLA FDGSCSGIQH  1440
FSAMLRDEVG GRAVNLLPSE TVQDIYGIVA KKVNEILQAD AINGTDNEVV TVTDENTGEI  1500
SEKVKLGTKA LAGQWLAYGV TRSVTKRSVM TLAYGSKEFG FRQQVLEDTI QPAIDSGKGL  1560
MFTQPNQAAG YMAKLIWESV SVTVVAAVEA MNWLKSAAKL LAAEVKDKKT GEILRKRCAV  1620
HWVTPDGFPV WQEYKKPIQT RLNLMFLGQF RLQPTINTNK DSEIDAHKQE SGIAPNFVHS  1680
QDGSHLRKTV VWAHEKYGIE SFALIHDSFG TIPADAANLF KAVRETMVDT YESCDVLADF  1740
YDQFADQLHE SQLDKMPALP AKGNLNLRDI LESDFAFA                          1778

SEQ ID NO: 21              moltype = DNA   length = 5337
FEATURE                    Location/Qualifiers
misc_feature               1..5337
                           note = Synthetic construct
misc_feature               1..5337
                           note = Nucleotide sequence of H3C2:T7 RNA polymerase fusion
                           protein
source                     1..5337
                           mol_type = other DNA
                           organism = synthetic construct
SEQUENCE: 21
atgaagattg aggagcatca tcatcatcat catcatcatg gcgcgagcac cgcgaagcgt    60
ctgcagcgtt gccaggacgt gaaccaagtg tgcgaaatct acaacagcaa gggtggcatt   120
ggcgagctgg aactgcgttt cgataaactg ccgcagaacc tgttcgcggg cgttttcgat   180
aagctgaaac cggacggcga gattcaaacc accatgcgtg ttagcaaccg tgacggtgtg   240
gcgcgtgaaa tcaccttttgg tggcggtgtt aagaccaacg agatcttcgt gaagaaacag   300
aacatttgcg ttttcgacgt ggttgatatc tttagctaca aggtggcggt tagcaccgag   360
gaaccgttga ttgaaaagcc gaccatggag accaccgcgg gcgtgcgttt taaaattcgt   420
ctgagcgttg aagacgtggt taaggattgg cgtatcgatc tgaccgcggt gaagaccgcg   480
gagctgggta aaatcgcgca gcacaccgcg agcattgttc aacgtacctt cccggataac   540
ctgctgaagc tgaccggtgc ggaagtggcg aaactggccg cagacagcta cgagctggag   600
ctggagtata ccggcaagag cccggcgacc aacgaaaagg tgaacgttgc ggcgaaatac   660
gcggttgagc tgctgagcag cgtgcgtaac gcgaacagca ccgcggcggc gagctttggt   720
gaaagcgtta gcgacctgtg ccgtgtggcg aaaatcattc acacccacga gtacgcgaac   780
gtggtttttgc gtacccccgag cttcaaaatg ctgctgccgc aggtggttag cctgaccaag   840
agcagctact atggcgggtct gtatccgccg gaaaacctgt ggctggcggg caagactgat   900
ggcgtgcgtg cgctggttgt gtgcgaagac ggctggcgga aagttatcac cgcggagagc   960
gttgatatta cccacggtgt gtgcagcgcg accaccattc tggattgcga gctgaacgtt  1020
gacgcgaaga tcctgtacgt gtttgacgtt atcattagca caacacccca ggtgtatacc  1080
caaccgttca gcaccccgta taccaccgac attagcgata tcaagatcga tggttacaag  1140
atcgaaatga tgaagccgtt tgttaaggtg gttaaggcgga cgaggcaccct aagagcgcg  1200
tataaagcgc cgcacaacga aggcctgatc atgattgaag atggtgccgg ctacgcggcc  1260
accaagacct ataagtggaa accgctgagc cacaacacca tcgatttcct gattaaggcg  1320
tgcccgaaac agctgattaa cgtggacccg tacaagccgc gtgcgggtta taaactgtgg  1380
ctgctgttta ccaccatcag cctggatcag caacgtgaac tgggcatcga gttcattccg  1440
gcgtggaaaa tcctgttcac cgacattaac atgtttggta gccgtgtgcc gatccagttt  1500
```

```
                                                             -continued caaccggcga ttaacccgct ggcgtacgtt tgctatctgc cggaagacgt gaacgttaac  1560
gacggcgata ttgttgagat gcgtgcggtg gacggttacg ataccatccc gaaatgggaa  1620
ctggttcgta gccgtaacga tcgtaagaac gagccgggtt tctacggcaa caactataaa  1680
atcgcgagcg acatttacct gaactatatt gatgttttcc actttgaaga cctgtacaaa  1740
tataacccgg gctacttcga gaagaacaag agcgatatct acgtggcgcc gaacaagtac  1800
cgtcgttatc tgatcaaaag cctgttcggt cgttacctgc gtgatgcgaa gtgggtgatt  1860
gatgcggcgc gggtcgtggc gcggacctg cacctgtata aagcggaatg cgttgagcac  1920
ctgctggcga tcgacattga tccgaccgcg atcagcgaac tggtgcgtcg tcgtaacgag  1980
attaccggct acaacaagag ccaccgtggc ggtcgtaaca tgcacagcca ccgtggtcag  2040
agccactgcg cgaaaagcac cagcctgcac gcgctggttg cggatctgcg tgaaaacccg  2100
gacgttctga ttccgaagat cattcaaagc cgtccgcacg agcgttgcta cgatgcgatc  2160
gttattaact ttgcgatcca ctatctgtgc gacaccgatg aacacatccg tgacttcctg  2220
attaccgtga gccgtctgct ggcgccgaac ggtgttttca tctttaccac catgatggt   2280
gaaagcattg tgaagctgct ggcggaccac aaagttcgtc cgggtgaagc gtggaccatc  2340
cacaccggtg atgtgaacag cccggacagc accgttccga aatacagcat tcgtcgtctg  2400
tatgacagcg ataagctgac caaaaccggc cagcaaatcg aggttctgct gccgatgagc  2460
ggtgaaatga aggcggagcc gctgtgcaac attaaaaaca tcattagcat ggcgcgtaag  2520
atgggtctgg atctggtgga aagcgcgaac tttagcgttc tgtacgaggc gtatgcgcgt  2580
gactacccgg atatctatgc gcgtatgacc ccggacgata gctgtacaa cgacctgcac  2640
acctatgcgg tgttcaagcg taagaaaggc gcgagcaccg cgagcaccaa caccatcaac  2700
attgcgaaga acgactttag cgatatcgag ctggcggcga ttccgttcaa caccctggcg  2760
gaccactacg gtgaacgtct ggcgcgtgag cagctggcgc tggaacacga gagctatgaa  2820
atgggcgagg cgcgttttccg taagatgttt gaacgtcaac tgaaagcggg tgaggttgcg  2880
gataacgcgg cggcgaaacc gctgattacc acccgctgc gaagatgat cgcgcgtatt  2940
aacgactggt tcgaggaagt taaggcgaaa cgtggtaaac gtccgaccgc gttccagttt  3000
ctgcaagaaa tcaaaccgga ggcggtggc tacatcacca ttaaaaccac cctggcgtgc  3060
ctgaccagcg cggacaacac caccgtgcag gcggttgcga gcgcgattgg tcgtgcgatt  3120
gaagatgagg cgcgttttgg tcgtatccgt gacctggaag cgaagcactt caagaaaaac  3180
gttgaggaac agctgaacaa acgtgtgggc cacgttata agaaagcgtt catgcaagtg   3240
gttgaggcgg atatgctgag caagggtctg ctggcggtg aagcgtggag cagctggcac  3300
aaagaggaca gcatccacgt gggcgttcgt tgcatcgaaa tgctgattga gagcaccggt  3360
atggttagcc tgcaccgtca gaacgcgggt gtggttggcc aagatagcga aaccatcgag  3420
ctggcgccgg aatacgcgga ggcgattgcg acccgtgcgg gtgcgctggc gggtatcagc  3480
ccgatgtttc aaccgtcgt ggttccgccg aagccgtgga ccggtattac cggcggttggc  3540
tactggcaga acggtcgtcg tccgctggcg ctggtgcgta cccacagcaa gaaagcgctg  3600
atgcgttacg aagacgttta tatgccgaa gtgtataagg cgatcaacat tgcgcaaaac  3660
accgcgtgga aattaacaa gaaagtgctg gcgttgcga acgtgatcac caagtggaaa   3720
cactgcccgg ttgaagatat cccggcgatt gagcgtgagg aactgccgat gaaaccggaa  3780
gacatcgata tgaacccgga agcgctgacc gcgtggaaac gtgcggcggc ggcggtgtac  3840
cgtaaggaca aagcgcgtaa aagccgtcgt attagcctgg aattcatgct ggagcaggcg  3900
aacaagtttg cgaaccacaa agcgatctgg ttcccgtaca acatggattg gcgtggccgt  3960
gtttatgctg tgagcatgtt caacccgcaa ggcaacgaca tgaccaaggg cctgctgacc  4020
ctggcgaagg gtaaaccgat tggcaaggaa ggctactatt ggctgaaaat ccacggtgcg  4080
aactgcgcgg gcgttgataa agtgccgttc ccggaacgta tcaagtttat tgaggaaaac  4140
cacgagaaca tcatgcgtg cgcgaaaagc ccgctggaaa acaccggtg gcggagcag   4200
gacagcccgt tctgctttct ggcgttctgc tttgagtacg cgggtgttca acaccacggc  4260
ctgagctata actgcagcct gccgctggcg tttgatggta gctgcagcgg catccagcac  4320
ttcagcgcga tgctgcgtga cgaagttggt ggccgtgcgg tgaacctgct gccgagcgag  4380
accgtgcagg atatctacgg tattgttgcg aagaaagtga acgagatcct gcaagcggat  4440
gcgattaacg gcaccgacaa cgaagtggtt accgtgaccg acgagaacac cggtgaaatc  4500
agcgagaagg ttaaactggg taccaaagcg ctggcgggcc agtggctggc gtacggtgtt  4560
acccgtagcg tgaccaagcg tagcgttatg acctggcgt atggtagcaa agaattcggc  4620
tttcgtcagc aagtgctgga ggataccatc caaccggcga ttgacagcgg caagggcctg  4680
atgtttaccc agccgaacca agcggcgggt tacatggcga aactgatctg ggaaagcgtg  4740
agcgttaccg tggttgcggc ggttgaggcg atgaactggc tgaagagcgg cgcgaaactg  4800
ctggcggcgg aagtgaaaga taagaaaacc ggcgagattc tgcgtaagcg ttgcgcggtt  4860
cactgggtga cccgacgg tttcccggtt tggcaggaat ataagaaacc gatccaaacc  4920
cgtctgaacc tgatgttcct gggcagttt cgtctgcaac cgaccatcaa caccaacaaa  4980
gatagcgaaa ttgacgcgca caagcaggag agcggcattg cgccgaactt tgtgcacagc  5040
caagacggta gccacctgcg taaaaccgtg gtttgggcgc acgaaaagta cggcatcgag  5100
agcttcgcgc tgattcacga tagctttggt accattccgg cggatgcggc gaacctgttc  5160
aaggcggttc gtgaaaccat ggtggatacc tacgagagct gcgacgtgct ggcggacttc  5220
tatgatcagt ttgcggatca actgcacgag agccagctgg acaaaatgcc ggcgctgccg  5280
gcgaagggta acctgaacct gcgtgacatt ctggagagcg attttgcgtt tgcgtaa     5337
```

ENZYMATIC RNA CAPPING METHOD

CROSS-REFERENCE TO RELATED APPLICATIONS

This application is a divisional of U.S. application Ser. No. 17/001,236 filed Aug. 24, 2020, which is a continuation of International Application No. PCT/US20/47521 filed Aug. 21, 2020 and a continuation of International Application No. PCT/US20/47533 filed Aug. 21, 2020. This application also claims priority to U.S. Provisional Application No. 62/890,821 filed Aug. 23, 2019. The contents of all of the above are hereby incorporated in their entirety by reference.

SEQUENCE LISTING STATEMENT

This disclosure includes a Sequence Listing submitted electronically in .xml format under the file name "NEB-423-DIV-US" created on Aug. 2, 2024, and having a size of 48.2 KB. This Sequence Listing is incorporated herein in its entirety by this reference.

BACKGROUND

The addition of a cap to uncapped synthetic RNA is important for efficient protein expression in many eukaryotic cells. Moreover, uncapped RNAs (at least RNAs that have a 5'-triphosphate) are reported to activate the innate immune response (Pichlmair, et al., Science 2006 314: 997-1001; Diamond, et al., Cytokine & Growth Factor Reviews, 2014 25: 543-550). As such, it is highly desirable to add a cap to synthetic RNA in many therapeutic applications (e.g., protein replacement therapy as well as prophylactic or therapeutic vaccination).

Currently, two methods that are used to cap RNA. In the first method, synthetic RNAs (e.g., RNAs transcribed in vitro) are converted to capped RNAs using an RNA capping enzyme. In the other method (which is generally referred to as "co-transcriptional capping") cap analogs such as anti-reverse cap analog (ARCA) and capped dinucleotides are added to the in vitro transcription reaction. In the co-transcriptional methods, the cap is co-transcriptionally incorporated into RNA molecules during in vitro transcription.

Compared to the co-transcriptional capping method, the enzymatic RNA capping method can achieve higher yields of capped RNA. However, enzymatic RNA capping reactions are quite inefficient and, as such, either large amounts of enzyme are used, or the capped RNA must be purified from the uncapped RNA. Further, the efficiency of enzymatic RNA capping reactions (expressed as a percentage of capped RNA after the completion of a capping reaction) can vary from one RNA sequence to another, a difference that is generally attributed to RNA structure (see, e.g., Fuchs, RNA. 2016 22: 1454-66). Therefore, there is still a need for a more efficient way to add cap to synthetic RNAs.

SUMMARY

This disclosure provides, among other things, a method for efficiently capping RNA in vitro. In some embodiments, a method may comprise contacting (i) an RNA sample comprising an uncapped target RNA, (ii) an RNA capping enzyme comprising an amino acid sequence that is at least 90% identical to (e.g., at least 95% identical to) SEQ ID NOS:1, 7 or 20, (iii) guanosine triphosphate (GTP) or modified GTP. (iv) a buffering agent, and optionally (v) a methyl group donor at a temperature in the range of 40° C.-60° C., to form (e.g., to efficiently form) a capped target RNA. The efficiency determined by yield of capped RNA (50%)/enzyme concentration (nM) may be improved by at least 2-fold or at least 3-fold compared to the capping efficiency of the enzyme at 37° C. An uncapped target RNA optionally may be free of modified nucleotides or may comprise one or more modified nucleotides (e.g., pseudouridine).

In some embodiments, a method may comprise contacting (i) an RNA sample comprising an uncapped target RNA, (ii) a single-chain RNA capping enzyme that has RNA triphosphatase (TPase), guanylyltransferase (GTase) and guanine-N7 methyltransferase (N7 MTase) activities, (iii) GTP or modified GTP. (iv) a buffering agent, and optionally (v) methyl group donor at a temperature in the range of 37° C.-60° C., to form (e.g., to efficiently form) a capped target RNA. A single-chain RNA capping enzyme (e.g., RNA capping enzymes from of giant viruses such as Faustovirus, Mimivirus or Moumouvirus) may comprise: (a) an amino acid sequence at least 90% identical to (e.g., at least 95% identical to) (x) SEQ ID NO:2. (y) SEQ ID NO:3, and/or (z) SEQ ID NO:4 or (b) an amino acid sequence at least 90% identical to (e.g., at least 95% identical to) (x) SEQ ID NO:5 and/or (y) SEQ ID NO:6. For example, RNA capping enzymes of giant viruses such as Faustovirus, Mimivirus or Moumouvirus may comprise an amino acid sequence at least 90% identical to (e.g., at least 95% identical to) (a) SEQ ID NO:2. (b) SEQ ID NO:3. (c) SEQ ID NO:4, (d) SEQ ID NO:5, and/or (e) SEQ ID NO:6. RNA capping enzymes from Faustovirus (which are examples of single-chain RNA capping enzymes) may comprises an amino acid sequence that is at least 90% identical to (a) SEQ ID NO:7, (b) SEQ ID NO:8. (c) SEQ ID NO:9. (d) SEQ ID NO:10, (e) SEQ ID NO:11 and/or (f) SEQ ID NO:12.

In some embodiments, an uncapped target RNA may be at least 200 nt in length (e.g., at least 300 nt, at least 500 nt or at least 1,000 nt) and may encode a polypeptide such as a therapeutic protein or vaccine. Target RNA having secondary structure including therapeutic RNA can be capped more efficiently using method of this disclosure. Efficiency may be defined as yield of capped RNA (50%)/enzyme concentration (nM). In any embodiment, a method may comprise contacting at a first temperature (e.g., 37° C.-60° C.) and increasing or decreasing the temperature (e.g., to 37° C.-60° C.) wherein the second temperature differs from the first temperature. For example, a method may include contacting at a first temperature of 37° C. for 1 to 120 minutes and increasing the temperature to 45° C. or 50° C. for 1 to 120 minutes. A method, in some embodiments, may include increasing or decreasing the temperature to a third temperature of 37° C.-60° C. for 1 to 120 minutes. A capping method, in some embodiments, may produce (e.g., may co-transcriptionally produce) more than 70% Cap0 RNA in vitro in one hour or less.

In some embodiments, the components and/or combinations thereof may be RNase-free and contacting may optionally further comprise (v) one or more RNase inhibitors.

The uncapped RNA may be synthesized using solid-phase oligonucleotide synthesis chemistry or by transcribing a DNA template using a polymerase (e.g., T7 RNA polymerase or Hi-T7 RNA polymerase) in an in vitro transcription reaction, for example, by contacting a DNA template encoding the uncapped target RNA and the polymerase.

In any embodiment, contacting may further comprise contacting SAM and/or a cap 2'O methyltransferase enzyme (2'OMTase).

Contacting, in any embodiment, may comprise contacting (i), (ii), (iii), (iv) and (v) in a single location, for example, in a single microfluidics surface, a single reaction tube or other reaction vessel.

Also provided herein is a composition comprising an uncapped target RNA, a single-chain RNA capping enzyme that has TPase, GTase and N7 MTase activities, GTP and a buffering agent. In some embodiments, a composition may have a temperature in the range of 37° C.-60° C. In some embodiments, a composition may be RNase-free and may optionally comprise one or more RNase inhibitors. In some embodiment, a single-chain RNA capping enzyme may comprise: (a) amino acid sequences that are at least 90% identical to (x) SEQ ID NO:2, (y) SEQ ID NO:3, and/or (z) SEQ ID NO:4 or (b) an amino acid sequence that is at least 90% identical to (x) SEQ ID NO:5 and/or (y) SEQ ID NO:6. A single-chain RNA capping enzyme may comprise an amino acid sequence that is at least 90% identical to the RNA capping enzyme of Faustovirus D5b (SEQ ID NO:7), Faustovirus E12 (SEQ ID NO:8), Faustovirus ST1 (SEQ ID NO:9), Faustovirus LC9 (SEQ ID NO:10), mimivirus (SEQ ID NO:11) or moumouvirus (SEQ ID NO:12). In some embodiments, a composition may further comprise a DNA template, a polymerase (e.g., a bacteriophage polymerase) and ribonucleotides, for transcribing the DNA template to form the uncapped target RNA. In some embodiments, a composition may further comprise SAM and/or a cap 2'OMTase. In some embodiments, a single uncapped target RNA may be at least 200 nt in length (at least 300 nt, at least 500 nt or at least 1,000 nt) and may encode a polypeptide such as a therapeutic protein or vaccine.

Also provided is a kit. In some embodiments, a kit may comprise a single-chain RNA capping enzyme that has TPase, GTase and N7 MTase activities, wherein the enzyme is in a storage buffering agent; and a concentrated reaction buffering agent. In some embodiments, a kit may further include a DNA template, a polymerase and ribonucleotides, for transcribing the RNA. In some embodiments, a kit may further include SAM and/or a cap 2'OMTase. Examples of the methods, compositions and kits that utilize methyl transferases may also include SAM in the reaction mix. A single-chain RNA capping enzyme may comprise: (a) an amino acid sequence at least 90% identical to (x) SEQ ID NO:2, (y) SEQ ID NO:3, and/or (z) SEQ ID NO:4 or (b) an amino acid sequence at least 90% identical to (x) SEQ ID NO:5 and/or (y) SEQ ID NO:6. The single-chain RNA capping enzyme may comprises an amino acid sequence that is at least 90% identical to the RNA capping enzyme of Faustovirus D5b (SEQ ID NO:7), Faustovirus E12 (SEQ ID NO:8), Faustovirus ST1 (SEQ ID NO:9), Faustovirus LC9 (SEQ ID NO:10), mimivirus (SEQ ID NO:11) or moumouvirus (SEQ ID NO:12).

In some embodiments, an RNA capping enzyme may an amino acid sequence that is at least 90% identical to SEQ ID NO:20. In some embodiments, an RNA capping enzyme fusion may comprise (a) an amino acid sequence that is at least 90% identical to SEQ ID NO:7 and (b) an amino acid sequence that is at least 90% identical to positions 1419 to 1587 of SEQ ID NO:20.

BRIEF DESCRIPTION OF THE FIGURES

FIG. 3A shows activity of VCE. FIG. 3B shows activity of H3C2. See Table 1 for a quantitative comparison of the capping activity under each condition.

FIG. 4A shows capping activity at 37° C. FIG. 4B shows capping activity at 45° C. FIG. 4C shows capping activity at 50° C. FIG. 4D shows capping activity at 55° C. FIG. 4E shows capping activity at 60° C.

FIG. 5 shows the conserved regions that exhibit 90% or higher sequence identity among the Faustovirus D5b, E12, ST1 and LC9 (SEQ ID NOS:7-10) capping enzyme amino acid sequences mapped to AMH83561 (H3C2). The conserved regions are designated as Fausto_CR_01, Fausto_CR_03 and Fausto_CR_05. Functional domains of H3C2 capping enzyme, namely TPase, GTase and N7 MTase, are indicated FIG. 6 shows the conserved regions that exhibit 90% or higher sequence identity among the *Acanthanomeba polyphaga* mimivirus (AAV50651, SEQ ID NO:11) and *Acanthanomeba polyphaga* moumouvirus capping enzyme amino acid sequences mapped to YP_007354410 (*Acanthanomeba polyphaga* moumouvirus capping enzyme; moumou CE) (SEQ ID NO:12). The conserved regions are designated as moumou_CR_03 (SEQ ID NO:6) and moumou_CR_04 (SEQ ID NO:7). Functional domains of moumou CE, namely TPase, GTase and N7 MTase. are indicated in this alignment with dashed lines above the aligned sequences. The conserved regions are highlighted.

DETAILED DESCRIPTION

Figure 1:
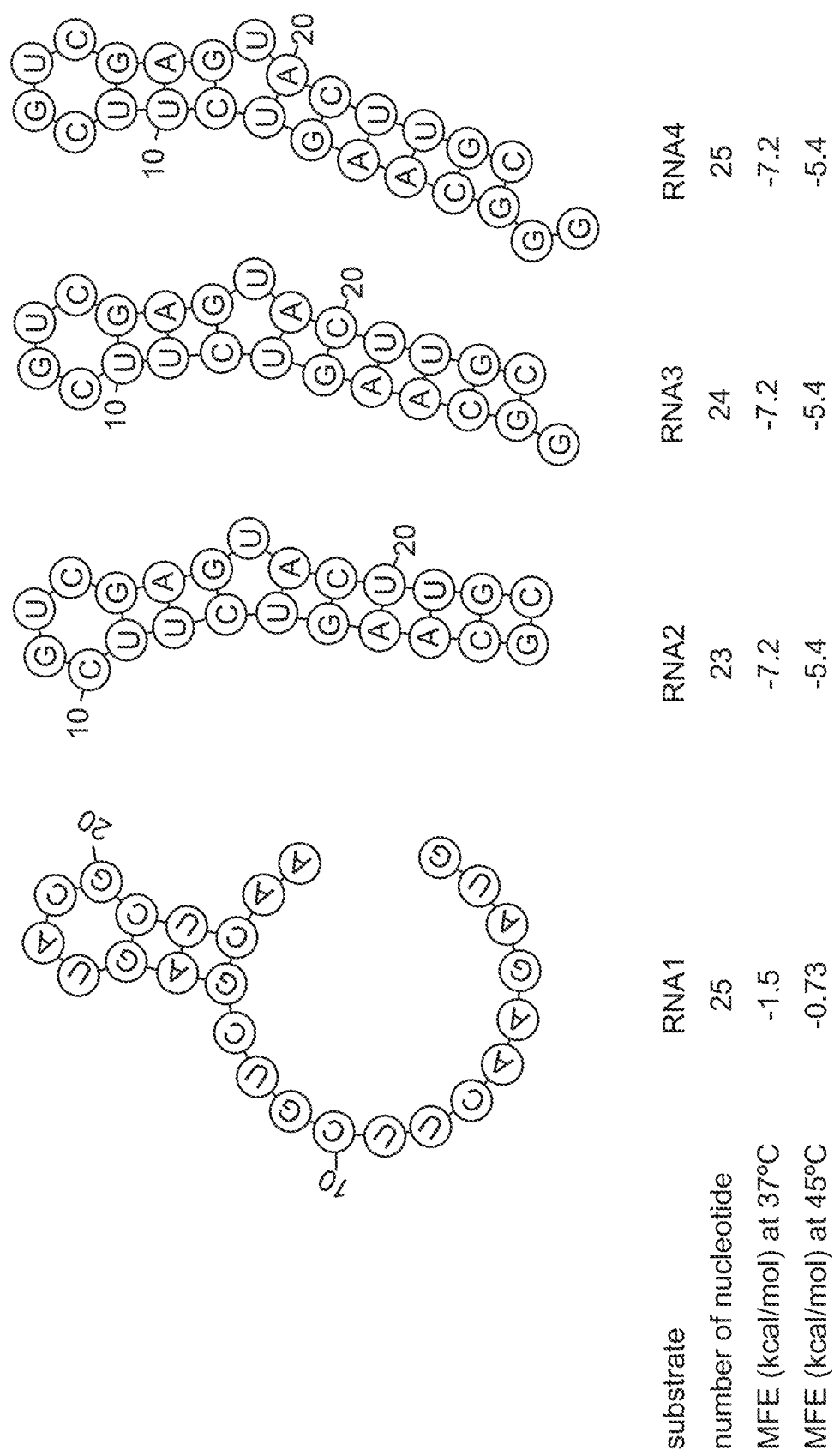
FIG. 1 shows the predicted secondary structure of the model RNA molecules used. RNA1 was designed to have the least secondary structure at the 5' end. RNA2, RNA3 and RNA4 were designed to exhibit the same predicted minimum free energy of unfolding (MFE) while containing a blunt end, one-base or two-base overhang at their 5' ends. The secondary structures and minimum free energy of unfolding at 37° C. and 45° C. were calculated using the RNAFold webserver (Vienna University, Wien, Austria). The modeled RNA molecules have the following sequences: RNA1: SEQ ID NO:13, RNA2: SEQ ID NO:14, RNA3: SEQ ID NO:15, RNA4: SEQ ID NO:16.

Aspects of the present disclosure can be further understood in light of the embodiments, section headings, figures, descriptions and examples, none of which should be construed as limiting the entire scope of the present disclosure in any way. Accordingly, the claims set forth below should be construed in view of the full breadth and spirit of the disclosure.

Each of the individual embodiments described and illustrated herein has discrete components and features which can be readily separated from or combined with the features of any of the other several embodiments without departing from the scope or spirit of the present teachings. Any recited method can be carried out in the order of events recited or in any other order which is logically possible. Disclosed reaction conditions may be varied, including, but not limited to, reaction temperature, reaction duration, reaction components (e.g., enzymes, substrates) and/or reactant concentrations.

Unless otherwise defined, all technical and scientific terms used herein have the same meaning as commonly understood by one of ordinary skill in the art to which this disclosure belongs. Still, certain terms are defined herein with respect to embodiments of the disclosure and for the sake of clarity and ease of reference.

Sources of commonly understood terms and symbols may include: standard treatises and texts such as Kornberg and Baker, DNA Replication, Second Edition (W. H. Freeman, New York, 1992); Lehninger, Biochemistry, Second Edition (Worth Publishers, New York, 1975); Strachan and Read, Human Molecular Genetics, Second Edition (Wiley-Liss, New York, 1999); Eckstein, editor, Oligonucleotides and Analogs: A Practical Approach (Oxford University Press, New York, 1991); Gait, editor, Oligonucleotide Synthesis: A Practical Approach (IRL Press, Oxford, 1984); Singleton, et al., Dictionary of Microbiology and Molecular biology, 2d ed., John Wiley and Sons, New York (1994), and Hale & Markham, the Harper Collins Dictionary of Biology, Harper Perennial, N.Y. (1991) and the like.

As used herein and in the appended claims, the singular forms "a" and "an" include plural referents unless the context clearly dictates otherwise. For example, the term "a protein" refers to one or more proteins, i.e., a single protein and multiple proteins. It is further noted that the claims can be drafted to exclude any optional element. As such, this statement is intended to serve as antecedent basis for use of such exclusive terminology as "solely," "only" and the like in connection with the recitation of claim elements or use of a "negative" limitation.

Numeric ranges are inclusive of the numbers defining the range. All numbers should be understood to encompass the midpoint of the integer above and below the integer i.e., the number 2 encompasses 1.5-2.5. The number 2.5 encompasses 2.45-2.55 etc. When sample numerical values are provided, each alone may represent an intermediate value in a range of values and together may represent the extremes of a range unless specified. e.g.

In the context of the present disclosure, "buffering agent", refers to an agent that allows a solution to resist changes in pH when acid or alkali is added to the solution. Examples of suitable non-naturally occurring buffering agents that may be used in the compositions, kits, and methods of the invention include, for example, Tris, HEPES, TAPS, MOPS, tricine, or MES.

In the context of the present disclosure, "capping" refers to the enzymatic addition of a Nppp-moiety onto the 5' end of an RNA, where N a nucleotide such as is G or a modified G. A modified G may have a methyl group at the N7 position of the guanine ring, or an added label at the 2 or 3 position of the ribose, and, in some embodiments, the label may be an oligonucleotide, a detectable label such as a fluorophore, or a capture moiety such as biotin or desthiobiotin, where the label may be optionally linked to the ribose of the nucleotide by a linker, for example. See, e.g., WO 2015/085142. A cap may have a Cap-O structure, a Cap-1 structure or a cap 2 structure (as reviewed in Ramanathan, Nucleic Acids Res. 2016 44: 7511-7526), depending on which enzymes and/or whether SAM is present in the capping reaction.

In the context of the present disclosure, "DNA template" refers to a double stranded DNA molecule that is transcribed in an in vitro transcription reaction. DNA templates have a promoter (e.g., a T7, T3 or SP6 promoter) recognized by the RNA polymerase upstream of the region that is transcribed.

In the context of the present disclosure, "fusion" refers to two or more polypeptides, subunits, or proteins covalently joined to one another (e.g., by a peptide bond). For example, a protein fusion may refer to a non-naturally occurring polypeptide comprising a protein of interest covalently joined to a reporter protein. Alternatively, a fusion may comprise a non-naturally occurring combined polypeptide chain comprising two proteins or two protein domains joined directly to each other by a peptide bond or joined through a peptide linker.

In the context of the present disclosure, "in vitro transcription" (IVT) refers to a cell-free reaction in which a double-stranded DNA (dsDNA) template is copied by a DNA-directed RNA polymerase (typically a bacteriophage polymerase) to produce a product that contains RNA molecules copied from the template.

In the context of the present disclosure, "Faustovirus RNA capping enzyme" refers to a single-chain RNA capping enzyme capable of capping RNA (e.g., having detectable TPase, GTase and N7 MTase activity) including, for example, enzymes having at least 90% identity to faustovirus D5b (SEQ ID NO:7), Faustovirus E12 (SEQ ID NO:8), Faustovirus ST1 (SEQ ID NO:9), or Faustovirus LC9 (SEQ ID NO:10). "H3C2 RNA capping enzyme", "H3C2 capping enzyme" or "H3C2" refers to the RNA capping enzyme from faustovirus D5b (SEQ ID NO:7). Unless expressly stated otherwise, Faustovirus RNA capping enzymes may be interchangeable with one another for purposes of illustrations and examples disclosed herein with similar properties, effects, and/or benefits.

In the context of the present disclosure, "H3C2 fusion" refers to a bifunctional enzyme capable of synthesizing an RNA from a template polynucleotide and capable of capping RNA, the fusion comprising an RNA polymerase (e.g., T7 RNA polymerase, T3 RNA polymerase, SP6 RNA polymerase and a Faustovirus RNA capping enzyme arranged on the N-terminal end or the C-terminal end relative to the polymerase. An H3C2 fusion may further comprise a leader and/or a linker (e.g., between the polymerase and the H3C2). An H3C2 fusion may have, for example, an amino acid sequence having at least 80%, at least 85%, at least 90%, at least 93%, at least 96%, at least 97%, at least 98% or at least 99% identity to SEQ ID NO:20. An H3C2:T7 RNA polymerase fusion is an example of an H3C2 fusion.

In the context of the present disclosure, "H3C2 variant" refers to H3C2, H3C2 fusions, and enzymes capable of capping RNA, in each case, comprising an amino acid sequence having at least 80%, at least 85% at least 90%, at least 93%, at least 96%, at least 97%, at least 98% or at least 99% identity to SEQ ID NO:7, 8, 9, 10, 11, and/or 12.

In the context of the present disclosure, "modified nucleotides" (including references to modified NTP, modified ATP, modified GTP, modified CTP, and modified UTP) refers to any noncanonical nucleoside, nucleotide or corresponding phosphorylated versions thereof. Modified nucleotides may include one or more backbone or base modifications. Examples of modified nucleotides include dI, dU, 8-oxo-dG, dX, and THF. Additional examples of modified nucleotides include the modified nucleotides disclosed in U.S. Patent Publication Nos. US20170056528A1, US20160038612A1, US2015/0167017A1, and US20200040026A1. Modified nucleotides may include naturally or non-naturally occurring nucleotides.

In the context of the present disclosure, "non-naturally occurring" refers to a polynucleotide, polypeptide, carbohydrate, lipid, or composition that does not exist in nature. Such a polynucleotide, polypeptide, carbohydrate, lipid, or composition may differ from naturally occurring polynucleotides polypeptides, carbohydrates, lipids, or compositions in one or more respects. For example, a polymer (e.g., a polynucleotide, polypeptide, or carbohydrate) may differ in the kind and arrangement of the component building blocks (e.g., nucleotide sequence, amino acid sequence, or sugar molecules). A polymer may differ from a naturally occurring polymer with respect to the molecule(s) to which it is linked. For example, a "non-naturally occurring" protein may differ from naturally occurring proteins in its secondary, tertiary, or quaternary structure, by having a chemical bond (e.g., a covalent bond including a peptide bond, a phosphate bond, a disulfide bond, an ester bond, and ether bond, and others) to a polypeptide (e.g., a fusion protein), a lipid, a carbohydrate, or any other molecule. Similarly, a "non-naturally occurring" polynucleotide or nucleic acid may contain one or more other modifications (e.g., an added label or other moiety) to the 5'-end, the 3' end, and/or between the 5'- and 3'-ends (e.g., methylation) of the nucleic acid. A "non-naturally occurring" composition may differ from naturally occurring compositions in one or more of the following respects: (a) having components that are not combined in nature, (b) having components in concentrations not found in nature, (c) omitting one or components otherwise found in naturally occurring compositions, (d) having a form not found in nature, e.g., dried, freeze dried, crystalline, aqueous, and (e) having one or more additional components beyond those found in nature (e.g., buffering agents, a detergent, a dye, a solvent or a preservative). All publications, patents, and patent applications mentioned in this specification are herein incorporated by reference to the same extent as if each individual publication, patent, or patent application was specifically and individually indicated to be incorporated by reference.

In the context of the present disclosure, "RNA sample" or "sample" refers to a composition that may or may not comprise a target RNA. For example, an RNA sample may be known to include or suspected of including such target RNA and/or an RNA sample may be a composition to be evaluated for the presence of a target RNA. An RNA sample may comprise a naturally occurring target RNA (e.g., extracted from a cell, tissue, or organism), a target RNA produced by in vitro transcription, and/or a chemically synthesized RNA.

In the context of the present disclosure, "single-chain RNA capping enzyme" refers to a capping enzyme in which a single polypeptide chain includes the TPase, GTase and N7 MTase activities. Faustovirus, mimivirus and moumouvirus capping enzymes are examples of single-chain RNA capping enzymes. H3C2 fusions are additional examples of single-chain RNA capping enzymes. VCE is a heterodimer and, as such, is not a single-chain RNA capping enzyme.

In the context of the present disclosure, "single uncapped RNA target species" refers to a mixture of target RNA molecules that have essentially the same sequence. Transcripts made by in vitro transcription and RNA oligonucleotides made by solid-phase synthesis are examples single uncapped RNA target species. It is recognized that a certain amount of the RNA products in such a mixture may be truncated. Single uncapped RNA target species may sometimes contain modified nucleotides (e.g., noncanonical nucleotides that are not found in nature). Preparations of RNA from a cell contain a complex mixture of naturally occurring RNA molecules having different sequences; such preparations do not contain only targeted uncapped RNA species but also contain a wide variety of non-target RNAs. In some embodiments, the targeted uncapped RNA species is a single species of RNA.

In the context of the present disclosure, "target RNA" refers to a polyribonucleotide of interest. A polyribonucleotide may be or comprise a therapeutic RNA or precursor thereof (e.g., an uncapped precursor of a capped therapeutic RNA). A target RNA may arise from cellular transcription or in vitro transcription. A target RNA may be present in a mixture, for example, an in vitro transcription reaction mixture, a cell, or a cell lysate. A target RNA may be uncapped. If desired or required, a target RNA may be contacted with a decapping enzyme, for example, as a co-treatment with or pre-treatment before capping.

In the context of the present disclosure, "uncapped" refers to an RNA (a) that does not have a cap and (b) that can be used as a substrate for a capping enzyme. Uncapped RNA typically has a tri- or di-phosphorylated 5' end. RNAs transcribed in vitro have a triphosphate group at the 5' end.

In the context of the present disclosure, "variant" refers to a protein that has an amino acid sequence that is different from a naturally occurring amino acid sequence (i.e., having less than 100% sequence identity to the amino acid sequence of a naturally occurring protein) but that is at least 80%, at least 85%, at least 90%, at least 95%, at least 97%, at least 98% or at least 99% identical to the naturally occurring amino acid sequence.

Provided herein are a variety of in vitro RNA capping methods. Some embodiments of the method are based, in part, on the discovery that VCE of SEQ ID NO:1 is significantly more active at 45° C. as compared to 37° C. (see FIG. 2 and Tables 1 and 2, below), particularly for RNAs that have secondary structure. For example, when used to add a cap to an in vitro transcribed RNA that encodes a protein, the same amount of capped product can be produced at 45° C. using less than a thirtieth ($\frac{1}{30}^{th}$) of the amount of enzyme, as compared to 37° C. (see Table 6). In addition, incubation at the reaction at 45° C. allows the VCE to efficiently add a cap to uncapped RNA oligonucleotides that have secondary structure at the 5' end (e.g., a 5' end that is predicted to base pair with another sequence in the molecule to produce a blunt end or a 3' or 5' overhang of 1 or 2 nucleotides, as exemplified in FIG. 1). Such RNAs are very inefficiently capped using the VCE at 37° C. (see FIG. 9). In some embodiments therefore, the method may comprise incubating a reaction mix comprising RNA, VCE or a variant thereof, GTP or modified GTP, SAM and a buffering agent at a temperature in the range of 42° C.-47° C., e.g., 44° C.-46° C. to efficiently add a cap structure to the uncapped RNA target. These embodiments of the method are particularly useful for RNAs having or predicted to have secondary structure, such as RNAs over 200 nt in length transcribed in vitro, and RNA oligonucleotides that have secondary structure at the 5' end.

Other embodiments of the method are based in part on the discovery that the RNA capping enzyme from faustovirus D5b (SEQ ID NO:7, an example of an H3C2 capping enzyme and referenced here by the shorthand "H3C2") is capable of capping RNA significantly more efficiently than the VCE at almost all temperatures tested (see FIG. 2 and Tables 1 and 6, below) and, like the VCE, can be used to efficiently add a cap to an in vitro transcribed RNA at 45° C. For example, the same amount of capped product can be produced at 45° C. using less than a thirtieth ($\frac{1}{30}^{th}$) of the amount of faustovirus D5b (H3C2), as compared to 37° C. (see Table 6). In addition, incubating the reaction at 45° C. allows the faustovirus D5b (H3C2) to efficiently add a cap to uncapped RNA oligonucleotides that have secondary structure at the 5' end. Such RNAs are very inefficiently capped using the faustovirus D5b (H3C2) 37° C. (see FIG. 9). Capping enzymes from other giant viruses of the amoebas, including faustovirus ST1, faustovirus LC9, faustovirus E12, mimivirus, and moumouvirus were also tested and found to be active at higher temperatures. As such, in some embodiments, the method may comprise incubating a reaction mix comprising a sample comprising RNA, a single-chain capping enzyme, GTP or modified GTP and a buffering agent at a temperature in the range of 37° C.-60° C., e.g., 37° C.-42° C., 42° C.-47° C., 47° C.-52° C. or 52° C.-60° C. to efficiently add a cap structure to the uncapped RNA target, in vitro. These embodiments of the method are particularly useful for RNAs that have or predicted to have secondary structure such as RNAs over 200 nt in length transcribed in vitro, and RNA oligonucleotides that have secondary structure at the 5' end.

More efficient capping of the RNA substrate may support capping with less enzyme added to a capping reaction, producing more capped RNA (as a percentage of the RNA in the reaction) using the same amount of enzyme, terminating the reaction earlier, and/or capping RNAs that have secondary structure at the 5' end more efficiently.

Disclosed reaction conditions may be varied, including, without limitation, reaction temperature, reaction duration, reaction component concentrations (e.g., SAM, inorganic pyrophosphatase, NTPs, transcript template), and enzymes (e.g., capping enzymes, polymerases, and fusions thereof). For example, an H3C2:T7 RNA polymerase fusion protein may further improve the efficiency of Cap-0 RNA synthesis in terms of fraction of Cap-0 transcripts and transcription output. In addition, inclusion of a cap 2'O methyltransferase, such as Vaccinia cap 2'O methyltransferase, in the reactions can generate Cap-1 transcript at high efficiency. Depending on which enzyme is used and the other components in the reaction mix, disclosed methods may be used to make RNAs that have a Gppp cap, a 7-methylguanylate cap (i.e., a m7Gppp cap, or "cap-0"), or an RNA that has an m7Gppp cap that has addition modifications in the first and/or second nucleotides in the RNA (i.e., "cap-1" and "cap-2": see Fechter J. Gen. Vir. 2005 86: 1239-49). For example, if there is no SAM in the reaction mix then RNAs that have a Gppp cap may be produced. If the reaction mix comprises SAM in addition to the capping enzyme, then cap-0 RNA may be produced. If the reaction mix comprises other enzymes, e.g., cap 2'OMTase in addition to SAM, then cap-1 and/or cap-2 RNA may be produced. A reaction mix may comprise other components in addition to those explicitly described above.

In some embodiments, uncapped RNA in the reaction mix may be prepared by solid-phase oligonucleotide synthesis chemistry (see, e.g., Li, et al J. Org. Chem. 2012 77: 9889-9892), in which case the RNA in the sample may be may have a length in the range of 10-500 bases, e.g., 20-200 bases). In other embodiments, uncapped RNA in the reaction mix may be prepared in a cell free in vitro transcription (IVT) reaction in which a double-stranded DNA template that contains a promoter for an RNA polymerase (e.g., a T7, T3 or SP6 promoter) upstream of the region that is transcribed is copied by a DNA-directed RNA polymerase (typically a bacteriophage polymerase) to produce a product that contains RNA molecules copied from the template. In either embodiment, the RNA sample that is capped in the present method contains a single species of RNA (either the synthetic oligonucleotide or the transcript). In addition, the reaction mix may be RNase-free and may optionally comprise one or more RNase inhibitors. The RNA in the sample may contain a non-natural sequence of nucleotides and in some embodiments, may contain non-naturally occurring nucleotides. In some embodiments, the in vitro transcription reaction may employ a thermostable variant of the T7, T3 and SP6 RNA polymerase (see. e.g., PCT/US2017/013179 and U.S. application Ser. No. 15/594,090). In these embodiments, the RNAs may be transcribed at a temperature of greater than 44° C. (e.g., a temperature of at least 45° C., at least 50° C., at least 55° C. or at least 60° C., up to about 70°

C. or 75° C.) in order to reduce the immunogenicity of the RNA (see, e.g., WO 2018/236617). In some cases, the uncapped RNA may be capped immediately after it is made, e.g., by adding an RNA capping enzyme and GTP/modified GTP, as needed to the in vitro transcription reaction after the reaction has run its course. In some embodiments, the RNA made in an in vitro transcription reaction may purified prior to capping.

In some embodiments, the RNA in the sample may be a therapeutic RNA. In these embodiments, the product of the present method may be used without purification of the capped RNA from the uncapped RNA. In these embodiments, the product of the present reaction may be combined with a pharmaceutical acceptable excipient to produce a formulation, where "pharmaceutical acceptable excipient" is any solvent that is compatible with administration to a living mammalian organism via transdermal, oral, intravenous, or other administration means used in the art. Examples of pharmaceutical acceptable excipients include those described for example in US 2017/0119740. The formulation may be administered in vivo, for example, to a subject, examples of which include a human or any non-human animal (e.g., mouse, rat, rabbit, dog, cat, cattle, swine, sheep, horse or primate). Depending on the subject, the RNA (modified or unmodified) can be introduced into the cell directly by injecting the RNA or indirectly via the surrounding medium. Administration can be performed by standardized methods. The RNA can either be naked or formulated in a suitable form for administration to a subject, e.g., a human. Formulations can include liquid formulations (solutions, suspensions, dispersions), topical formulations (gels, ointments, drops, creams), liposomal formulations (such as those described in: U.S. Pat. No. 9,629,804 B2; US 2012/0251618 A1; WO 2014/152211; US 2016/0038432 A1). The cells into which the RNA product is introduced may be in vitro (i.e., cells that cultured in vitro on a synthetic medium). Accordingly, the RNA product may be transfected into the cells. The cells into which the RNA product is introduced may be in vivo (cells that are part of a mammal). Accordingly, the introducing may be done by administering the RNA product to a subject in vivo. The cells into which the RNA product is introduced may be present ex vivo (cells that are part of a tissue, e.g., a soft tissue that has been removed from a mammal or isolated from the blood of a mammal).

Synthesis of large amounts of uniformly capped mRNA transcripts in a cost-effective and streamlined manner that is scalable to support multi-gram synthesis may be desired or required to manufacture mRNA for therapeutic applications. Current approaches to mRNA manufacturing use costly mRNA cap analogs in in vitro transcription reactions. Alternatively, separate reactions are required to produce 5'-triphosphate RNA by in vitro transcription followed by mRNA capping using enzymes—a more complex process that is harder to scale. A single-step in vitro synthesis of capped RNA using T7 RNA polymerase and a capping enzyme may streamline the manufacturing process. Single-vessel reactions with both enzymes may reduce or remove otherwise prohibitive costs of synthetic mRNA cap analogs and may reduce the complexity of scaling this workflow to support multi-gram (and beyond) synthesis.

Methods

Provided herein are methods for efficiently producing capped RNA. In some embodiments, methods include thermoactive Hi-T7 RNA polymerase and H3C2 RNA capping enzyme and unexpectedly thermoactive Vaccinia mRNA cap 2'O methyltransferase. Surprisingly, reaction temperatures substantially higher than 37° C. enable single reaction capped mRNA synthesis. In some embodiments, RNA transcription and capping activities may be performed in a single reaction at higher temperatures (e.g., 40° C. to 60° C.). For example, RNA polymerases and individual capping enzymes with or without Vaccinia cap 2'O methyltransferase may be used simultaneously in capped RNA synthesis reactions. Combining RNA transcription and capping activities may be achieved, for example, with fusion proteins comprising H3C2, a single-subunit RNA capping enzyme, and T7 RNA polymerase or Hi-T7 RNA polymerase. Methods described herein can achieve high levels of Cap-0 or Cap-1 RNA synthesis.

A capping method, in some embodiments, may comprise contacting an RNA polymerase (e.g., a T7 RNA polymerase, a thermoactive Hi-T7 RNA polymerase and/or an H3C2 fusion), a polynucleotide (e.g., DNA or RNA) encoding a target RNA, a capping enzyme (e.g., VCE, H3C2, an H3C2 fusion), NTPs, a buffering agent, optionally in the presence or absence of SAM. Nucleoside triphosphates (NTPs) may include unmodified ATP, modified ATP (m6ATP, m1ATP), unmodified CTP, modified CTP (e.g. m5CTP), unmodified GTP, modified GTP, unmodified UTP, modified UTP (e.g., pseudouridine triphosphate, m1pseudouridin triphosphate), NTPs containing 2'O methylation, and/or combinations thereof. In some embodiments, a capping method may comprise contacting a capping enzyme (e.g., VCE, H3C2, an H3C2 fusion), a target RNA, and guanosine triphosphate (GTP), and/or modified GTP. A capping method may comprise, in some embodiments, contacting a capping enzyme (e.g., VCE, H3C2, an H3C2 fusion), a target RNA, and guanosine triphosphate (GTP) and/or modified GTP, an O-methyl transferase (e.g., thermoactive Vaccinia mRNA cap 2'O methyltransferase), in the presence or absence of SAM.

Contacting, according to some embodiments, may be performed in a single location (e.g., in a single step), for example, on any surface (e.g., plate or bead) or in any vessel (e.g., tube, flask, vial, column, container, bioreactor or other space). In some embodiments, contacting may comprise contacting some or all the subject elements in any desired order or concurrently. Contacting, in some embodiments, may comprise contacting some or all the subject elements in the presence of a buffering agent. For example, contacting may include contacting, in any order or concurrently, a capping enzyme (e.g., VCE, H3C2, an H3C2 fusion), a target RNA, GTP, and a buffering agent in the presence or absence of SAM. In some embodiments, contacting may further comprise contacting at a temperature of 40° C. to 60° C. (e.g., at 40° C., 42° C., 44° C., 45° C., 46° C., 48° C., 50° C., 52° C., 54° C., 55° C., 56° C., 58° C., or 60° C.) for any desired period of time, for example, 1 minute to 120 minutes (e.g., 1 minute, 5 minutes, 10 minutes, 15 minutes, 20 minutes, 25 minutes, 30 minutes, 45 minutes, 60 minutes, 75 minutes, 90 minutes, 105 minutes, or 120 minutes). In any of the embodiments disclosed herein, contacting may further comprise contacting at a first temperature of 25° C. to 60° C. and cooling or warming to a second temperature of 25° C. to 60° C. different from the first temperature, wherein, optionally, at least one of the first temperature or second temperature is not less than 40° C. A first temperature may be selected to produce, stabilize and/or retain a desired amount of uncapped target RNA and a second temperature may be selected to produce, stabilize and/or retain a desired amount capped target RNA. Each temperature may be maintained for any desired period of time (e.g., 1 minute to 120 minutes). For example, a first temperature may be 37° C. for a first period of 1 to 30 minutes and a second temperature may be 28° C., 32° C., 37° C., 45° C., or 50° C. for a second period of 1 to 30 minutes. Contacting, in any of the disclosed embodiments, may include placing one item in direct contact with another, placing two items together on a surface or in a vessel in sufficient proximity that they may physically and/or chemically interact with or without further agitation or mixing. Contacting may include the initial act of placing one item in direct contact with or proximity to another and/or maintaining conditions that permit or favor the two items to contact each other.

A method, in some embodiments, may comprise synthesizing RNA (e.g., directed or undirected by a template) in vitro to produce an uncapped target RNA and capping the target RNA (e.g., in single-step reactions). Synthesizing RNA from a template may comprise, for example, contacting an RNA polymerase (e.g., a T7 RNA polymerase, a thermoactive Hi-T7 RNA polymerase and/or an H3C2 fusion) with the template (e.g., an RNA template or a DNA template) and one or more NTPs to produce an uncapped target RNA, a buffering agent, and optionally in the presence or absence of SAM. Nucleoside triphosphates (NTPs) may include unmodified ATP, modified ATP (m6ATP, m1ATP), unmodified CTP, modified CTP (e.g. m5CTP), unmodified GTP, modified GTP, unmodified UTP, modified UTP (e.g., pseudouridine triphosphate, m1pseudouridin triphosphate), NTPs containing 2'O methylation, and/or combinations thereof. Capping a target RNA may comprise, for example, contacting H3C2 (e.g., H3C2 or an H3C2 fusion) with a target RNA and guanosine triphosphate (GTP) and/or a modified GTP to produce a capped target RNA. In some embodiments, a capping method may comprise contacting a target RNA with an H3C2 fusion at a temperature of 25° C. to 60° C. A capping method may comprise, in some embodiments, contacting a target RNA with a decapping enzyme to remove an existing cap and/or assure that it is uncapped.

Capping may comprise, for example, contacting a capping enzyme (e.g., VCE, H3C2, an H3C2 fusion) with a target RNA, an O-methyltransferase (e.g., thermoactive Vaccinia mRNA cap 2'O methyltransferase), SAM, guanosine triphosphate (GTP), modified GTP, and/or a buffering agent. For example, capping may comprise contacting a capping enzyme, a target RNA, GTP (optionally, with or without modified GTP), and optionally a buffering agent. Capping may comprise contacting, in a single vessel (e.g., in a single step), a capping enzyme, a target RNA, GTP (optionally, with or without modified GTP), an O-methyltransferase, SAM, and optionally a buffering agent. Capping may comprise capping a pre-existing target RNA and/or synthesizing and capping a target RNA in a single vessel (e.g., in a single step), for example, by contacting a target RNA template (DNA or RNA) encoding the target RNA, a polymerase (e.g., a T7 RNA polymerase, a thermoactive Hi-T7 RNA polymerase and/or an H3C2 fusion), NTPs (optionally including or excluding one or more modified NTPs), a capping enzyme (e.g., VCE, H3C2, an H3C2 fusion), and/or a buffering agent.

Compositions

A variety of compositions related to the disclosed methods are also provided. In some embodiments, a composition (e.g., a reaction mix) may comprise a target RNA (e.g., in an RNA sample) and/or a DNA template encoding a target RNA. In some embodiments, a composition may comprise a single-chain RNA capping enzyme having TPase, GTase and N7 MTase activities, GTP, SAM and a buffering agent. A composition may have a temperature in the range of 37° C.-60° C., e.g., 37° C.-42° C., 42° C.-47° C., 47° C.-52° C. or 52° C.-60° C. In some embodiments, a composition may be free of RNase activity as a result of RNases being inhibited, inactivated or absent. For example, an RNase-free composition may comprise one or more RNase inhibitors. In some embodiments, a composition may further comprise a DNA template operably linked to a promoter, a bacteriophage polymerase that initiates transcription at the promoter, and NTPs, for transcribing the RNA. In some embodiments, a composition may include a cap 2'OMTase. A single-chain RNA capping enzyme may comprise (a) an amino acid sequence at least 90% identical to SEQ ID NO:2, 3, or 4, or (b) an amino acid sequence at least 90% identical to SEQ ID NO:5 or 6. A composition, according to some embodiments, may comprise an H3C2 fusion comprising, in N-terminal to C-terminal order, (a) Faustovirus RNA capping enzyme (e.g., an H3C2 RNA capping enzyme) and an RNA polymerase or (b) an RNA polymerase and an H3C2 RNA capping enzyme, wherein the H3C2 fusion optionally may further comprise a leader (e.g., operably positioned within the fusion) and/or a linker positioned between the H3C2 and the RNA polymerase. In some embodiments, any or all of the components referenced in this paragraph may be combined or otherwise included in a single container. Components, for example, components in a single container, may be present in dry (e.g., anhydrous and/or lyophilized) form. A container with one or more of the referenced components may also contain an aqueous medium.

Kits

Also provided by this disclosure are kits for practicing the subject method, as described above. In some embodiments, the kit may contain any one or more of the components listed above. For example, a kit may contain a single-chain RNA capping enzyme that has TPase, GTase and N7 MTase activities, wherein the enzyme is in a storage buffering agent and a reaction buffering agent (e.g., which may be a 5× or 10× concentrated reaction buffering agent). In some embodiments, the kit may comprise a bacteriophage polymerase and NTPs, for transcribing the RNA from a DNA template. The kit may additionally comprise SAM and a cap 2'OMTase. As would be apparent from the discussion above, the enzyme may comprise (a) an amino acid sequences that are at least 90% identical to SEQ ID NOS:2, 3, or 4, or (b) an amino acid sequence that is at least 90% identical to SEQ ID NOS:5 or 6.

The various components of the kit may be present in separate containers or certain compatible components may be pre-combined into a single container, as desired. In addition to above-mentioned components, the subject kits may further include instructions for using the components of the kit to practice the subject methods, i.e., to instructions for capping an RNA.

EXAMPLES

All reagents are available from New England Biolabs (Ipswich, MA) and/or the indicated supplier.

Figure 2:
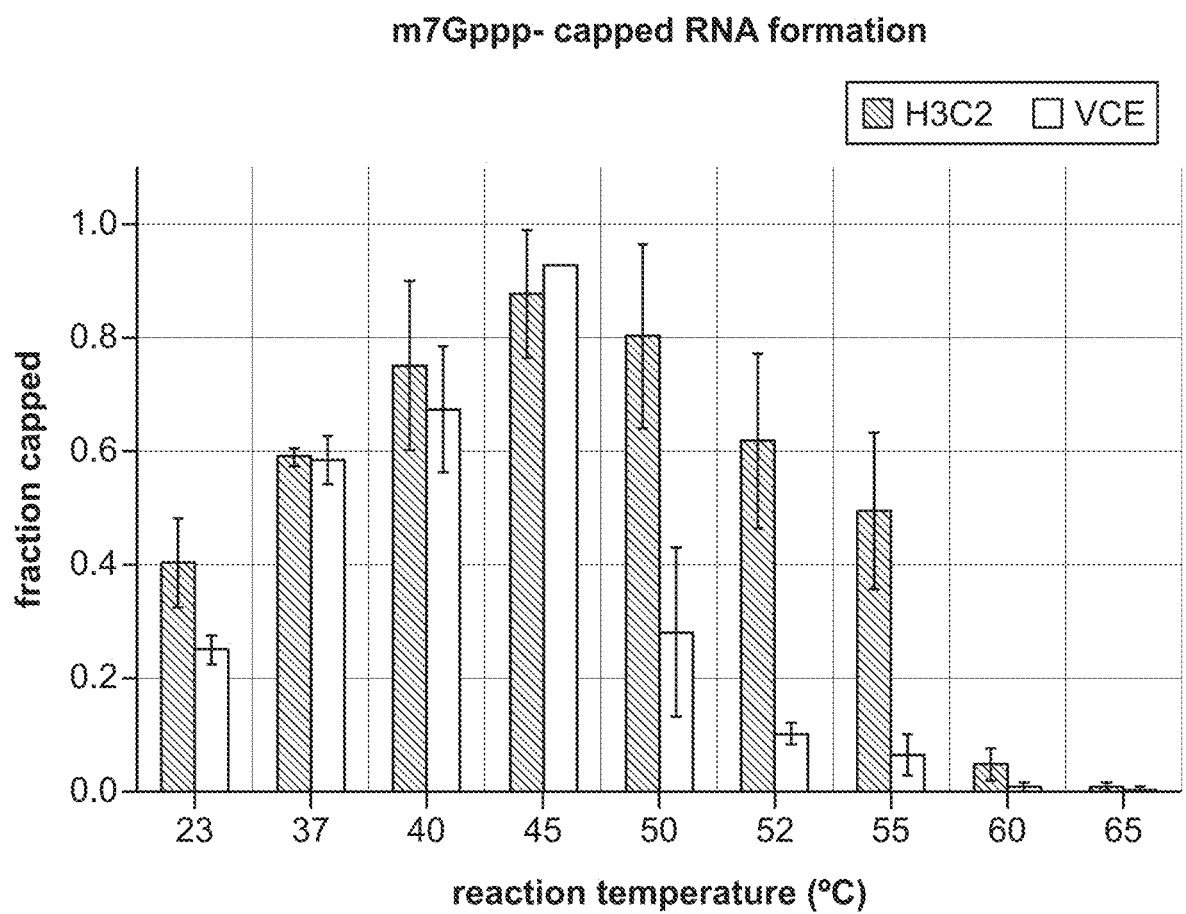
FIG. 2 shows the RNA capping activity of H3C2 and VCE on RNA1 at different reaction temperatures. The amount of m7Gppp-capped RNA is a measure of RNA capping activity of the enzymes. Each bar represents the result of an average of 4 independent experiments, with the error bars indicating the standard deviation. As shown in the figure, both H3C2 and VCE exhibit maximum RNA capping activity at 45° C. While VCE capping activity dropped precipitously at 50° C. and higher, H3C2 retained significant capping activity at 50° C., 52° C. and 55° C.

Example 1: RNA Capping Activity of H3C2 and VCE at High Temperatures 10 nM of purified VCE or H3C2 RNA capping enzyme was incubated with 500 nM RNA1 (FIG. 1) containing a fluorescent group (FAM) at its 3' end in the presence of 0.5 mM GTP and 0.1 mM SAM in 10 µL of 1×RNA capping buffering agent (50 mM Tris-HCl, 5 mM KCl, 1 mM MgCl$_2$, 1 mM DTT, pH 8.0) at temperatures ranged from 23° C. to 65° C. for 30 minutes. The reactions were quenched by adding 1 µL 50 mM EDTA followed by heat-inactivation at 70° C. for 10 minutes. The quenched reactions were analyzed by capillary electrophoresis using an Applied Biosystems 3730×1 Genetic Analyzer. The peak area corresponding to the m7Gppp-, unmethylated Gppp-, uncapped pp- and ppp-RNA1 were quantified and used to calculate fraction of m7Gppp- at the end of the 30-minute capping reaction. In FIG. 2, each bar represents an average of 4 independent experiments. Error bars represent the standard deviation of the 4 replicates. It is clear that at low enzyme concentration (10 nM), both H3C2 and VCE exhibited highest capping activity at 45° C. whereas H3C2 retains higher capping activity than VCE at 50° C. and 55° C.

Figure 3A:
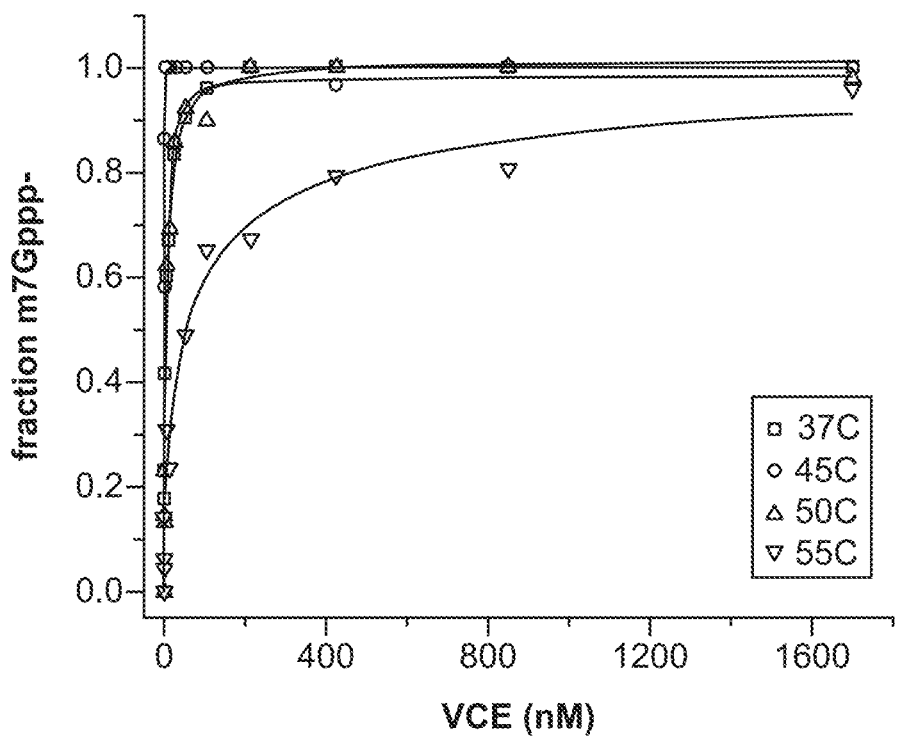
FIGS. 3A-3B shows the RNA capping activity at 37° C., 45° C., 50° C. and 55° C. as a function of capping enzyme concentration.
Figure 3B:
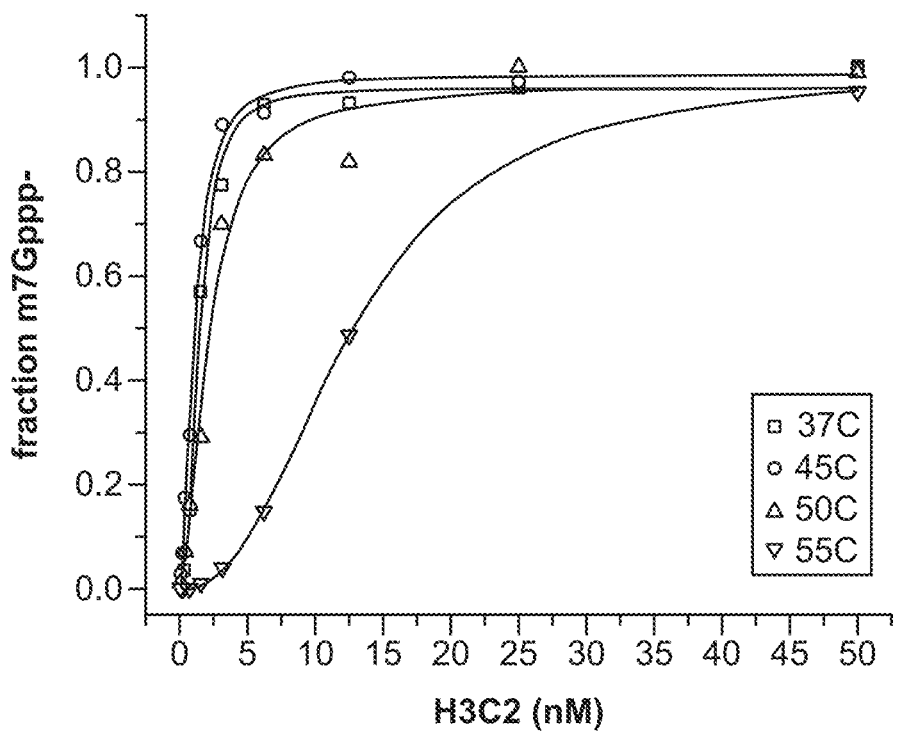
Figure 4A:
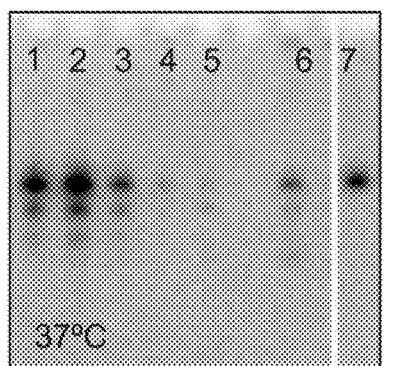
FIGS. 4A-4E RNA capping activity of putative RNA capping enzymes on a 150 nt RNA at various temperatures. Lanes 1 through 6 show capping reactions using products of in vitro translation of AMN83561 (H3C2) (lane 1), AIB52055 (lane 2), SME65026 (lane 3), SMH63629 (lane 4), AAV50651 aa 1-668 (mimivirus capping enzyme N-terminal region) (lane 5), or VP_007354410 (Moumouvirus capping enzyme) (lane 6). In lane 7, purified H3C2 (20 nM) was used. The ribonucleotide sequence of the 150 nt RNA used in these experiments is: GGGAGUC-UUCGCCGAGAGGGCCAUCGCCAGUUGCCGCAAC-CUGUGGGAAUUUCUCUUCCA GUUUAUCCGGAUG-CUCAACGGUGACUUUAAUUCCGGUAUCUUUCUC GAAUUUCUUACCG ACUUCAGCGAG-CUCGACAAUGCUCUUCCCUA (SEQ ID NO:17).
Figure 4B:
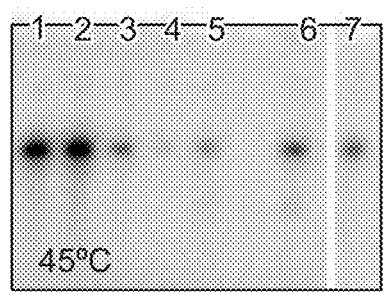
Figure 4C:
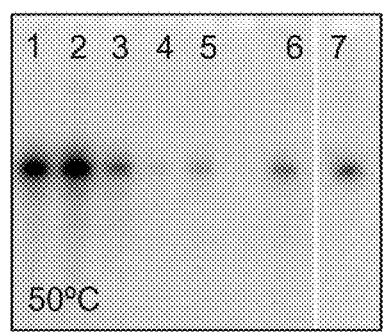
Figure 4D:
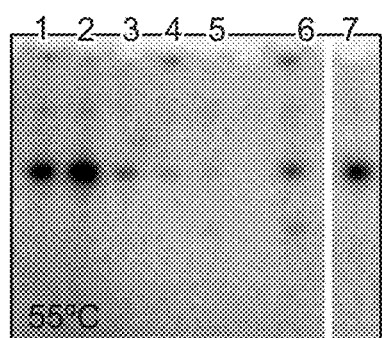
Figure 4E:
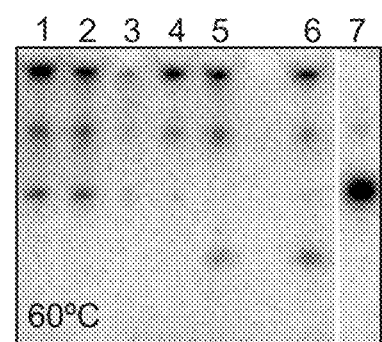

To better quantify the RNA capping activity of VCE and H3C2 at different reaction temperatures, dilutions of the enzymes were incubated under the same reaction conditions at 37° C., 45° C., 50° C. or 55° C., respectively, for 30 minutes. The calculated values of fraction m7Gppp-RNA1 were graphed against enzyme concentration and fitted to a Hill equation derivative to derive the enzyme concentration at which 50% capping was achieved (Cap50). As showed in FIGS. 3A-3B and Table 1, it requires 3.06 nM, 0.94 nM, 4.08 nM and 30.00 nM of VCE to convert 50% of 0.5 µM of ppp-RNA1 to m7Gppp-RNA1 at 37° C., 45° C., 50° C. or 55° C., respectively, in 30 minutes. Furthermore, at 50° C. and below, 400 nM or more VCE caps >90% of 0.5 µM RNA in 30 min. For H3C2, 0.69 nM, 0.67 nM, 2.15 nM or 21.3 nM of enzyme can convert 50% of ppp-RNA1 into m7Gppp-RNA1 at 37° C., 45° C., 50° C. or 55° C., respectively, in 30 minutes. In addition, 50 nM of H3C2 effectively caps >90% of ppp-RNA1 at up to 55° C. in 30 minutes.

orthologous genes were synthesized and inserted into a T7 expression vector such that the expression of the target genes was under the control of T7 promoter. The T7 expression cassettes were amplified by PCR using Q5® High Fidelity 2× Master Mix (New England Biolabs, Ipswich, MA) according to manufacturer's recommendations. The amplified T7 expression cassettes were purified using the Monarch® PCR & DNA cleanup kit (New England Biolabs, Ipswich, MA) according to manufacturer's instructions. The purified T7 express cassettes were subjected to in vitro transcription/translation using PURExpress® in vitro Protein Synthesis Kit (New England Biolabs, Ipswich, MA) according to manufacturer's instructions. The PURExpress reaction products, containing the gene products with the indicated Genbank accession numbers (FIGS. 4A-4E), were used in RNA capping assays. Briefly, 50 µL RNA capping reactions made up of 2 µL of PURExpress product, 0.4 µM of a 150 nt in vitro transcript RNA, 4 µM GTP. 0.1 mM SAM, and a trace amount of $^{32}$P-α-GTP in 1× RNA capping buffering agent (50 mM Tris-HCl, 5 mM KCl, 1 mM $MgCl_2$, 1 mM DTT, pH 8.0) were assembled on ice. The reactions were divided into 5 equal parts, each of which were incubated at the indicated temperatures for 30 minutes. The reactions were stopped by adding 10 µL of 2×RNA Loading Dye (New England Biolabs, Ipswich, MA) to the reactions and analyzed by denaturing polyacrylamide electrophoresis and autoradiography. Capping activity is indicated by radiographic signal that migrates at the position of the substrate

TABLE 1

RNA capping activity of VCE and H3C2 at various temperatures expressed in Cap50 values in nM (A) or milli-unit per µl of reaction (B).

| A | | | | | |
|---|---|---|---|---|---|
| | Cap50 (nM) | | | | Fold improvement |
| Reaction temperature | 37° C. | 45° C. | 50° C. | 55° C. | 45° C. vs 37° C. |
| VCE | 3.06 | 0.94 | 4.08 | 30.00 | 3.24 |
| H3C2 | 0.69 | 0.67 | 2.15 | 21.30 | 1.03 |
| Fold improvement H3C2 vs VCE | 4.46 | 1.42 | 1.90 | 1.41 | |

| B | | | | | |
|---|---|---|---|---|---|
| | Cap50 (mU/µL) | | | | Fold improvement |
| Reaction temperature | 37° C. | 45° C. | 50° C. | 55° C. | 45° C. vs 37° C. |
| VCE | 15.30 | 4.72 | 20.40 | 149.98 | 3.24 |
| H3C2 | 3.43 | 0.67 | 10.75 | 1.03 | 1.03 |
| Fold improvement H3C2 vs VCE | 4.46 | 1.42 | 1.90 | 1.41 | |

Example 2: Identification and Testing of H3C2 Orthologs

Purified RNA capping enzyme H3C2 from faustovirus D5b (Genbank® accession AMN83561) was active up to 60° C. under in vitro conditions. By sequence homology, several putative orthologs in other faustovirus strains were identified. It was found that the gene product of the putative RNA capping enzymes from other faustovirus strains and related giant virus *Acanthanomeba polyphaga* mimivirus and *Acanthanomeba polyphaga* moumouvirus were active in RNA capping up to 55-60° C. The ORF of the identified RNA as indicated. As shown in FIGS. 4A-4E, putative RNA capping enzymes from faustovirus ST1 (Genbank accession SME65026; lanes 3) and faustovirus LC9 (SMH63629; lanes 4), the N-terminal fraction of mimivirus capping enzyme (aa 1-668 of Genbank accession AAV50651; Benarroch et al, 2008; lanes 5) and moumouvirus capping enzyme (Genbank accession YP_007354410; lanes 6) cap the 150 mer RNA at temperatures up to 55° C., whereas RNA capping enzyme from Faustovirus D5b (Genbank accession AMN83561; H3C2; lanes 1), Faustovirus E12 (Genbank accession AIB52055; lanes 2) and purified H3C2 (lanes 7) cap the 150 mer RNA at temperatures up to 60° C.

Example 3: Sequence Analysis

Sequence alignment analysis revealed that three 60 aa- or 111 aa-long regions exhibit 90% or higher amino acid sequence identity among the four Faustovirus RNA capping enzymes that are active up to 55° C. (FIG. 5). Conserved region Fausto_CR_01 spans 60 aa within the TPase domain of H3C2. Fausto_CR_03 spans 111 aa at the N-terminal of the guanosine N7 methyltransferase domain. Fausto_CR_05 spans 60 aa at the C-terminal side of the guanosine N7 methyltransferase domain of H3C2. The amino acid sequence of Fausto_CR_01 (which corresponds to amino acids 43-102 of the H3C2 sequence) is FDKLKPDGEITTTMRVSNADGMAREITFGGGVK TGEMFVKKQNICVEDVVDIFSYKVAVS (SEQ ID NO:2). The amino acid sequence of Fausto_CR_03 (which corresponds to amino acids 537-647 of the H3C2 sequence) is GFYGNNYKIASDIYLNYI DVFNFDDLWKYNPGYFEKNKSDIYIAPNKYRRYLIKSLENKYIKNAKWVID AAAGRGADLHLYKAECVENLLAIDIDPTAISELIRRRNEITG (SEQ ID NO:3). The amino acid sequence of Fausto_CR_05 (which corresponds to amino acids 778-873 of the H3C2 sequence) is KYSIKRLYDSDKLTKTGQKIAVLLPMSG EMKEEPLCNIKNIISMARKMGLDLVESANFSV (SEQ ID NO:4).

The following tables summarize the sequence identities between the amino acid sequences of Faustovirus capping enzymes.

TABLE 2

|  | AMN83561 Faustovirus D5b | AIB52055 Faustovirus E12 | SME65026 Faustovirus ST1 | SMH63629 Faustovirus LC9_partial |
|---|---|---|---|---|
| AMN83561 Faustovirus D5b | 100% | 71% | 71% | 77% |
| AIB52055 Faustovirus E12 | 71% | 100% | 97% | 70% |
| SME65026 Faustovirus ST1 | 71% | 97% | 100% | 69% |
| SMH63629 Faustovirus LC9_partial | 77% | 70% | 69% | 100% |

TABLE 3

|  | AMN83561 Faustovirus D5b | AIB52055 Faustovirus E12 | SME65026 Faustovirus ST1 | SMH63629 Faustovirus LC9_partial |
|---|---|---|---|---|
| Fausto_CR_01 | 92% | 98% | 98% | 92% |
| Fausto_CR_03 | 90% | 99% | 99% | 90% |
| Fausto_CR_05 | 93% | 97% | 97% | 92% |

FIG. 6 shows an alignment of the various Faustovirus RNA capping enzyme sequences, showing the conserved domains as well as the sequences of the TPase, GTase and MTase regions.

Figure 7:
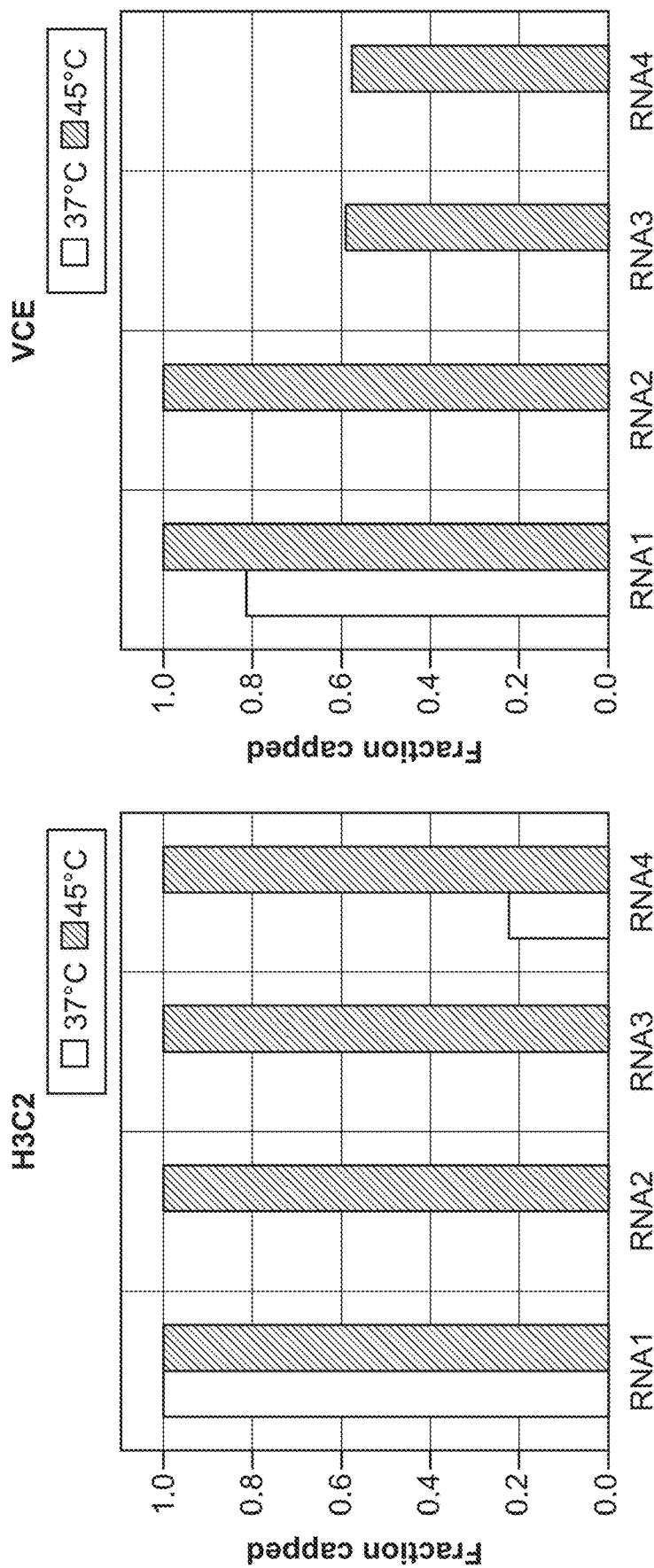
FIG. 7 shows that RNA capping reactions performed at 45° C. facilitate efficient capping of hairpin RNAs. At 37° C. (white bars), both H3C2 and VCE efficiently capped RNA1, which has the least 5' secondary structure (see FIG. 1). RNA2, RNA3 and RNA4, which have stable 5' secondary structures at 37° C. (see FIG. 1), were either not capped or capped to a low extent at 37° C. (white bars). At 45° C. (grey bars), however, H3C2 capped all four RNAs efficiently. VCE efficiently capped RNA1 and RNA2 and partially capped RNA3 and RNA4 at 45° C. (grey bars).

Sequence alignment analysis also revealed that two 67 aa- or 111 aa-long regions exhibit 90% or higher sequence identity between *Acanthanomeba polyphaga* mimivirus and *Acanthanomeba polyphaga* moumouvirus RNA capping enzymes that are active up to 55° C. (FIG. 7). Conserved region moumou_CR_03 (which corresponds to amino acids 576-642 of the moumouvirus sequence) spans 67 aa between the GTase and guanosine N7 methyltransferase domains. Moumou_CR_04 (which corresponds to amino acids 672-782 of the moumouvirus sequence) spans 111 aa at the N-terminal of the guanosine N7 methyltransferase domain. The amino acid sequence of moumou_CR_03 is INDNTVVEFIFDNFKIDMDDPYKWIP IRTRYDKTESVQKYHKKYGNNL HIANRIWKTITNPITEDII (SEQ ID NO:5). The amino acid sequence of moumou_CR_04 is YYQKNTSNAAGMRAFNNFIKSNMITTYCKDGDKVLDIGCGRGGDLIKFIHAGIEEYV GIDIDNNGLYVINDSAFNRYKNLKKTIKNIPPMTFINADARGLFNLEAQEKILP (SEQ ID NO:6).

The following tables summarize the sequence identities between the amino acid sequences of the mimivirus and moumouvirus RNA capping enzymes.

TABLE 4

|  | AAV50651.1 mimivirus | YP_007354410 Moumouvirus |
|---|---|---|
| AAV50651.1 mimivirus | 100% | 61% |
| YP_007354410 Moumouvirus | 61% | 100% |

TABLE 5

|  | AAV50651.1 mimivirus | YP_007354410 Moumouvirus |
|---|---|---|
| Moumou_CR_03 | 91% | 90% |
| Moumou_CR_04 | 91% | 92% |

Figure 8:
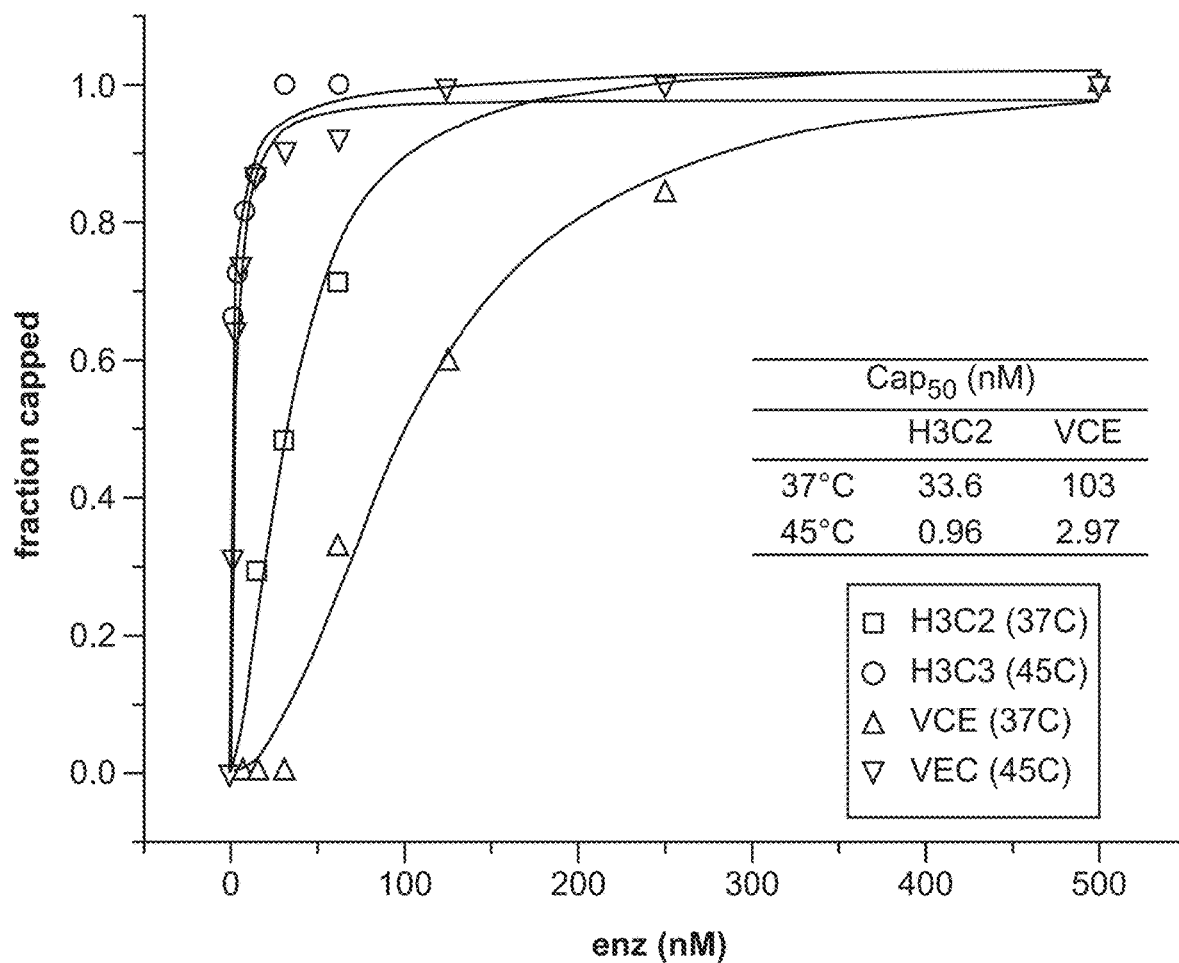
FIG. 8 shows that RNA capping reactions performed at 45° C. facilitate efficient capping of long RNA. Increasing concentrations of H3C2 or VCE were incubated with 400 nM of fluc RNA (1.7 kb) in the presence of 0.5 mM GTP and 0.1 mM SAM in 10 µL of 1×RNA capping buffering agent (50 mM Tris-HCl, 5 mM KCl, 1 mM $MgCl_2$, 1 mM DTT, pH 8) at 37° C. or 45° C. for 30 minutes. The first 24 nt of fluc RNA was then cleaved off by oligo-guided RNase H cleavage. The extent of capping in the cleaved 24 nt fragments was analyzed by electrophoresis over 15% urea polyacrylamide gels. The band intensity was quantified and used to calculate the fraction capped under each condition. The calculated values were graphed against enzyme concentration and fitted to a modified Hill equation to derive the enzyme concentration at which 50% capping was achieved (Cap50). For H3C2, the Capso values were 33.6 nM and 0.96 nM at 37° C. or 45° C., respectively. For VCE, the Capso values were 103 nM and 2.97 nM at 37° C. or 45° C., respectively. For both H3C2 and VCE, reacting at 45° C. substantially decreased the quantity of enzyme needed to cap 50% of the substrate RNA than at 37° C.

FIG. 8 shows an alignment of the mimivirus and moumouvirus sequences, showing the conserved domains as well as the sequences of the TPase, GTase and MTase regions.

Figure 9:
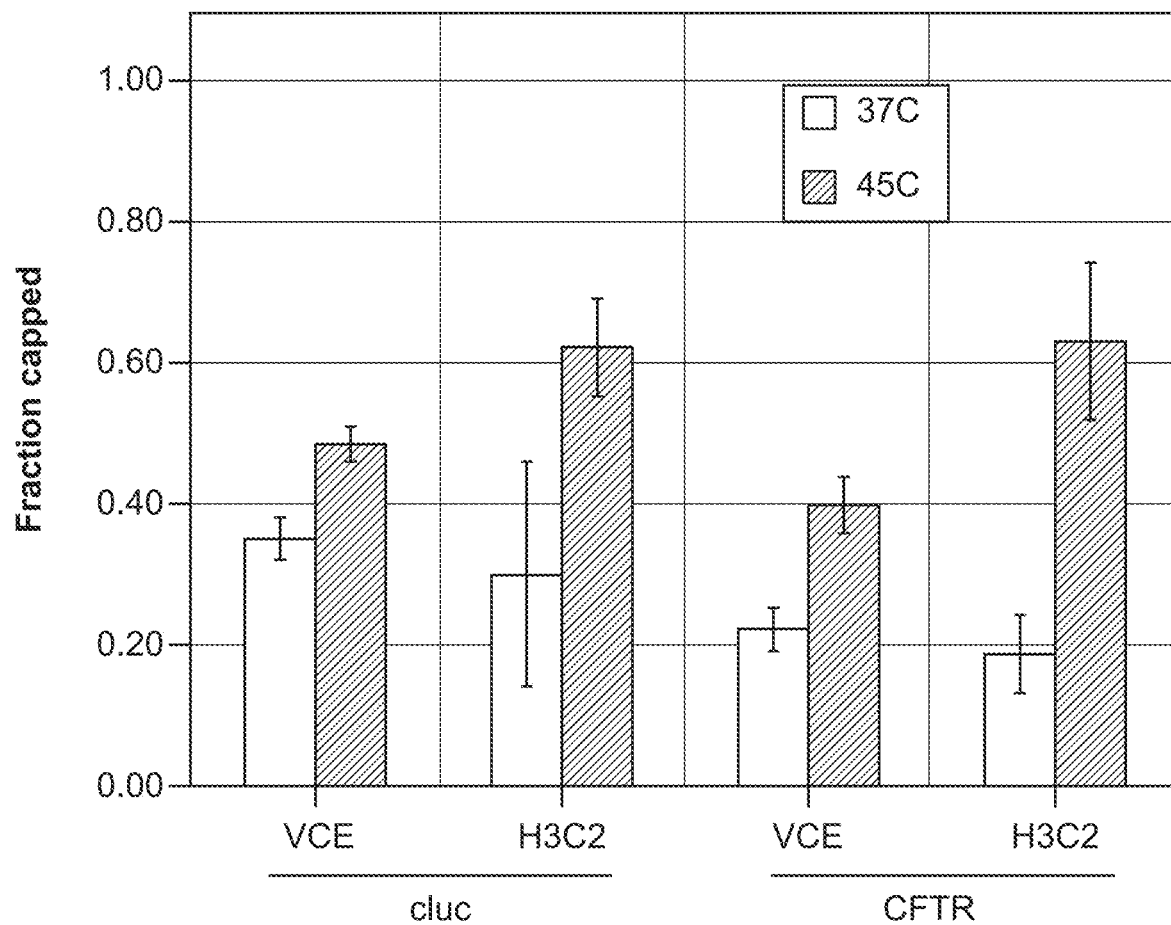
FIG. 9 shows that RNA capping reactions performed at 45° C. facilitate more efficient capping of long RNA other than fluc RNA than at 37° C. 100 nM of H3C2 or VCE was incubated with 500 nM of cluc RNA (1.8 kb) or CFTR RNA (4.0 kb) in the presence of 0.5 mM GTP and 0.1 mM SAM in 10 µL of 1×RNA capping buffering agent (50 mM Tris-HCl, 5 mM KCl, 1 mM $MgCl_2$, 1 mM DTT, pH 8) at 37° C. or 45° C. for 30 min. Defined 5' fragments were cleaved by using Thermostable RNase H (New England Biolabs, Ipswich, MA) and purified using a combination of AMPure® XP Beads (Beckman Coulter, Indianapolis, IN) and streptavidin Dynabeads® (Thermo Fisher Scientific, Waltham, MA). Intact mass analysis of the purified 5' fragments were carried out by Novatia LLC (Newtown, PA) using a high-resolution LC/MS workflow. The fraction of capped RNA was calculated using the mass intensity of capped and uncapped species.

Example 4: RNA Capping Reactions at 45° C. Enhance Capping Efficiency on Short Model Hairpin RNAs The short RNAs illustrated in FIG. 1 were designed as described here to evaluate capping efficiency. A control RNA (RNA1) was designed to have a shorter hairpin structure and an unstructured 5' end with a MFE of −1.5 kcal/mol at 37° C. or −0.73 kcal/mol at 45° C. (FIG. 1). RNA2, RNA3 and RNA4 were designed to form a stable hairpin structure with a theoretical minimum free energy of unfolding (MFE) of −7.2 kcal/mol at 37° C. or −5.4 kcal/mol at 45° C. (RNAFold server rna.tbi.univie.ac.at). RNA2, RNA3 and RNA4 were further designed to have a blunt end, a one-base or a two-base overhang at their 5' end of the respective minimum free energy structure (FIG. 1). The RNAs were produced by in vitro transcription using T7 RNA polymerase. For capping reactions, 50 nM of H3C2 or VCE was incubated with 500 nM of RNA substrates in the presence of 0.5 mM GTP and 0.1 mM SAM in 10 µL of 1×RNA capping buffering agent (50 mM Tris-HCl, 5 mM KCl, 1 mM MgCl$_2$, 1 mM DTT, pH 8.0) at 37° C. or 45° C. for 30 min. At 37° C., H3C2 capped 100% of RNA1, which is predicted to have an unstructured 5' end, and 22% of RNA4, which is predicted to have a two-base overhang structure at the 5' end (FIG. 9). H3C2 was unable to cap RNA2 and RNA3 under these conditions. At 45° C., H3C2 capped 100% of all four RNA substrates. VCE was only able to cap 80% of RNA1 at 37° C. At 45° C., VCE capped 100% of RNA1 and RNA2 and approximately 60% of RNA3 and RNA4.

Figure 10:
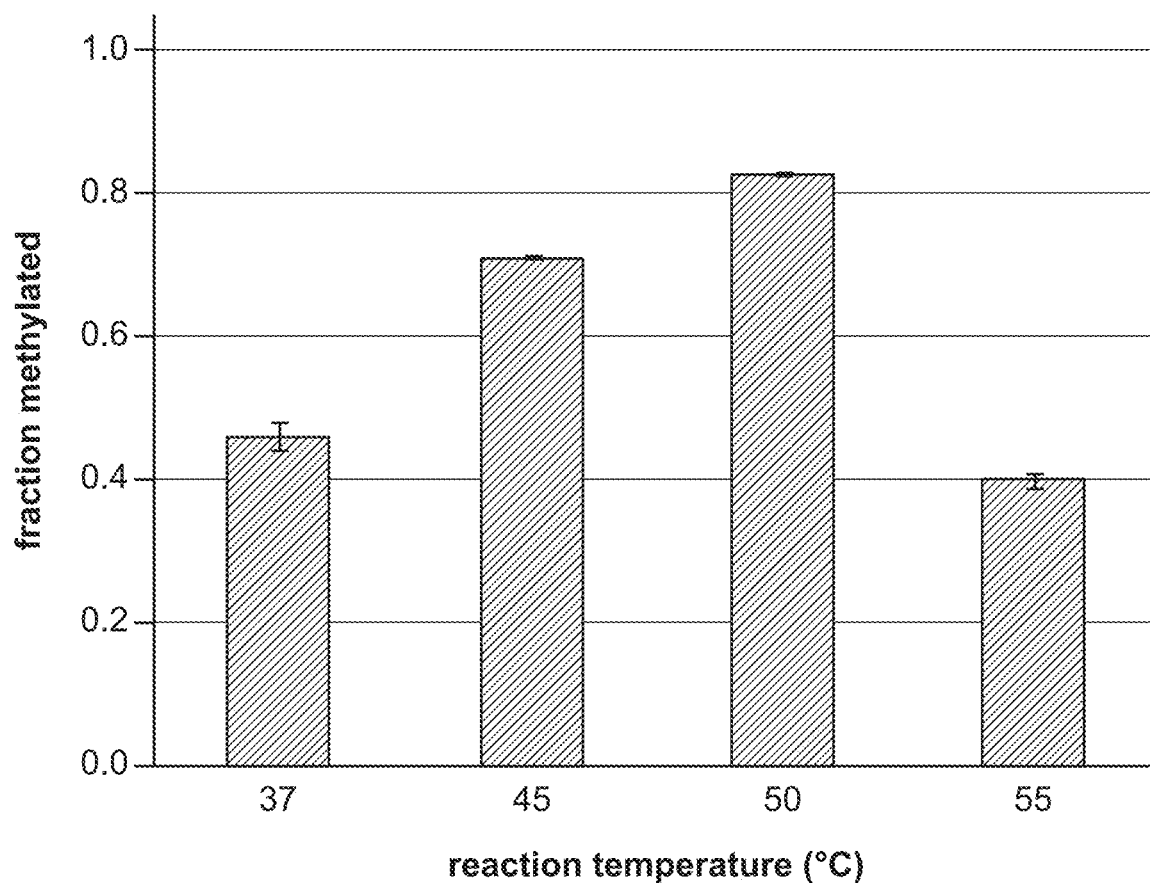
FIG. 10 shows that high reaction temperatures enhance enzymatic activity of Vaccinia virus RNA cap 2'O methyltransferase (MTase). 5 µM of chemically synthesized Cap-0 25-nt RNA (m7Gppp25mer) was allowed to react with 200 µM of SAM in the presence of 100 U of Vaccinia Vaccinia cap 2'O MTase (New England Biolabs, Ipswich MA) in 20 µL of 1×RNA capping buffering agent at the designated temperature for 30 minutes. The reactions were stopped by heating at 70° C. for 10 minutes. The RNA was purified from the reaction components, digested into nucleosides and cap structures and analyzed by UPLC. More Cap-1 RNA can be generated by carrying out the reaction at 45° C. and 50° C. than at 37° C.

Example 5: RNA Capping Reactions at 45° C. Enhance Capping Efficiency on Long RNAs A 1766 nt RNA containing the firefly luciferase gene (flucfluc) was produced by in vitro transcription using T7 RNA polymerase. 400 nM of fluc RNA was incubated with the indicated concentrations of H3C2 or VCE in the presence of 0.5 mM GTP and 0.1 mM SAM in 10 µL of 1×RNA capping buffering agent (50 mM Tris-HCl, 5 mM KCl, 1 mM MgCl$_2$, 1 mM DTT, pH 8) at 37° C. or 45° C. for 30 minutes. A final concentration of 2.5 µM of targeting oligo (TO) designed to direct RNase H to cleave out a 5' fragment of 25 nt was then added to each capping reaction, which was then heated at 80° C. for 30 s to inactivate the capping enzymes and then cooled slowly to room temperature. Thermostable RNase H (New England Biolabs, Ipswich, MA) was added to each reaction at a final concentration of 0.5 U/µL, followed by incubation at 37° C. for 1 hour. The RNase H reactions were then analyzed by electrophoresis through 15% urea polyacrylamide gels. The gels were stained using SYBR® Gold (Thermo Fisher Scientific, Waltham, MA) (according to manufacturer's instructions, and then scanned using an Amersham® Typhoon® RGB (GE Healthcare, Marlborough, MA) scanner using the Cy2 channel. The intensity of the capped and uncapped bands was normalized to that of the TO of the same lane. The normalized values were used to calculate the fraction of RNA capped under each condition. The calculated values were graphed against enzyme concentration and fitted to a Hill equation derivative to derive the enzyme concentration at which 50% capping was achieved (Cap50). For H3C2, the Cap50 values were 33.6 nM and 0.96 nM at 37° C. or 45° C., respectively. For VCE, the Cap50 values were 103 nM and 2.97 nM at 37° C. or 45° C., respectively (FIG. 10 and Table 6 below). For both enzymes, substantially less enzyme was needed to achieve 50% capping when capping reactions were carried out at 45° C.

TABLE 6

RNA capping activity of VCE and H3C2 on 1.7 kb fluc in vitro transcript at 37° C. and 45° C. expressed in Cap50 values.

| | Cap50 (nM) | | Fold improvement |
|---|---|---|---|
| Reaction temperature | 37° C. | 45° C. | 45° C. vs 37° C. |
| H3C2 | 33.60 | 0.96 | 35.00 |
| VCE | 103.14 | 2.97 | 34.73 |
| Fold improvement H3C2 vs VCE | 3.07 | 3.09 | |

The activity of these enzymes can be expressed in milli-unit per µL of reaction, as shown below:

| | Cap50 (mU/µL) | | Fold improvement |
|---|---|---|---|
| Reaction temperature | 37° C. | 45° C. | 45° C. vs 37° C. |
| H3C2 | 168.00 | 4.80 | 35.00 |
| VCE | 515.70 | 14.85 | 34.73 |
| Fold improvement H3C2 vs VCE | 3.07 | 3.09 | |

To show that the temperature-enhanced capping efficiency can be achieved on other long RNA molecules, the capping efficiency of H3C2 and VCE were studied using in vitro transcripts of cypridina luciferase (cluc; 1823 nt) and cystic fibrosis transmembrane receptor (CFTR; 4712 nt) by a mass spectrometry readout. Briefly, 0.5 µM of cluc or CFTR in vitro transcripts were incubated with 100 nM of H3C2 or VCE in the presence of 0.1 mM SAM and 0.5 mM GTP in a reaction volume of 100 µL at 37° C. or 45° C. for 30 minutes. The reactions were stopped by heating at 80° C. for 30 seconds in the presence of 2.5 µM of targeting oligo composed of 5' deoxynucleotides and 3' ribonucleotides and a TEG-desthiobiotin group. The reactions were allowed to cool down to 25° C. at a rate of 0.1° C./s. The reactions were then subjected to RNase H cleavage by incubation with thermostable RNase H (New England Biolabs, Ipswich, MA) at a final concentration of 0.5 U/µL at 37° C. for 1 hour. The 5' fragments of the RNase H cleavage reactions were then purified using size selection using AMPure® XP Beads and target selection using streptavidin magnetic beads. Briefly, 100 µL of RNase H cleavage reactions were added to 200 µL of AMPure® XP Beads and incubated at room temperature for 5 minutes. The beads were then subjected to a magnetic field, and the clarified supernatant was retrieved and added to pre-cleared AMPure® XP beads derived from 200 µL of beads suspension. After incubating at room temperature for 5 min, the beads were subjected to a magnetic field. The clarified supernatant was added to pre-cleared beads derived from 200 µL of Dynabeads® MyOne Streptavidin C1. After washing 4 times with 200 µL of wash buffering agent (5 mM Tris, pH 7.5, 0.5 mM EDTA, 1 M NaCl), the bound RNA was eluted by incubating the clarified beads with 50 µL of biotin elution buffering agent (1 mM biotin, 5 mM Tris, pH 7.5, 0.1 M NaCl, 0.1 M NaCl) at 37° C. for 1 hour. The eluted RNA was then analyzed by LC/MS to determine the relative quantity of the target masses, performed by external contractor Novatia LLC. The extent of RNA capping was assessed by the ratio of the mass intensity of the capped and uncapped RNA species.

Figure 11:
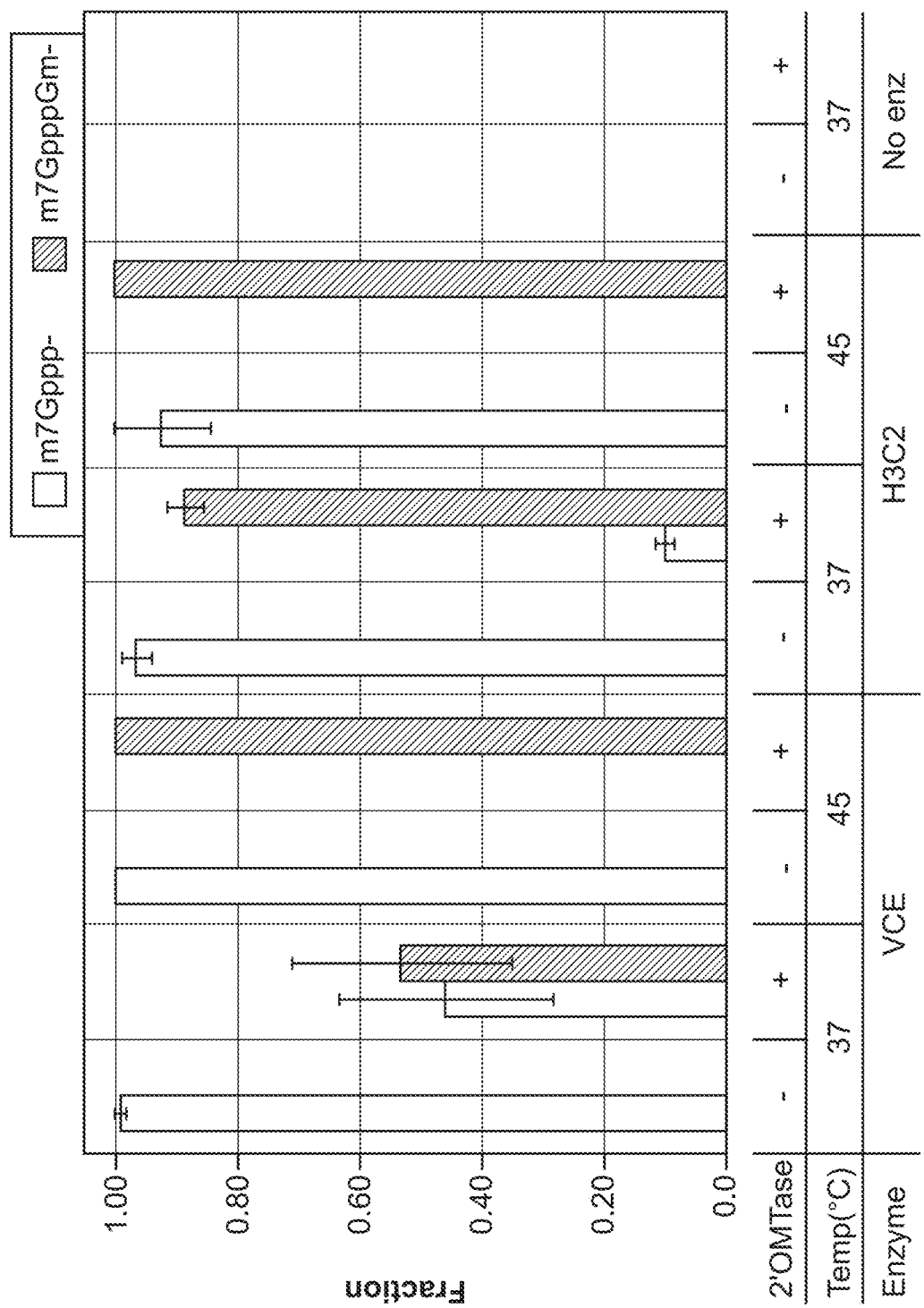
FIG. 11 shows that "one-pot" generation of Cap-1 structure is more efficient at 45° C. than at 37° C. In this experiment, 5 µM of a chemically synthesized 5' triphosphate ribonucleotide oligo (ppp25mer) was incubated with 200 U of Vaccinia virus cap 2'OMTase in the presence of 50 nM H3C2 or VCE, 1 mM GTP and 0.2 mM SAM in 40 µL of 1×RNA capping buffering agent at 37° C. or 45° C. for 30 minutes. The relative quantity of the reactants and products were derived from direct LC/MS analysis. As shown here, performing the one-pot enzymatic reaction at 45° C. generates more Cap-1 structured RNA than at 37° C.

As shown in FIG. 11, both H3C2 and VCE exhibit more capping activity on cluc RNA and CFTR RNA at 45° C. than at 37° C.

Figure 12:
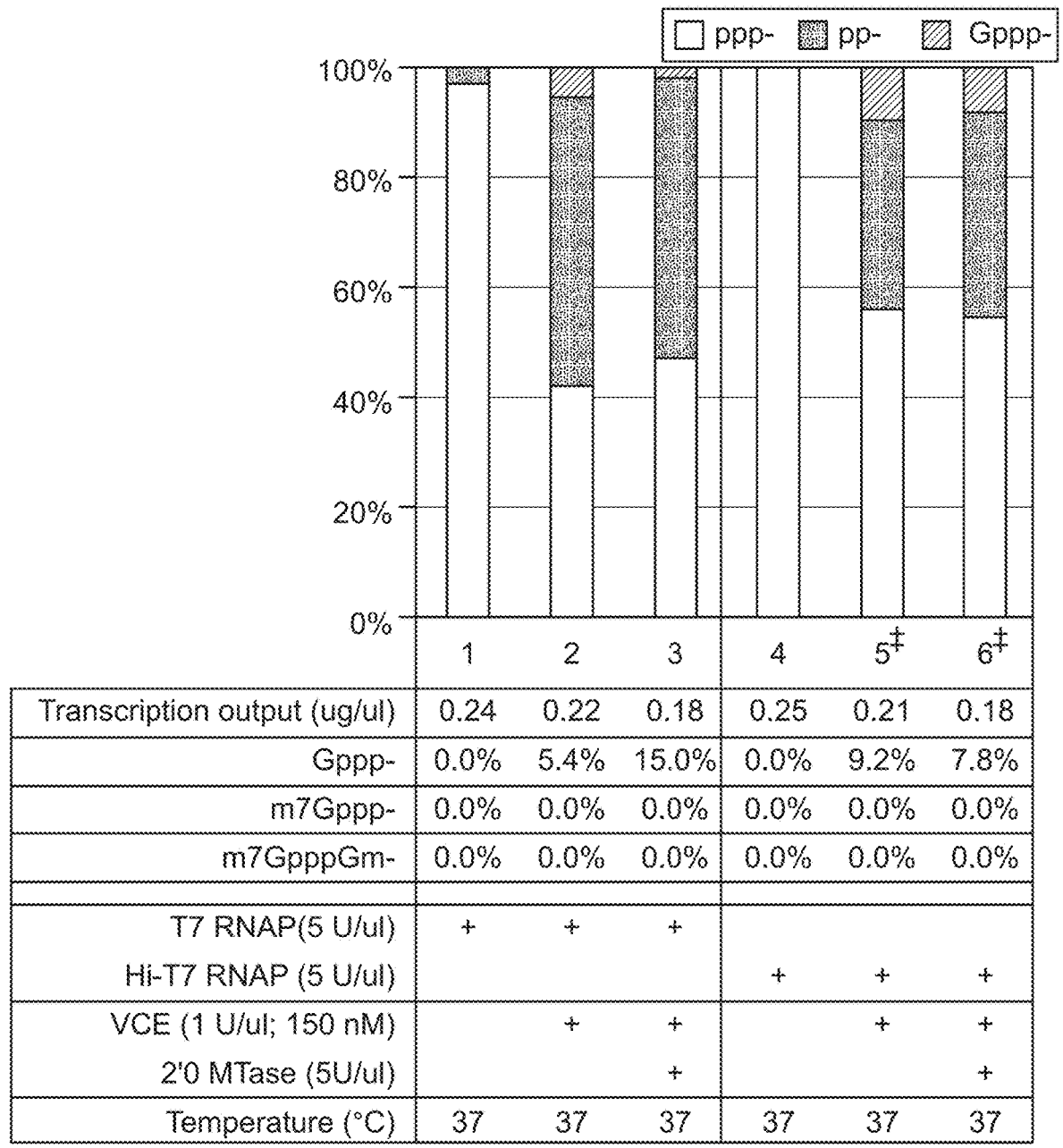
FIG. 12 shows that single-step capped RNA synthesis for a 1.7 kb fluc transcript using commercially available enzymes and recommended reaction temperature does not generate significant amount of Cap-0 or Cap-1 RNA. Reactions were carried out at 37° C. for 1 hour using the indicated components at recommended enzyme concentrations (see Example 7 for details). Transcription output was measured using Qubit RNA BR kit after DNase I treatment. Products of capped RNA synthesis reactions were analyzed by LC/MS. Fraction of transcript containing different 5' groups were estimated using mass intensity of the corresponding masses. Datapoints are average of triplicate experiments unless indicated otherwise.

Example 6: Efficient One-Pot Enzymatic Synthesis of Cap-1 Structure on Triphosphate RNA at Increased Temperature To verify if Vaccinia virus cap 2'OMTase is active at elevated temperatures, a reaction containing 5 μM of a chemically synthesized Cap-0 RNA1 (25 nt) and 200 μM SAM in 20 μL of 1×RNA capping buffering agent (50 mM Tris-HCl, 5 mM KCl, 1 mM $MgCl_2$, 1 mM DTT, pH 8.0) were preheated at 37° C., 45° C. or 50° C. for 1 minute before 100 U of Vaccinia virus cap 2'OMTase (New England Biolabs, Ipswich, MA) was added. The reactions were allowed to proceed at the pre-heat temperature for 30 minutes and then were stopped by heating at 70° C. for 10 minutes. The RNA was purified from the reaction components using the Oligo Clean-up and Concentration Kit (Norgen Biotek, Thorold, Canada). The purified RNA was then digested into nucleosides and cap structures by incubating with 2 μL of nucleotide digestion mix (New England Biolabs, Ipswich, MA) in 20 μL reactions containing nucleoside digestion mix reaction buffering agent (50 mM sodium acetate, pH 5.4, 1 mM $ZnCl_2$) at 37° C. for 1 hour. The nucleoside digestion reactions were then analyzed with Agilent 1290 Infinity II UHPLC (Agilent Technologies, Santa Clara, CA) on a Waters XSelect™ HSS T3 XP column (Waters Corporation, Milford, MA) (2.1×100 mm, 2.5 μm) with a gradient mobile phase consisting of methanol and 10 mM potassium phosphate buffering agent (pH 7.0). As shown in FIG. 12, more Cap-0 RNA was methylated at 45° C. and 50° C. than at 37° C.

Figure 13:
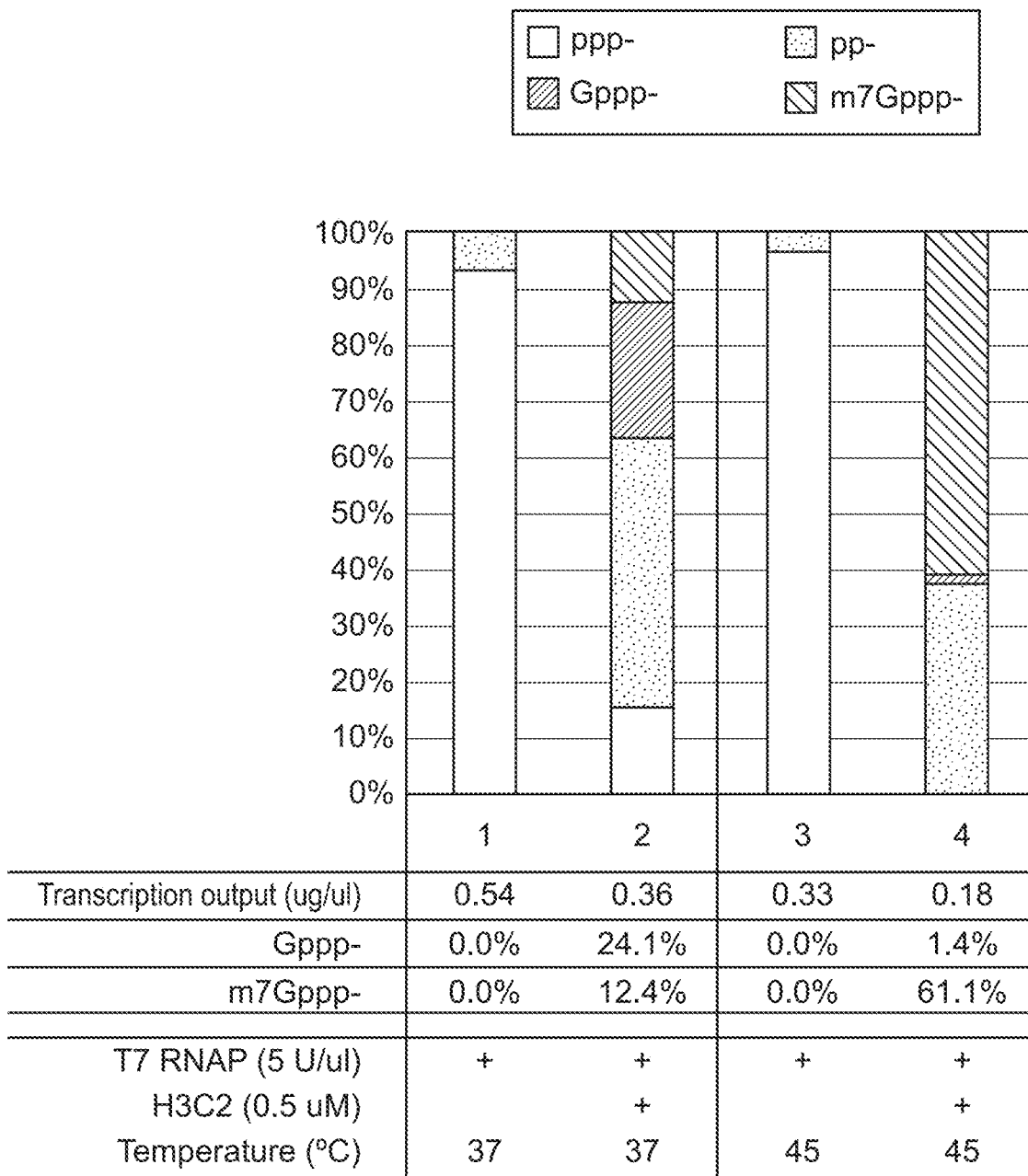
FIG. 13 shows a single-step method to synthesize capped fluc transcript using high concentration of H3C2 capping enzyme and increased temperature. Single-step capped RNA synthesis were carried out at 37 or 45° C. for 1 hour using T7 RNA polymerase with 0.5 µM H3C2 RNA capping enzyme. Fraction of ppp-, pp-, Gppp- and m7Gppp-capped RNA was estimated using capillary electrophoresis. Datapoints are average of duplicate experiments.

To demonstrate one-pot enzymatic synthesis of Cap-1 structure on 5' triphosphate RNA at increased temperature. 5 μM of a chemically synthesized 5' triphosphate RNA1 was incubated with 200 U of Vaccinia virus cap 2'OMTase (final concentration of 5 U/μL) in the presence of 50 nM H3C2 or VCE, 1 mM GTP and 0.2 mM SAM in 40 μL reactions containing 1×RNA capping buffering agent (50 mM Tris-HCl, 5 mM KCl, 1 mM $MgCl_2$, 1 mM DTT, pH 8.0) at 37° C. or 45° C. for 30 minutes. The reactions were directly analyzed by LC/MS to determine the mass and the relative quantity of the masses. When paired with 50 nM of VCE, while 5 U/μL of 2 OMTase only generated ~50% of the Cap-01 RNA at 37° C., it generated 100% Cap-1 RNA at 45° C. (FIG. 13). When paired with 50 nM of H3C2, 5 U/μL Vaccinia 2'OMTase generated ~90% Cap-1 RNA at 37° C. and 100% Cap-1 RNA at 45° C. (FIG. 13). Therefore, performing the reactions at 45° C. approximately doubled the yield of Cap-1 RNA in the presence of VCE and increased the yield of Cap-1 RNA in the presence of H3C2.

Example 7: Single-Step Cap-0 and Cap-1 RNA Synthesis Using Individual RNA Polymerase, RNA Capping Enzymes and Cap 2'O Methyltransferase Cap-0Cap-1

A. Single Step Capped RNA Synthesis with Vaccinia Capping Enzyme is Inefficient

As recommended by the manufacturer for the respective reactions, 5 U/μl of T7 RNA polymerase (New England Biolabs; Cat. No. M0251), Hi-T7 RNA polymerase (New England Biolabs; Cat. No. M0658), 1 U/μl of Vaccinia capping enzyme (New England Biolabs; Cat. No. M2080) and 5 U/μl of Vaccinia mRNA cap 2'O methyltransferase (New England Biolabs: Cat. No. M0366) were used as indicated for the transcription and capping of a 1.7 kb fluc transcript (SEQ ID NO:18). The reactions contained 1× T7 RNA polymerase buffering agent (40 mM Tris-HCl, pH 7.9, 10 mM NaCl, 1 mM DTT, 2 mM spermidine) when T7 RNA polymerase was used or 1× Hi-T7 RNA polymerase buffering agent (40 mM Tris-HCl, pH 7.9, 60 mM NaCl, 1 mM DTT, 2 mM spermidine) when Hi-T7 RNA polymerase was used. The reactions were supplemented with 19 mM $MgCl_2$ and 5 mM each of ATP, UTP, GTP, CTP and 0.5 mM SAM. The reactions were carried out at 37° C. for 1 hour, the recommended reaction temperature and duration for T7 RNA polymerase and Vaccinia capping enzyme.

To assess the yield of in vitro transcription, after the 1-hour incubation, for each reaction, 1 μL of the reaction mix was added to a 4-μL solution containing 1× DNase I reaction buffering agent (10 mM Tris-HCl, pH 7.6, 2.5 mM $MgCl_2$, 0.5 mM $CaCl_2$) and 0.5 U/μL DNase I (New England Biolabs) and incubated at 37° C. for 30 min. The DNase I reactions were then analyzed for total RNA concentration using Qubit RNA Broad Range kit (Thermo Fisher) according to manufacturer's instruction. To verify the transcript sizes and integrity, the DNase I reactions were analyzed using 2% E-Gel (Thermo Fisher) with images taken using a Typhoon RGB scanner (GE Healthcare). Results are shown as transcription output in FIG. 14.

To analyze the extent of RNA capping, single-step capped RNA synthesis reactions were analyzed by RNase H cleavage followed by intact LC/MS analysis. Briefly, the single-step capped RNA synthesis reactions stopped by heating at 80° C. for 30 s in the presence of 2.5 μM of targeting oligo (TO-1) composed of 5' deoxynucleotides and 3' ribonucleotides and a TEG-desthiobiotin group (SEQ ID NO:19). The reactions were allowed to cool down to 25° C. at a rate of 0.1° C./s. The reactions were then subjected to RNase H cleavage by incubation with thermostable RNase H (New England Biolabs; Cat. No. M0523) at a final concentration of 0.5 U/μL at 37° C. for 1 h. To facilitate the analysis of the 5' group using capillary electrophoresis, a FAM-labeled nucleotide was added to the 3' end of the RNase H cleavage fragment. Briefly, 5 μL of the RNase H reaction was retrieved and added to 5 μl of a solution containing 2×NEBuffer 2, 0.5 mM dATP, 0.05 mM FAM-12-dCTP (Perkin Elmer) and 0.25 U/μL DNA polymerase I large (Klenow) fragment (New England Biolabs). The reactions were incubated at 37° C. for 1 hour. In some instances, a small fraction of the Klenow reactions were analyzed on urea PAGE to verify the success of capping. Briefly, 2 μL of the Klenow reactions were retrieved and added to 8 μL of 2× RNA loading dye (New England Biolabs). The mixtures were then analyzed by electrophoresis through a urea-15% polyacrylamide gel. Gel images were acquired by a Typhoon RGB scanner (GE Healthcare) using the Cy2 channel.

To analyze the 5' group status of the coupled transcription/capping reaction products using capillary electrophoresis or mass spectrometry, the Klenow reaction products (RNase H-cleavage products still annealed to the desthiobiotinylated targeting oligo) were then purified by size selection using AMPure® XP Beads (Thermo Fisher) and then selected using streptavidin magnetic beads. Briefly, 45 μL of nuclease-free water was added to 5 μL of RNase H cleavage reactions, which was then added to 100 μL of NEBNext® Sample Purification Beads (New England Biolabs) and incubated at room temperature for 5 minutes. The beads were then placed next to a magnet for 2 minutes at room temperature. The clarified supernatant was retrieved and added to pre-cleared NEBNext® Sample Purification Beads derived from 100 µL of beads suspension. After incubating at room temperature for 5 min, the beads were then placed next to a magnet for 2 minutes at room temperature. The clarified supernatant was added to pre-cleared beads derived from 50 µL of Dynabeads® MyOne Streptavidin C1 (Thermo Fisher). After washing 4 times with 50 µL of low salt wash buffering agent (5 mM Tris, pH 7.5, 0.5 mM EDTA, 60 mM NaCl), the bound RNA was eluted by incubating the clarified beads in 10 µL of nuclease-free water. The eluted RNA was then analyzed by capillary electrophoresis on an Applied Biosystems 3130×1 Genetic Analyzer (16 capillary array) or an Applied Biosystems 3730×1 Genetic Analyzer (96 capillary array) using GeneScan® 120 LIZ dye Size Standard (Applied Biosystems). Reaction products were analyzed using PeakScanner software (Thermo Fisher Scientific) and an in-house software suite. Areas of peaks corresponding to the m7Gppp-, unmethylated Gppp-, uncapped pp- and ppp-RNaseH-cleaved transcript were quantified and used to calculate fraction of ppp-, pp-, Gppp- and m7Gppp-transcript in the capped RNA synthesis reactions.

To determine the relative quantity of m7GpppGm-(Cap-1), m7G-(Cap-0), unmethyl-G-capped and uncapped RNA using mass spectrometry, intact mass of the relevant species was determined using LC/MS performed by external contractor Novatia LLC (Newtown, PA) or an in-house facility. The extent of RNA capping was assessed by the ratio of the mass intensity of the relevant RNase H-cleaved products.

Figure 14:
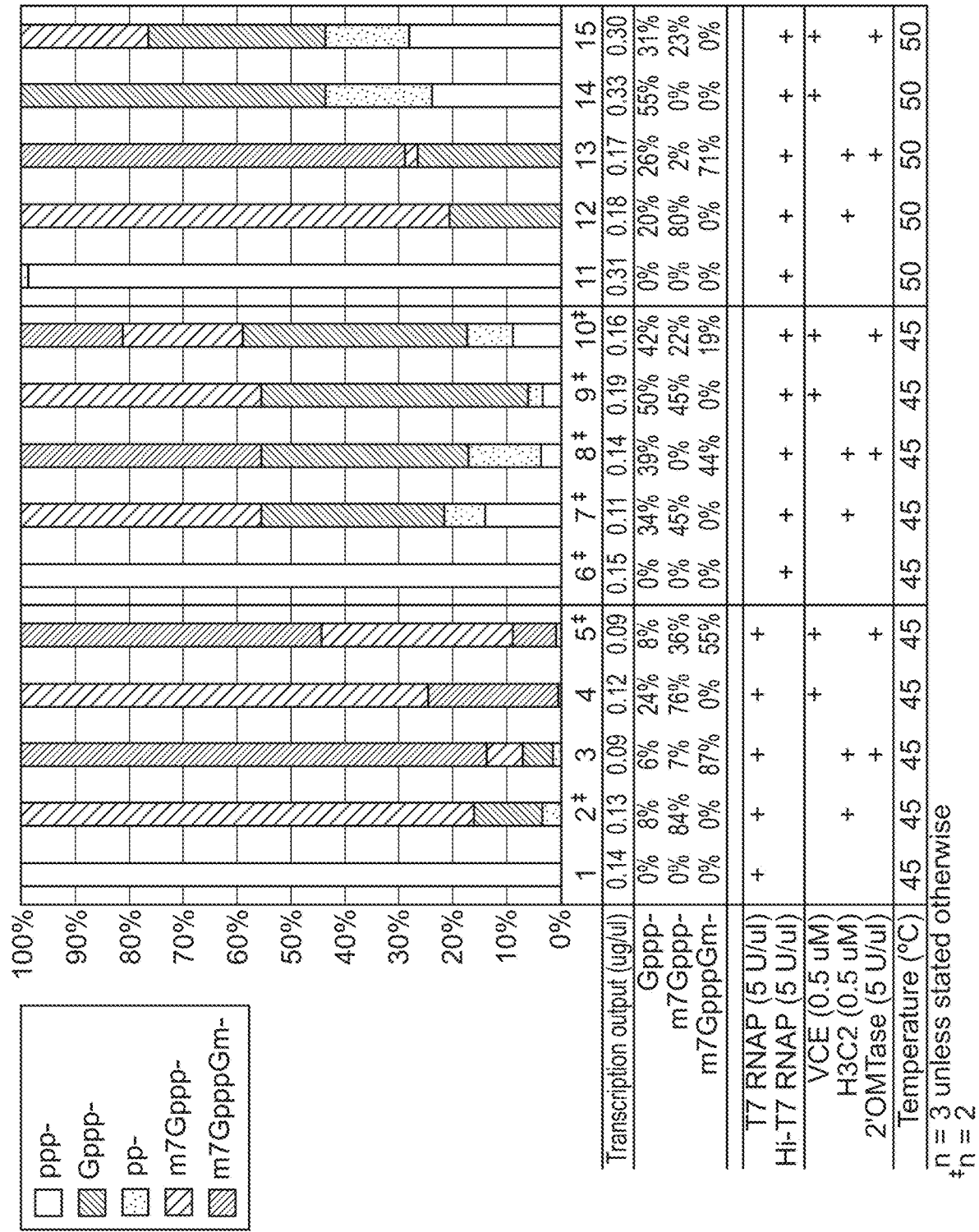
FIG. 14 shows a single-step Cap-0 or Cap-1 RNA synthesis using high capping enzyme concentration at 45 or 50° C. Products of capped RNA synthesis reactions were analyzed by LC/MS. Fraction of transcript containing different 5' group was estimated using mass intensity of the corresponding masses. Datapoints are average of triplicate experiments unless indicated otherwise.

FIG. 14 shows the results of single-step transcription using currently commercially available reaction conditions. Comparing bar 1 and bar 2, the presence of VCE did not significantly affect the transcription output of T7 RNA polymerase but did not generate detectible m7GpppG-(Cap-0) transcript. A small fraction (5.4%) of unmethylated-G capped RNA, an undesired capping reaction intermediate, was detected. Also, about 50% of the transcript contains a 5' diphosphate group, another capping reaction intermediate. As shown in bar 3, when Vaccinia cap 2'O methyltransferase was included in the reaction, transcription output was not significantly affected and no m7GpppGm-(Cap-1) transcript was detected. Approximately 50% of the transcript had a 5' diphosphate group and ~15% had the unmethyl-G capped intermediate. When Hi-T7 RNA polymerase was used instead of T7 RNA polymerase, results similar to T7 RNA polymerase reactions were observed—the presence of VCE did not impact transcription of Hi-T7 RNA polymerase significantly but did not generate detectible level of Cap-0 transcript. Addition of Vaccinia cap 2'O methyltransferase in the reaction did not produce any Cap-1 transcript. From these results, enzyme reagents and reaction conditions that are the current standard for in vitro mRNA synthesis (i.e. RNA synthesis followed by mRNA capping) do not support the in vitro production of capped mRNA in single reactions (i.e., single-step capped RNA synthesis).

B. Faustovirus RNA Capping Enzyme H3C2 Efficiently Caps Transcripts in a Single-Step Reaction In Vitro Since the reagents and conditions of Example 7A were ineffective to produce capped transcripts in a single-step reaction in vitro, new enzymes and reaction conditions were tested for their ability to synthesize single-step capped RNA synthesis in vitro. FIG. 13 shows the results of single-step capped RNA synthesis using high concentration of H3C2 capping enzyme at 37° C. or 45° C.

At 37° C., 0.5 µM of H3C2 capping enzyme generated 12% m7Gppp-capped transcript with as much as 24.1% unmethylated-G capped transcript as measured by capillary electrophoresis. At 45° C., on the other hand, as much as 61% of the transcripts had the m7Gppp-cap and only 1.4% of the transcripts had the unmethylated-G cap. At both temperatures, the transcription output was 50-60% of those without H3C2 capping enzyme. Hence, increasing H3C2 concentration and reaction temperature improved the yield of Cap-0 transcription production in single-step capped RNA synthesis using T7 RNA polymerase and H3C2 RNA capping enzyme.

The impact of further expanding the range of enzyme reagents and reaction temperature was tested by performing the single-step capped RNA synthesis at 45° C. and 50° C. Cap-0 using different combinations of T7 RNA polymerase, Hi-T7 RNA polymerase, VCE, H3C2 and Vaccinia cap 2'O methyltransferase. Specifically, single-step capped RNA synthesis reactions were carried out as described in Examples 7A using 0.5 µM VCE or H3C2 capping enzyme in the presence of absence of 5 U/µL Vaccinia mRNA cap 2'O methyltransferase in conjunction with 5 U/µL T7 RNA polymerase or Hi-T7 RNA polymerase in their respective reaction buffering agents as indicated. Reactions were carried out at 45 or 50° C. for 1 hour.

FIG. 14 summarizes the results of this expanded survey. In bars 1-5, capped RNA synthesis reactions were carried out at 45° C. using T7 RNA polymerase. In the presence of H3C2 capping enzyme, 84% of the transcript was m7Gppp-capped (Cap-0) and 8% was unmethylated-G capped (bar 2). In the presence of both H3C2 and cap 2'O methyltransferase, 87% of the transcript had the m7GpppGm-cap (Cap-1), 6% had the unmethylated-G capped and no Cap-0 was detected (bar 3). When VCE was used, 76% of the transcript had the Cap-0 structure with 24% had the unmethylated-G cap structure (bar 4). In the presence of both VCE and cap 2'O methyltransferase, 55% of the transcript had the Cap-1 structure, 36% had the Cap-0 structure and 8% had the unmethylated-G cap structure. RNA yield was not significantly affected when H3C2 or VCE was present in reaction at 45° C. However, RNA yield decreased from 0.14 µg/µL to 0.09 µg/µL when cap 2'O methyltransferase and either of the capping enzymes were present. In capped RNA synthesis reactions using Hi-T7 RNA polymerase at 45° C. (bars 6-10), a smaller fraction of transcript was capped compared to those using T7 RNA polymerase (bars 1-5). H3C2 capping enzyme and VCE generated 45% (bar 7) and 50% Cap-0 transcript (bar 9), respectively. H3C2 in conjunction with cap 2'O methyltransferase generated 44% Cap-1 transcript, 39% unmethylated-G capped transcript and no detectable Cap-0 transcript (bar 8). VCE in conjunction with cap 2'O methyltransferase generated 19% Cap-1 transcript, 22% Cap-0 transcript and 42% unmethylated-G capped transcript (bar 10). Interestingly, the transcription output of the reactions carried out at 45° C. using Hi-T7 RNA polymerase was not significantly affected in the presence of capping enzyme or cap 2'O methyltransferase (bars 6-10). When the capped RNA synthesis reactions were carried out at 50° C. using Hi-T7 RNA polymerase, H3C2 capping enzyme generated 80% Cap-0 transcript and 20% unmethylated-G capped transcript (bar 12). In the presence of both H3C2 and cap 2'O methyltransferase, 71% of the transcript contained Cap-1 structure, 2% contained Cap-0 structure and 26% contained the unmethylated-G cap structure (bar 13). When VCE was used, 55% of the transcript had the unmethylated-G capped structure and no Cap-0 transcript was detected. When both VCE and cap 2'O methyltransferase were present, 23% of the transcript had the Cap-0 structure and 31% had the unmethylated-G cap structure.

To summarize, this example provides single-step reaction conditions that produce in vitro Cap-0 RNA at up to 80% efficiency using H3C2 RNA capping enzyme in conjunction with T7 RNA polymerase or Hi-T7 RNA polymerase (Table 7). The example also describes single-step reaction conditions that can generate Cap-1 RNA at 70-80% efficiency using H3C2 RNA capping enzyme, Vaccinia mRNA cap 2'O methyltransferase in conjunction with T7 RNA polymerase or Hi-T7 RNA polymerase (Table 8).

TABLE 7

| Cap 0 yield | RNAP | CE | Temp (° C.) |
|---|---|---|---|
| ≥80% | T7 | H3C2 | 45° C. |
|  | Hi-T7 | H3C2 | 50° C. |

TABLE 8

| Cap 1 yield | RNAP | CE | 2'O MTase | Temp(° C.) |
|---|---|---|---|---|
| 40-50% | Hi-T7 | H3C2 or VCE | Vaccinia 2'O MTase | 45° C. |
| ≥70% | T7 | H3C2 | Vaccinia 2'O MTase | 45° C. |
|  | Hi-T7 | H3C2 | Vaccinia 2'O MTase | 50° C. |

Example 8: Single-Step Cap-0 RNA Synthesis Using a H3C2:T7 RNA Polymerase Fusion Protein A fusion construct was prepared to produce protein composed of H3C2 RNA capping enzyme and T7 RNA polymerase linked by a putatively flexible linker sequence (SEQ ID NO:20). The fusion protein was encoded by DNA sequence (SEQ ID NO:21) under the control of T7 promoter or tac promoter, expressed in *E. coli* and purified using standard chromatographic techniques.

Single-step capped RNA synthesis reactions for the 1.7 kb fluc transcript were performed as indicated in Example 7 in 1× T7 RNA polymerase buffering agent supplemented with 19 mM $MgCl_2$ and 5 mM each of ATP, UTP, GTP, CTP and 0.1 mM SAM in the presence of 0.5 μM H3C2:T7 RNA polymerase fusion. Reactions containing 5 U/μL T7 RNA polymerase with or without 0.5 μM H3C2 capping enzyme were done for comparison. The reactions were carried out at 37 or 45° C. for 1 hour. The RNA yield and fraction of capped and uncapped transcription were measured and analyzed as indicated in Example 7.

Figure 15:
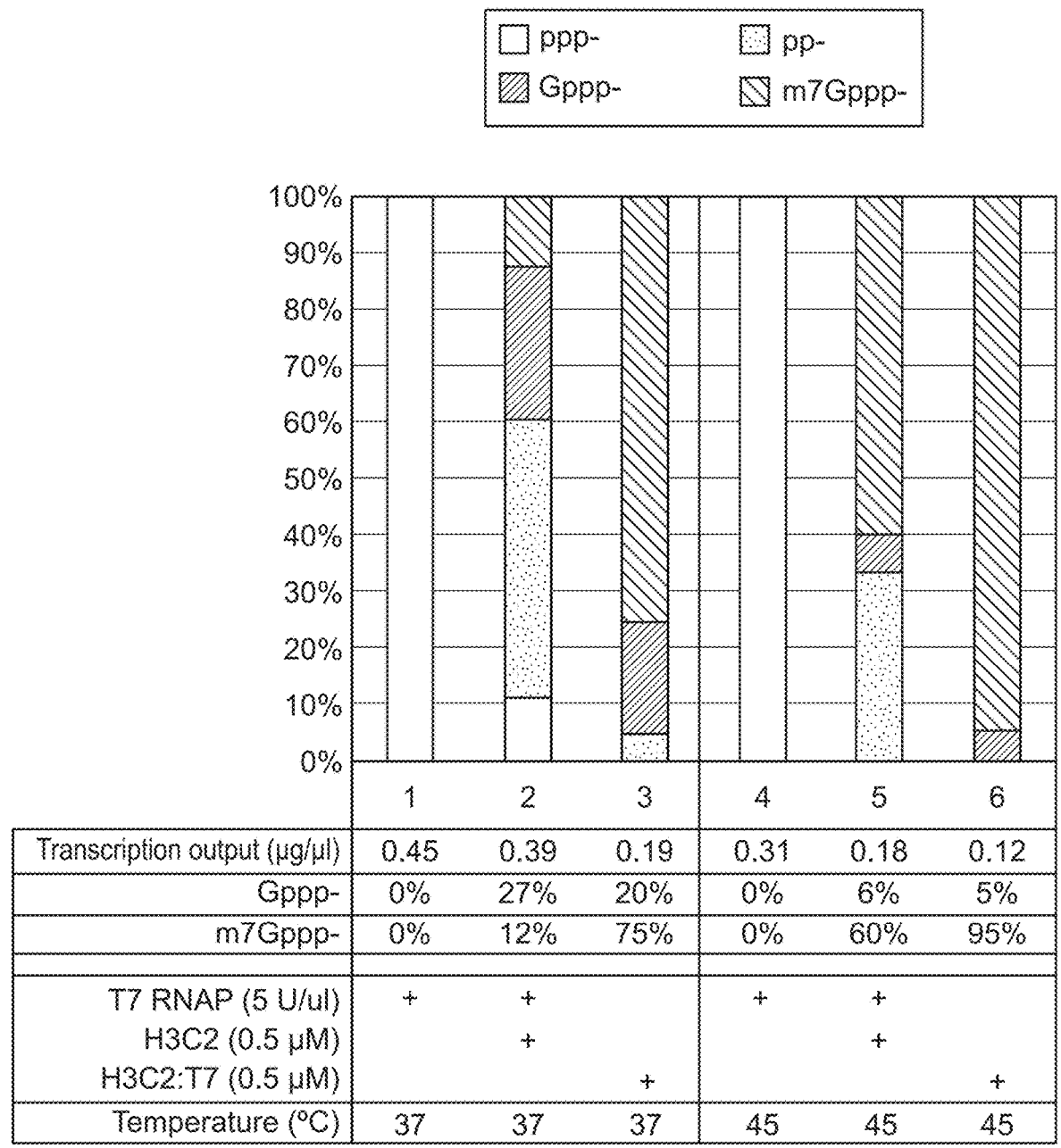
FIG. 15 shows a single-step Cap-0 RNA synthesis using H3C2:T7 fusion protein at 37° C. or 45° C. The fusion protein generated 98% Cap-0 transcript at 45° C. in 1 hour. Products of capped RNA synthesis reactions were analyzed by LC/MS. Fraction of transcript containing different 5' group was estimated using mass intensity of the corresponding masses. Datapoints are average of duplicate experiments unless indicated otherwise.

Results are shown in FIG. 15. When the reactions were performed at 37° C., the H3C2:T7 fusion protein generated 75% m7Gppp-capped (Cap-0) transcript and 20% unmethylated-G capped transcript (bar 1). Under the same conditions, separate enzymes H3C2 and T7 RNA polymerase only generated 12% Cap-0 transcript and 27% unmethylated-G capped transcript (bar 2). The transcription output decreased from 0.45 μg/μL when only T7 RNA polymerase was present (bar 3) to 0.39 μg/μL when H3C2 was added and further to 0.19 μg/μL when H3C2:T7 fusion was used for transcription. At 45° C., the H3C2:T7 RNA polymerase fusion generated 95% Cap-0 transcript and 5% unmethylated-G capped transcript (bar 4), compared to 60% Cap-0 and 6% unmethyl-G capped transcript when individual enzymes were used (bar 5). Similar to reactions performed at 37° C., the transcription output decreased from 0.31 μg/μL when only T7 RNA polymerase was present (bar 6) to 0.18 μg/μL when H3C2 was added or to 0.12 μg/μL when H3C2:T7 fusion was used for transcription.

Thus, under the reaction conditions described, this example demonstrates efficient (e.g., as high as 98%), single-step in vitro Cap-0 RNA synthesis using an H3C2:T7 RNA polymerase fusion protein.

Figure 16:
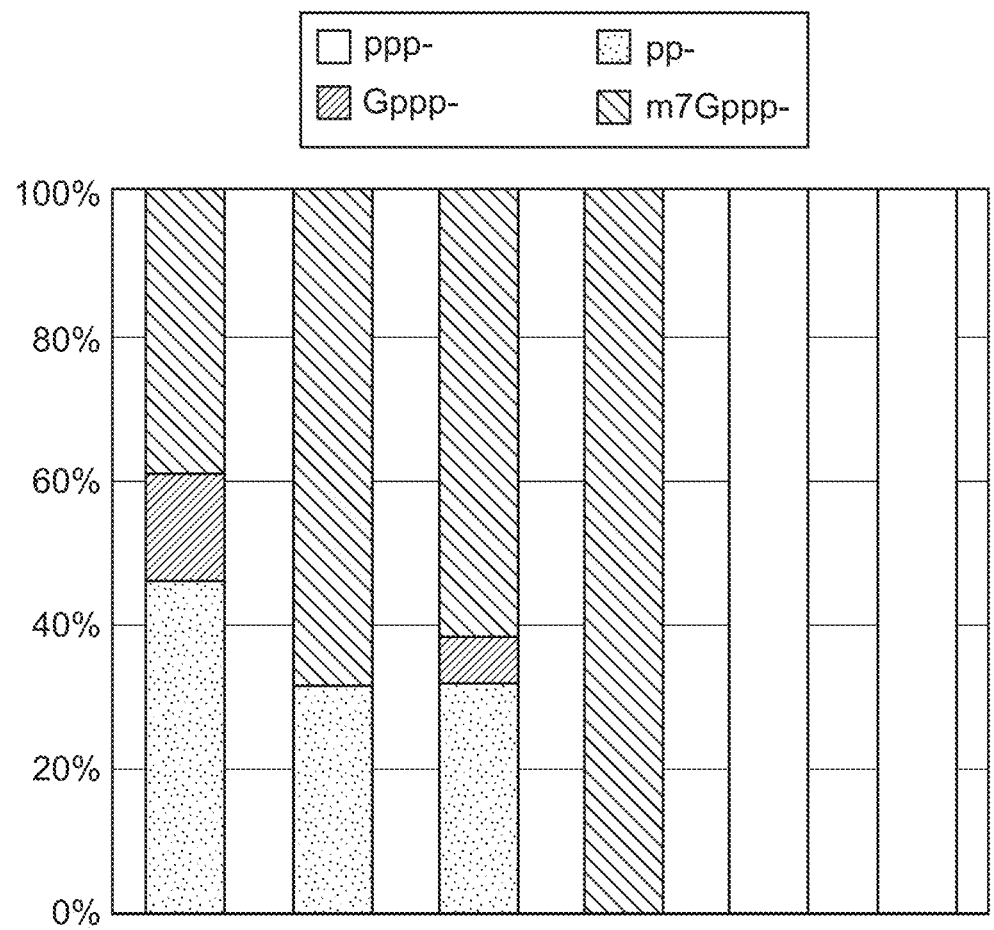
FIG. 16 shows that VCE and H3C2 capping enzyme efficiently cap the 1.8 kb cluc/A120 transcript. 500 nM of unmodified or pseudouridine cluc/A120 transcript was incubated with 100 nM of H3C2 or VCE in the presence of 0.5 mM GTP and 0.1 mM SAM in 10 mL of 1×RNA capping buffering agent (50 mM Tris-HCl, 5 mM KCl, 1 mM $MgCl_2$, 1 mM DTT, pH 8) at 37° C. for 30 min. The capping reactions were analyzed by the RNase H/intact LC/MS workflow as described in EXAMPLE 9. VCE and H3C2 generated 68.4% or 100% m7Gppp-capped cluc/A120 transcript containing pseudouridine, respectively. Notably, both capping enzymes cap a larger fraction of the pseudouridine-containing cluc/A120 transcript than the uridine counterpart.

Example 9: RNA Capping Enzymes Efficiently Caps In Vitro Transcripts Containing Pseudo-Uridine A ~1800 nt RNA encoding the cypridina luciferase protein with a 120 nt poly (A) tail (cluc/A120) was synthesized with in vitro transcription using T7 RNA polymerase (New England Biolabs Inc.) in the presence of pseudouridine triphosphate (Trilink Biotechnologies) or unmodified uridine triphosphate (New England Biolabs Inc.). 500 nM of unmodified or pseudouridine cluc/A120 transcript was incubated with 100 nM of H3C2 or VCE in the presence of 0.5 mM GTP and 0.1 mM SAM in 10 mL of 1×RNA capping buffering agent (50 mM Tris-HCl, 5 mM KCl, 1 mM $MgCl_2$, 1 mM DTT, pH 8) at 37° C. for 30 min. A targeting oligo (TO) designed to direct RNase H to cleave out a 5' fragment was then added to each capping reaction to achieve a final TO concentration of 2.5 μM. Each reaction was then heated at 80° C. for 30 s to anneal the TO to the transcript and inactivate the capping enzymes and cooled slowly to room temperature. Thermostable RNase H (New England Biolabs) was added to each reaction at a final concentration of 0.5 U/mL and incubated at 37 C for 1 h. Reaction products were then purified and analyzed by intact LC/MS as described in Example 7. As shown in FIG. 16, VCE and H3C2 m7Gppp-capped 68.4% or 100% of the cluc/A120 transcript containing pseudouridine, respectively. Notably, both capping enzymes cap a larger fraction of the pseudouridine-containing cluc/A120 transcript than the uridine counterpart.

Example 10: Scaled-Up Cap-1 Capping and Functional Assay

Figure 17:
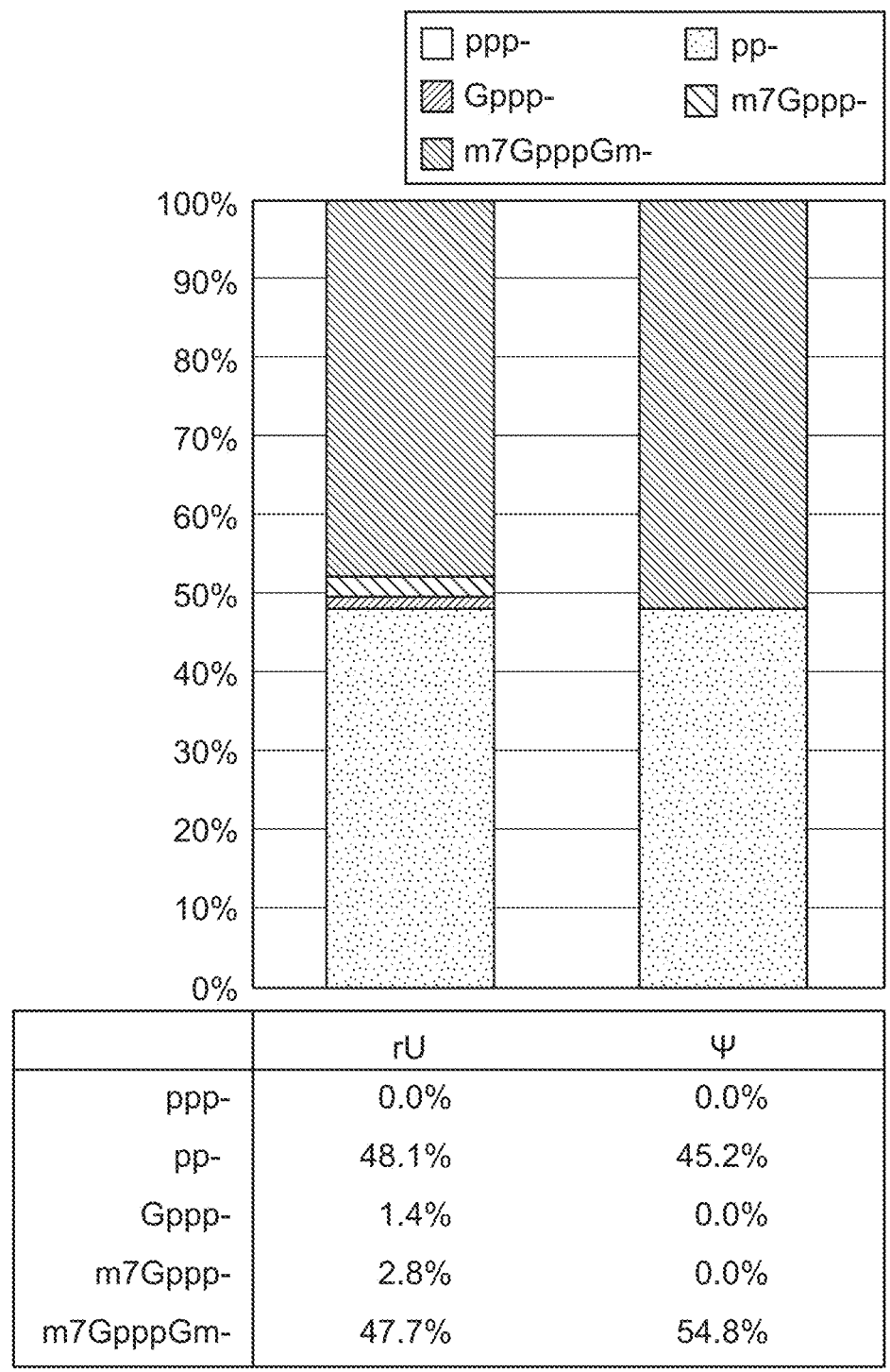
FIG. 17 shows the Cap-1 formation efficiency of a larger RNA quantity. A total of 250 pmol (145 µg) of ~1800 nt cluc/A120 in vitro transcript was capped in a 500 µL reaction containing 1×RNA capping buffering agent (50 mM Tris-HCl, pH 8.0, 5 mM KCl, 1 mM $MgCl_2$, 1 mM DTT), 0.5 mM GTP, 0.1 mM SAM, 10 U/µL of Vaccinia cap 2'O methyltransferase and 500 nM of H3C2 at 45° C. for 1 h. The efficiency of Cap-1 formation was assessed by the RNase H/intact LC/MS as described in Example 10. Under these reaction conditions, 54.8% of the pseudouridine containing cluc/A120 transcript was Cap-1 whereas 47.7% of the uridine counterpart was Cap-1. Optimization of reaction conditions (as described in EXAMPLE 10) may improve the yield of Cap-1 formation. Results are average of duplicate experiments.
Figure 18:
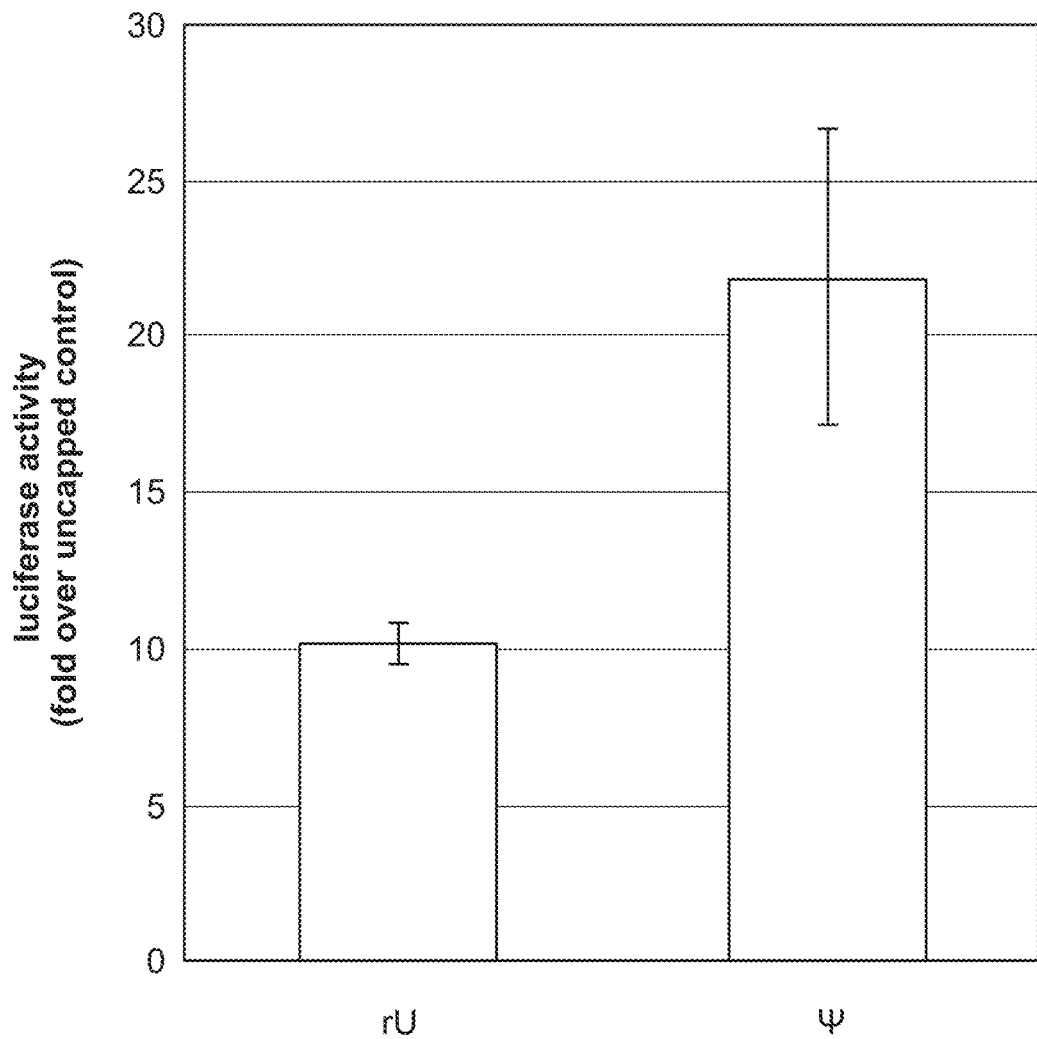
FIG. 18 shows that the Cap-1 cluc/A120 transcript are functionally active in vivo. The Cap-1 cluc/A120 transcript containing uridine or pseudouridine and transfected to HEK293 cells. The translation efficiency of the capped cluc/A120 transcript was measured as relative luciferase activity from HEK293 cells transfected with the capped cluc/A120 transcript in relation to uncapped cluc/A120 transcript four hours after transfection. The luciferase assay shows that the capped transcripts containing rU and pseudouridine exhibited luciferase activity 10 or 20-fold, respectively, over uncapped controls, indicating that the RNAs capped with H3C2 and Vaccinia 2'O methyltransferase at 45° C. were functionally active.

A total of 250 pmol (145 μg) of ~1800 nt cluc/A120 in vitro transcript was capped in a 500 μL reaction containing 1×RNA capping buffering agent (50 mM Tris-HCl, pH 8.0, 5 mM KCl, 1 mM $MgCl_2$, 1 mM DTT), 0.5 mM GTP, 0.1 mM SAM, 10 U/μL of Vaccinia cap 2'O methyltransferase (NEB M0366) and 500 nM of H3C2 at 45° C. for 1 h. The efficiency of Cap-1 formation was assessed by the RNase H/intact LC/MS as described in Example 7. The RNA was purified using acidic phenol and chloroform, followed by ethanol precipitation, and rehydrated in nuclease-free water. The RNA concentration was estimated by Qubit RNA (Broad Range) kit (ThermoFisher). The translation efficiency of the capped cluc/A120 transcript was measured as relative luciferase activity from HEK293 cells transfected with the capped cluc/A120 transcript in relation to uncapped cluc/A120 transcript. HEK293 cells were transfected with 250 ng of Purified cluc/A120 transcript\using Lipofectamine MessengerMax transfection reagent (ThermoFisher). Luciferase activity was assayed four hours post-transfection on 10 μL of culture medium supernatant using the BioLux® Cypridina Luciferase Assay Kit (New England Biolabs Inc. Ipswich). Luminescence was measured using Centro LB960 microplate luminometer from Berthold technologies. As shown in FIG. 17, the scale-up capping reaction achieved 47.7% and 54.8% Cap-1 formation on cluc/A120 containing rU and pseudouridine, respectively, consistent to the results in Example 5 and FIG. 11. The luciferase assay results in triplicate showed that the translation efficiency from the purified capped transcripts containing rU and pseudouridine exhibited high luciferase activity (FIG. 18), indicating that the RNAs capped with H3C2 at 45° C. were functionally active. It should be noted that modifications to reaction conditions such as reaction volume, concentration of enzymes and reaction components, reaction time and reaction temperature may improve the Cap-1 formation efficiency of a larger quantity of RNA and the translation efficiency of the resultant Cap-1 RNA.

Example 11: Single-Vessel Capped RNA Synthesis with Multiple Temperature Steps

Figure 19:
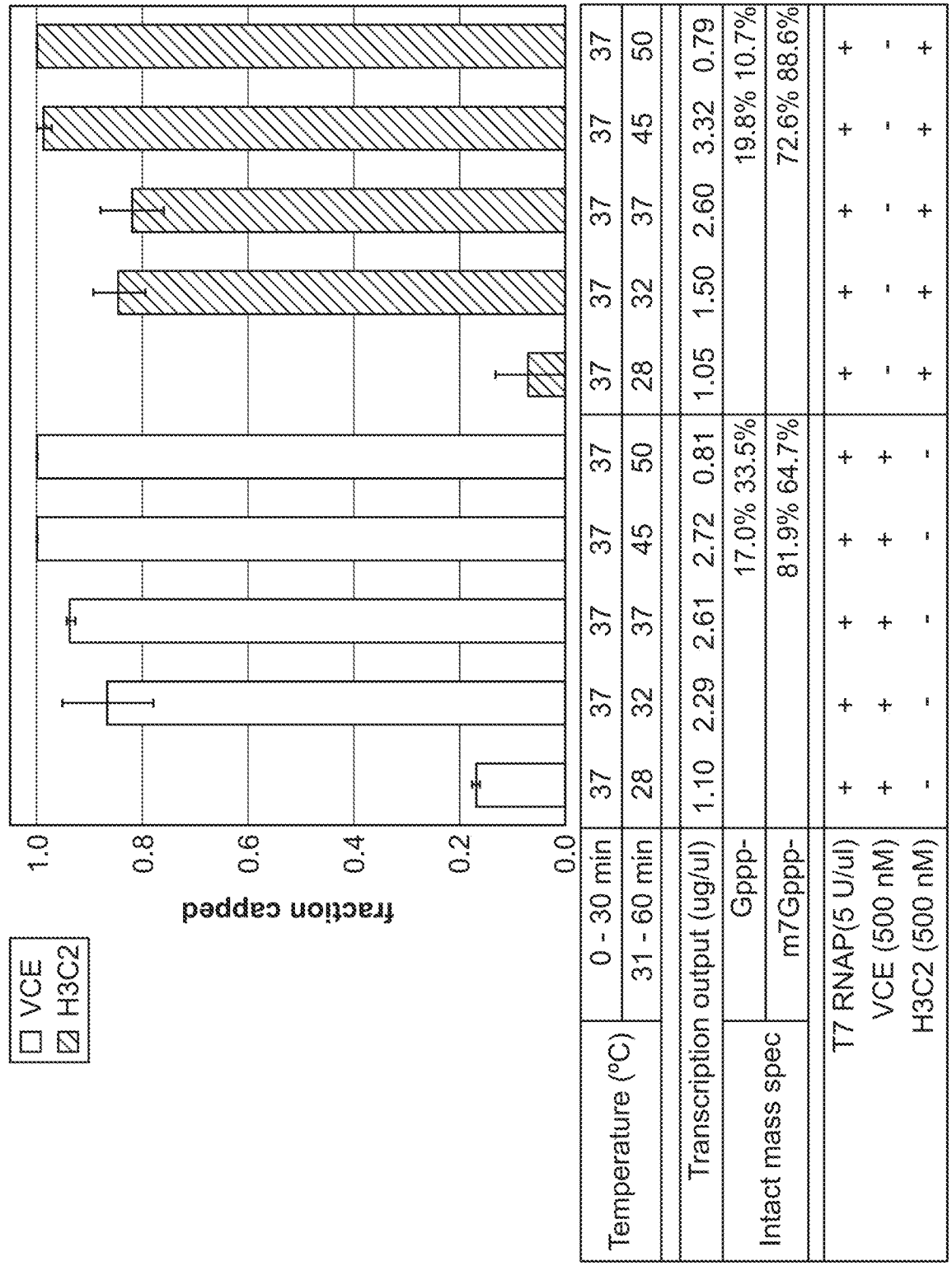
FIG. 19 shows that multiple temperature steps can improve the transcription output and capping efficiency of single-vessel capped RNA synthesis. Single-vessel capped RNA synthesis reactions using T7 RNA polymerase paired with VCE or H3C2 capping enzyme were performed for a 1.7 kb fluc transcript as described in Example 11, where reactions were incubated at 37° C. for 30 min, followed by a second 30-minute incubation at temperatures between 28° C. and 50° C. The transcription output was evaluated using DNase I/Qubit method. Fraction capped was estimated by the RNase H/Klenow fill-in and urea PAGE method. Samples that showed the highest fraction capped were subjected to intact LC/MS analysis. For VCE, the m7Gppp-transcript forming efficiency peaked at second reaction temperature of 45° C., whereas for H3C2, the m7Gppp-forming efficiency peaked at second reaction temperature of 50° C. T7 RNAP transcription output, on the other hand, peaked at 45° C. when paired with either VCE or H3C2, reflecting the low transcription activity at the lower and upper ends of the tested temperatures (28° C. and 50° C., respectively). Hence, tandem temperature steps of 37° C. for 30 min followed by 45° C. for 30 min yielded the optimal balance of transcription output and capping efficiency in this example. Modifications to reaction conditions such as the reaction time, reaction temperature and the number of temperature steps may further improve the transcription yield and fraction of m7G-capped transcript.

Single-vessel capped RNA synthesis reactions for the 1.7 kb fluc transcript were performed as indicated in Example 7, namely, 5 U/ul of T7 RNA polymerase (New England Biolabs; Cat. No. M0251) was incubated with or without 500 nM of Vaccinia capping enzyme (New England Biolabs; Cat. No. M2080) or H3C2 capping enzyme for 37° C. for 30 min, followed by another 30-min incubation at 28° C., 32° C., 37° C., 45° C., or 50° C. The reactions contained 1× T7 RNA polymerase buffering agent (40 mM Tris-HCl, pH 7.9, 10 mM NaCl, 1 mM DTT, 2 mM spermidine) and were supplemented with 19 mM $MgCl_2$ and 5 mM each of ATP, UTP, GTP, CTP and 0.5 mM SAM. The transcription output was analyzed by DNase I/Qubit quantitation as described in Example 7. The capping efficiency of the reactions were evaluated by RNase H cleavage followed by Klenow fill-in with FAM-dCTP and urea-PAGE as indicated in Example 7. Selected reactions were further analyzed by intact mass spectrometer. As shown in FIG. 19, for VCE, the m7Gppp-forming efficiency peaked at second reaction temperature of 45° C., whereas for H3C2, the m7Gppp-forming efficiency peaked at second reaction temperature of 50° C. T7 RNAP transcription output, on the other hand, peaked at 45° C. when paired with either VCE or H3C2, reflecting the low transcription activity at the lower and upper end of the tested temperatures (28° C. and 50° C., respectively). Hence, tandem temperature steps of 37° C. for 30 min followed by 45° C. for 30 min yielded the optimal balance of transcription output and capping efficiency in this example. Modifications to reaction conditions such as the reaction time, reaction temperature and the number of temperature steps may further improve the transcription yield and fraction of m7G-capped transcript.

What is claimed is:

1. A composition comprising:
   (i) a polynucleotide;
   (ii) a single-chain RNA capping enzyme that has RNA triphosphatase (TPase), guanylyltransferase (GTase) and guanine-N7 methyltransferase (N7 MTase) activities and comprises an amino acid sequence at least 90% identical to (a) SEQ ID NO:2, (b) SEQ ID NO:3, and (c) SEQ ID NO:4;
   (iii) guanosine triphosphate (GTP);
   (iv) a buffering agent; and
   (v) a methyl group donor,
   wherein the amino acid sequence further has at least 85% identity to (A) SEQ ID NO:7, (B) SEQ ID NO: 8, (C) SEQ ID NO:9, and/or (D) SEQ ID NO:10.

2. The composition of claim 1, wherein the amino acid sequence further has at least 93% identity to (A) SEQ ID NO:7.

3. The composition of claim 1, wherein the amino acid sequence further has at least 93% identity to (A) SEQ ID NO:8.

4. The composition of claim 1, wherein the amino acid sequence further has at least 93% identity to (A) SEQ ID NO:9.

5. The composition of claim 1, wherein the amino acid sequence further has at least 93% identity to (A) SEQ ID NO:10.

6. The composition of claim 1, wherein the composition has a temperature in the range of 23° C.-60° C.

7. The composition of claim 1, wherein the composition is RNase-free and optionally comprises (vi) one or more RNase inhibitors.

8. The composition of claim 1, wherein the polynucleotide comprises a DNA template and the composition further comprises a bacteriophage polymerase and ribonucleotide triphosphates, for transcribing the DNA template to form an uncapped target RNA.

9. The composition of claim 8, wherein the bacteriophage polymerase comprises a T7 RNA polymerase, a T3 RNA polymerase, or a SP6 RNA polymerase.

10. The composition of claim 1 further comprising one or more detergents, dyes, solvents and/or preservatives.

11. The composition of claim 1, wherein the composition optionally comprises (vii) S-adenosyl methionine (SAM) and (viii) a cap 2'O methyltransferase enzyme.

12. The composition of claim 1, wherein the polynucleotide comprises an uncapped target RNA, the uncapped target RNA comprising one or more modified nucleotides.

13. The composition of claim 1, wherein the polynucleotide comprises an uncapped target RNA, the uncapped target RNA comprising one or more pseudouridines and/or one or more m1pseudouridines.

14. The composition of claim 1, wherein the polynucleotide encodes a therapeutic protein or vaccine.

15. The composition of claim 1, wherein the polynucleotide consists essentially of a single uncapped RNA target species.

16. The composition of claim 1, wherein the composition is cell free.

17. A kit comprising:
   a single-chain RNA capping enzyme that has RNA triphosphatase (TPase), guanylyltransferase (GTase) and guanine-N7 methyltransferase (N7 MTase) activities and comprises an amino acid sequence at least 90% identical to (a) SEQ ID NO:2, (b) SEQ ID NO:3, and (c) SEQ ID NO:4, wherein the enzyme is in a storage buffering agent;
   and a reaction buffering agent,
   wherein the amino acid sequence further has at least 85% identity to (A) SEQ ID NO:7, (B) SEQ ID NO: 8, (C) SEQ ID NO:9, and/or (D) SEQ ID NO:10.

18. The kit of claim 17, wherein the kit further comprises a bacteriophage polymerase and ribonucleotides, for transcribing a template polynucleotide encoding a target RNA.

19. The kit of claim 17, wherein the kit further comprises S-adenosyl methionine (SAM), cap 2'O methyltransferase enzyme (2'OMTase), or both SAM and 2'OMTase.

20. The kit of claim 17, wherein the kit further comprises one or more detergents, dyes, solvents and/or preservatives.

21. The kit of claim 17, wherein the single-chain RNA capping enzyme is a lyophilized single-chain RNA capping enzyme.

22. A method for efficiently capping RNA in vitro, comprising:
   contacting:
      (i) an RNA sample comprising an uncapped target RNA;
      (ii) a single-chain RNA capping enzyme that has RNA triphosphatase (TPase), guanylyltransferase (GTase) and guanine-N7 methyltransferase (N7 MTase) activities;
      (iii) guanosine triphosphate (GTP) or modified GTP;
      (iv) a buffering agent; and
      (v) a methyl group donor,
   at a temperature of 23° C.-60° C., to form a capped target RNA, wherein the single-chain RNA capping enzyme comprises an amino acid sequence at least 90% identical to (a) SEQ ID NO:2, (b) SEQ ID NO:3, and (c) SEQ ID NO:4 and at least 85% identical to (A) SEQ ID NO:7, (B) SEQ ID NO:8, (C) SEQ ID NO:9, and/or (D) SEQ ID NO:10.

23. The method according to claim 22, further comprising monitoring the appearance of capped target RNA.

* * * * *